United States Patent
Kommula et al.

(10) Patent No.: US 12,267,300 B2
(45) Date of Patent: Apr. 1, 2025

(54) INTELLIGENT FIREWALL POLICY PROCESSOR

(71) Applicant: Juniper Networks, Inc., Sunnyvale, CA (US)

(72) Inventors: Raja Kommula, Cupertino, CA (US); Rahul Gupta, Kanpur (IN); Ganesh Byagoti Matad Sunkada, Bengaluru (IN); Tarun Banka, Milpitas, CA (US); Thayumanavan Sridhar, Sunnyvale, CA (US); Raj Yavatkar, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/472,050

(22) Filed: Sep. 21, 2023

(65) Prior Publication Data
US 2024/0179124 A1 May 30, 2024

(30) Foreign Application Priority Data
Nov. 30, 2022 (IN) .............................. 202241069004

(51) Int. Cl.
*H04L 9/40* (2022.01)
*G06N 5/022* (2023.01)
(Continued)

(52) U.S. Cl.
CPC ......... *H04L 63/0263* (2013.01); *G06N 5/022* (2013.01); *G06N 20/20* (2019.01);
(Continued)

(58) Field of Classification Search
CPC ............ H04L 63/0245; H04L 63/0263; H04L 63/0236; H04L 41/16
(Continued)

(56) References Cited

U.S. PATENT DOCUMENTS

| 7,363,203 B2 | 4/2008 | Hines |
| 9,424,121 B2 | 8/2016 | Kushnir et al. |

(Continued)

FOREIGN PATENT DOCUMENTS

| CN | 113206761 B | 8/2021 |
| EP | 3889777 A1 | 10/2021 |

(Continued)

OTHER PUBLICATIONS

"Amazon SageMaker—Developer Guide," retrieved from https://docs.aws.amazon.com/sagemaker/latest/dg/randomcutforest.html on Feb. 15, 2024, 6167 pp.

(Continued)

*Primary Examiner* — Ruolei Zong
(74) *Attorney, Agent, or Firm* — Shumaker & Sieffert, P.A.

(57) ABSTRACT

An example network system includes processing circuitry and one or more memories coupled to the processing circuitry. The one or more memories are configured to store instructions which cause the system to obtain telemetry data, the telemetry data being associated with a plurality of applications running on a plurality of hosts. The instructions cause the system to, based on the telemetry data, determine a subset of applications of the plurality of applications that run on a first host of the plurality of hosts. The instructions cause the system to determine a subset of firewall policies of a plurality of firewall polices, each of the subset of firewall policies applying to at least one respective application of the subset of applications. The instructions cause the system to generate an indication of the subset of firewall policies and send the indication to a management plane of a distributed firewall.

20 Claims, 31 Drawing Sheets

(51) Int. Cl.
| | |
|---|---|
| *G06N 20/20* | (2019.01) |
| *H04L 41/14* | (2022.01) |
| *H04L 41/16* | (2022.01) |
| *H04L 41/5009* | (2022.01) |
| *H04L 43/0811* | (2022.01) |
| *H04L 43/0888* | (2022.01) |

(52) U.S. Cl.
CPC ............. *H04L 41/14* (2013.01); *H04L 41/16* (2013.01); *H04L 41/5009* (2013.01); *H04L 43/0811* (2013.01); *H04L 43/0888* (2013.01); *H04L 63/0236* (2013.01); *H04L 63/0245* (2013.01); *H04L 63/1416* (2013.01)

(58) Field of Classification Search
USPC ........................................................ 709/225
See application file for complete search history.

(56) References Cited

U.S. PATENT DOCUMENTS

| | | |
|---|---|---|
| 9,571,394 B1 | 2/2017 | Sivaramakrishnan et al. |
| 9,961,571 B2 | 5/2018 | Yang et al. |
| 10,171,335 B2 | 1/2019 | Maheshwari et al. |
| 10,235,231 B2 | 3/2019 | Zhang et al. |
| 10,257,055 B2 | 4/2019 | Li et al. |
| 10,263,833 B2 | 4/2019 | Maheshwari et al. |
| 10,289,473 B2 | 5/2019 | Mendes et al. |
| 10,373,094 B2 | 8/2019 | Naous et al. |
| 10,574,512 B1 | 2/2020 | Mermoud et al. |
| 10,616,043 B2 | 4/2020 | Wang et al. |
| 10,855,548 B2 | 12/2020 | Garvey et al. |
| 10,897,389 B2 | 1/2021 | Thampy et al. |
| 11,061,393 B2 | 7/2021 | Abe et al. |
| 11,082,439 B2 | 8/2021 | Salunke et al. |
| 11,138,163 B2 | 10/2021 | Mdini et al. |
| 11,165,631 B1 | 11/2021 | Chitalia et al. |
| 11,238,129 B2 | 2/2022 | Jalal et al. |
| 11,265,336 B2 | 3/2022 | Hild |
| 11,323,312 B1 | 5/2022 | Banka et al. |
| 11,323,327 B1 | 5/2022 | Chitalia et al. |
| 11,422,882 B1 | 8/2022 | Chhabra |
| 11,500,757 B2 | 11/2022 | Ambichl et al. |
| 11,616,682 B2 | 3/2023 | Thampy et al. |
| 11,636,090 B2 | 4/2023 | Li et al. |
| 11,645,293 B2 | 5/2023 | Pelloin |
| 11,658,874 B2 | 5/2023 | Banka et al. |
| 11,675,799 B2 | 6/2023 | Pierri et al. |
| 11,765,014 B2 | 9/2023 | Banka et al. |
| 11,809,267 B2 | 11/2023 | Gusat et al. |
| 11,816,178 B2 | 11/2023 | Jalal et al. |
| 11,887,015 B2 | 1/2024 | Fahmy et al. |
| 2004/0088730 A1 | 5/2004 | Gopalan et al. |
| 2004/0268149 A1 | 12/2004 | Aaron |
| 2005/0276228 A1 | 12/2005 | Yavatkar et al. |
| 2008/0262990 A1 | 10/2008 | Kapoor et al. |
| 2009/0055684 A1 | 2/2009 | Jamjoom et al. |
| 2011/0214157 A1 | 9/2011 | Korsunsky et al. |
| 2013/0298184 A1 | 11/2013 | Ermagan et al. |
| 2014/0157405 A1 | 6/2014 | Joll et al. |
| 2016/0112443 A1 | 4/2016 | Grossman et al. |
| 2016/0182373 A1 | 6/2016 | Wang et al. |
| 2016/0308734 A1 | 10/2016 | Feller et al. |
| 2017/0075749 A1 | 3/2017 | Ambichl et al. |
| 2017/0288991 A1 | 10/2017 | Ganesh |
| 2017/0330096 A1 | 11/2017 | Gupta et al. |
| 2018/0103052 A1* | 4/2018 | Choudhury ............. H04L 63/20 |
| 2018/0115470 A1 | 4/2018 | Huang et al. |
| 2018/0131675 A1* | 5/2018 | Sengupta ............ H04L 63/0245 |
| 2019/0068693 A1 | 2/2019 | Bernat |
| 2019/0141015 A1 | 5/2019 | Nellen |
| 2019/0196894 A1 | 6/2019 | Cherbakov et al. |
| 2020/0028771 A1* | 1/2020 | Wong .................... H04L 43/067 |
| 2020/0136973 A1 | 4/2020 | Rahman et al. |
| 2020/0272973 A1 | 8/2020 | Hongtan et al. |
| 2020/0278892 A1 | 9/2020 | Nainar et al. |
| 2021/0044623 A1 | 2/2021 | Bosch et al. |
| 2021/0117242 A1 | 4/2021 | Van De Groenendaal et al. |
| 2021/0135967 A1 | 5/2021 | Iorga et al. |
| 2021/0160262 A1 | 5/2021 | Bynum et al. |
| 2021/0320875 A1 | 10/2021 | Guim Bernat et al. |
| 2021/0367830 A1 | 11/2021 | Jain et al. |
| 2021/0390423 A1 | 12/2021 | Latapie et al. |
| 2021/0406091 A1 | 12/2021 | Thyagaturu et al. |
| 2022/0006783 A1* | 1/2022 | Hassanzadeh ...... H04L 63/0263 |
| 2022/0029929 A1 | 1/2022 | Jain et al. |
| 2022/0038471 A1 | 2/2022 | Sugarbaker et al. |
| 2022/0058042 A1 | 2/2022 | Vanjare et al. |
| 2022/0103431 A1 | 3/2022 | Singh et al. |
| 2022/0114032 A1 | 4/2022 | Bernat et al. |
| 2022/0116478 A1 | 4/2022 | Biederman et al. |
| 2022/0210028 A1 | 6/2022 | Chen et al. |
| 2022/0224121 A1 | 7/2022 | Jha et al. |
| 2022/0337555 A1* | 10/2022 | Gol ..................... H04L 63/0236 |
| 2022/0417117 A1 | 12/2022 | Tayeb et al. |
| 2022/0417323 A1 | 12/2022 | Julien et al. |
| 2023/0262093 A1* | 8/2023 | Gupta ................. H04L 63/1425 726/1 |
| 2023/0300059 A1 | 9/2023 | Rodriguez Natal et al. |
| 2023/0388346 A1 | 11/2023 | Kulshreshtha et al. |
| 2024/0007342 A1 | 1/2024 | Gupta et al. |

FOREIGN PATENT DOCUMENTS

| | | |
|---|---|---|
| WO | 2013184846 A1 | 12/2013 |
| WO | 2022020336 A1 | 1/2022 |

OTHER PUBLICATIONS

"CSRX Container Firewall," retrieved from https://www.juniper.net/us/en/products/security/srx-series/csrx-containerized-firewall.html, on Feb. 15, 2024, 2 pp.

"Emerging Technologies: Adoption Growth Insights—Function Accelerator Cards Cards(Next-Gen SmartNICs, DPUs, IPUs)," Gartner Research, Sep. 14, 2021, 6 pp.

"Granger Causality," Wikipedia, Last Updated Sep. 28, 2023, 14 pp.

"NVIDIA BlueField Networking Platform," retrieved from https://www.nvidia.com/en-us/networking/products/data-processing-unit/, on Feb. 15, 2024, 7 pp.

"PageRank," Wikipedia, Last Updated Oct. 19, 2023, 22 pp.

"The Istio Service Mesh," retrieved from https://istio.io/latest/about/service-mesh/, on Feb. 15, 2024, 5 pp.

Extended Search Report from counterpart European Application No. 23211541.0 dated Feb. 5, 2024, 7 pp.

Kim et al., "A Case for SmartNIC-accelerated Private Communication," APNet '20: Proceedings of the 4th Asia-Pacific Workshop on Networking, Aug. 2020, 8 pp.

Liu et al., "MicroHECL: High-Efficient Root Cause Localization in Large-Scale Microservice Systems," 2021 IEEE/ACM 43rd International Conference on Software Engineering: Software Engineering in Practice (ICSE-SEIP), May 2021, 10 pp.

Liu et al., "Offloading Distributed Applications onto SmartNICs using iPipe," in Proceedings of the ACM Special Interest Group on Data Communication (SIGCOMM '19), Aug. 19-23, 2019, 16 pp.

Liu et al., "Performance Characteristics of the BlueField-2 SmartNIC," arXiv:2105.06619, May 14, 2021, 13 pp.

Meng et al., "Localizing Failure Root Causes in a Microservice through Causality Inference," 2020 IEEE/ACM 28th International Symposium on Quality of Service (IWQoS), Jun. 2020, 10 pp.

Moro et al., "FOP4: Function Offloading Prototyping in Heterogeneous and Programmable Network Scenarios," 2019 IEEE Conference on Network Function Virtualization and Software Defined Network, Nov. 2019, 6 pp.

Soldani et al., "Anomaly Detection and Failure Root Cause Analysis in (Micro) Service-Based Cloud Applications: A Survey," arXiv:2105.12378, May 26, 2021, 36 pp.

Tanenbaum et al., "Distributed Systems: Principles and Paradigms," Second Edition, Prentice-Hall, (Applicant points out, in accordance with MPEP 609.04(a), that the year of publication, 2007, is suffi-

(56) References Cited

OTHER PUBLICATIONS ciently earlier than the effective U.S. filing date, so that the particular month of publication is not in issue. ) pp. 125-140.
U.S. Appl. No. 18/472,042, filed Sep. 21, 2023, by Kommula et al.
U.S. Appl. No. 18/472,059, filed Sep. 21, 2023, by Kommula et al.
U.S. Appl. No. 18/472,092, filed Sep. 21, 2023, by Kommula et al.
U.S. Appl. No. 18/472,111, filed Sep. 21, 2023, by Kommula et al.
U.S. Appl. No. 18/472,123, filed Sep. 21, 2023, by Kommula et al.
Wu et al., "MicroRCA: Root Cause Localization of Performance Issues in Microservices," IEEE/IFIP Network Operations and Management Symposium (NOMS), Apr. 2020, 10 pp.
Response to Extended Search Report dated Feb. 6, 2024, from counterpart European Application No. 23211541.0 filed Dec. 2, 2024, 11 pp.

\* cited by examiner

|  | Precision | Recall | F1-score | Support |
|---|---|---|---|---|
| 0 | 1.00 | 1.00 | 1.00 | 6276 |
| 1 | 0.94 | 1.00 | 0.97 | 232 |
| Accuracy |  |  | 1.00 | 6508 |
| Macro avg | 0.97 | 1.00 | 0.98 | 6508 |
| Weighted avg | 1.00 | 1.00 | 1.00 | 6508 |

FIG. 13

INTELLIGENT FIREWALL POLICY PROCESSOR

This application claims priority to Indian Provisional Patent Application No. 202241069004, filed on Nov. 30, 2022, the entire contents of which is incorporated herein by reference.

TECHNICAL FIELD

The disclosure relates to computer networks.

BACKGROUND

In a typical cloud data center environment, there is a large collection of interconnected servers that provide computing and/or storage capacity to run various applications. For example, a data center may comprise a facility that hosts applications and services for subscribers, e.g., customers of a data center provider. The data center may, for example, host all of the infrastructure equipment, such as networking and storage systems, redundant power supplies, and environmental controls. In a typical data center, clusters of storage servers and application servers (compute nodes) are interconnected via a high-speed switch fabric provided by one or more tiers of physical network switches and routers. More sophisticated data centers provide infrastructure spread throughout the world with subscriber support equipment located in various physical hosting facilities.

The connectivity between the server and the switch fabric occurs at a hardware module called the network interface card (NIC). A conventional NIC includes an application-specific integrated circuit (ASIC) to perform packet forwarding, which includes some basic Layer 2/Layer 3 (L2/L3) functionality. In conventional NICs, the packet processing, policing and other advanced functionality, known as the "datapath," is performed by the host CPU, i.e., the CPU of the server that includes the NIC. As a result, the CPU resources in the server are shared by applications running on that server and also by datapath processing. For example, in a 4 core x86 server, one of the cores may be reserved for the datapath, leaving 3 cores (or 75% of CPU) for applications and the host operating system.

Some NIC vendors have begun including an additional processing unit in the NIC itself to offload at least some of the datapath processing from the host CPU to the NIC. The processing unit in the NIC may be, e.g., a multi-core ARM processor with some hardware acceleration provided by a Data Processing Unit (DPU), Field Programmable Gate Array (FPGA), and/or an ASIC. NICs that include such augmented datapath processing capabilities are typically referred to as SmartNICs.

SUMMARY

The emergence of cloud native applications is bringing additional complexity to the communication patterns within networks due to the highly distributed nature of cloud native applications and dynamic deployment conditions. Networks are now expected to be application-aware, which requires end nodes, such as servers, to participate in various networking tasks that traditionally are not performed by switches and/or routers. This has hastened the emergence of data processing units (DPUs) or smart network interface cards (SmartNICs) for performing different network services in an efficient manner. This disclosure presents a close-loop framework for implementing application-aware network services using SmartNICs (also referred to herein as DPUs). In some examples, a machine learning model executing on a device and one or more SmartNICs may create a self-correcting network for management and observability of microservice-based applications. Along with, or through, the use of machine learning techniques, SmartNICs may perform continuous monitoring of application performance metrics and can take corrective actions to remediate security or performance issues in real-time (or near real-time).

Modern microservices-based applications may assume a network is a black box. These services may interact with each other using frameworks like Remote Procedure Call (e.g., gRPC) and Representational State Transfer (REST). These assumptions and interactions create an environment where the network is not aware of the applications that the network is transporting and vice versa, which may result in under-utilization of the capabilities of both the network and the microservices-based applications. Administrators may monitor applications and networking occurring within a network with different sets of tools, which my increase the cost of such monitoring and create unnecessary delays in responding to abnormalities, anomalies, or other issues discovered during such monitoring.

Network monitoring tools are generally not completely integrated with the rest of the infrastructure. In almost all monitoring architectures, switches and routers export telemetry data using, for example, Simple Network Management Protocol (SNMP) or a similar mechanism, so that monitoring software running on a server in the same network or in the cloud may analyze the telemetry data. These tools may identify some problems, but the tools have limited impact on the packet flows due the restricted telemetry data (e.g., network layer telemetry data) that the tools receive. Similarly, application monitoring requires complex software or sidecars running inside the service mesh using many system resources. As such, combining both network and application layer monitoring with a packet forwarding pipeline may be highly desirable.

Switches based on P4 (programming protocol-independent packet processors), like programmable pipelines, offered some hope of achieving the combination of network and application monitoring with the packet forwarding pipeline, but were unpopular. Network processors have the potential to solve this monitoring problem up to an extent, but network processors are usually present in the edge of the network, which may not be optimal. The emergence of DPUs and/or SmartNICs offer an opportunity to solve this monitoring problem by allowing monitoring software to be part of the packet forwarding flow without impacting latency and throughput. This emergence has enabled the ability to design a closed-loop architecture for implementing application-aware services such as application-aware threat detection and SLA enforcements using SmartNICs at a high scale in terms of bandwidth and latency. For example, SmartNICs may be used to monitor, detect, and neutralize threats in real-time and/or near-real time. Prior work has focused on using SmartNICs for accelerating workloads performance. The closed-loop framework disclosed herein enables use cases that may have been previously not possible. For example, existing learning-based solutions only monitor some part of the network traffic, like data going in and out of a datacenter. Due to this limitation, existing learning-based solutions may only enforce network policies at the network edge. With the popularity of public clouds, many enterprises share the same compute and network resources, requiring a greater need for policy enforcement inside a datacenter. The closed-loop system utilizing SmartNICs described in this disclosure may examine every packet generated in the datacenter resulting in a true application-aware policy enforcement system.

In this disclosure, the term SmartNIC is intended to cover the category of devices known as DPUs or Infrastructure Processing Units (IPUs). These SmartNICs are typically attached to servers in a PCIe card form factor. Each card may house a specialized silicon component (typically a single chip ASIC) which includes a set of processor cores and a specialized silicon complex which may be used to perform packet processing and security functions. One advantage of utilizing a SmartNIC is that a SmartNIC includes a hybrid architecture, e.g., provides for programmability through processing circuitry, such as ARM processor cores, and provides for specialized acceleration and offload functions through the ASIC. With the ability to introduce services on the ARM cores, servers may be completely isolated from the network and security services running on the SmartNIC.

In general, techniques are described for closed-loop application-aware network services including an edge services platform that leverages processing units of SmartNICs to augment the processing and networking functionality of a network of servers that include the SmartNICs. Features provided by the edge services platform may include, e.g., orchestration of SmartNICs; API driven deployment of services on SmartNICs; SmartNIC addition, deletion and replacement; monitoring of services (such as security services) and other resources on SmartNICs; and management of connectivity between various services running on the SmartNICs. More specifically, this disclosure describes techniques for dynamically generating and implementing firewall policies, dynamically correcting Service Level Agreement (SLA) issues, dynamically processing packets of a flow based on rankings, dynamically creating flow table entries, dynamically optimizing firewall policy searching, and dynamically accessing and/or mitigating egress traffic security issues, each using an edge services platform and one or more SmartNICs.

In one example, this disclosure describes a network system including processing circuitry; and one or more memories coupled to the processing circuitry and configured to store instructions which, when executed by the processing circuitry, cause the network system to: obtain telemetry data, the telemetry data being associated with a plurality of applications running on a plurality of hosts; based on the telemetry data, determine a subset of applications of the plurality of applications that run on a first host of the plurality of hosts; determine a subset of firewall policies of a plurality of firewall polices, each of the subset of firewall policies applying to at least one respective application of the subset of applications; generate an indication of the subset of firewall policies; and send the indication to a management plane of a distributed firewall.

In another example, this disclosure describes a method including: obtaining telemetry data, the telemetry data being associated with a plurality of applications running on a plurality of hosts; based on the telemetry data, determining of subset of applications of the plurality of applications that run on a first host of the plurality of hosts; determining a subset of firewall policies of a plurality of firewall polices, each of the subset of firewall policies applying to at least one respective application of the subset of applications; generating an indication of the subset of firewall policies; and sending the indication to a management plane of a distributed firewall.

In another example, this disclosure describes computer-readable storage media storing instructions, which when executed, cause processing circuitry to: obtain telemetry data, the telemetry data being associated with a plurality of applications running on a plurality of hosts; based on the telemetry data, determine of subset of applications of the plurality of applications that run on a first host of the plurality of hosts; determine a subset of firewall policies of a plurality of firewall polices, each of the subset of firewall policies applying to at least one respective application of the subset of applications; generate an indication of the subset of firewall policies; and send the indication to a management plane of a distributed firewall.

The details of one or more examples of this disclosure are set forth in the accompanying drawings and the description below. Other features, objects, and advantages will be apparent from the description and drawings, and from the claims.

BRIEF DESCRIPTION OF DRAWINGS

FIG. 13 is a table illustrating example anomaly detection for service-discovery-dns-count-per-minute metric according to one or more aspects of this disclosure.

Like reference characters denote like elements throughout the description and figures.

DETAILED DESCRIPTION

Figure 1:
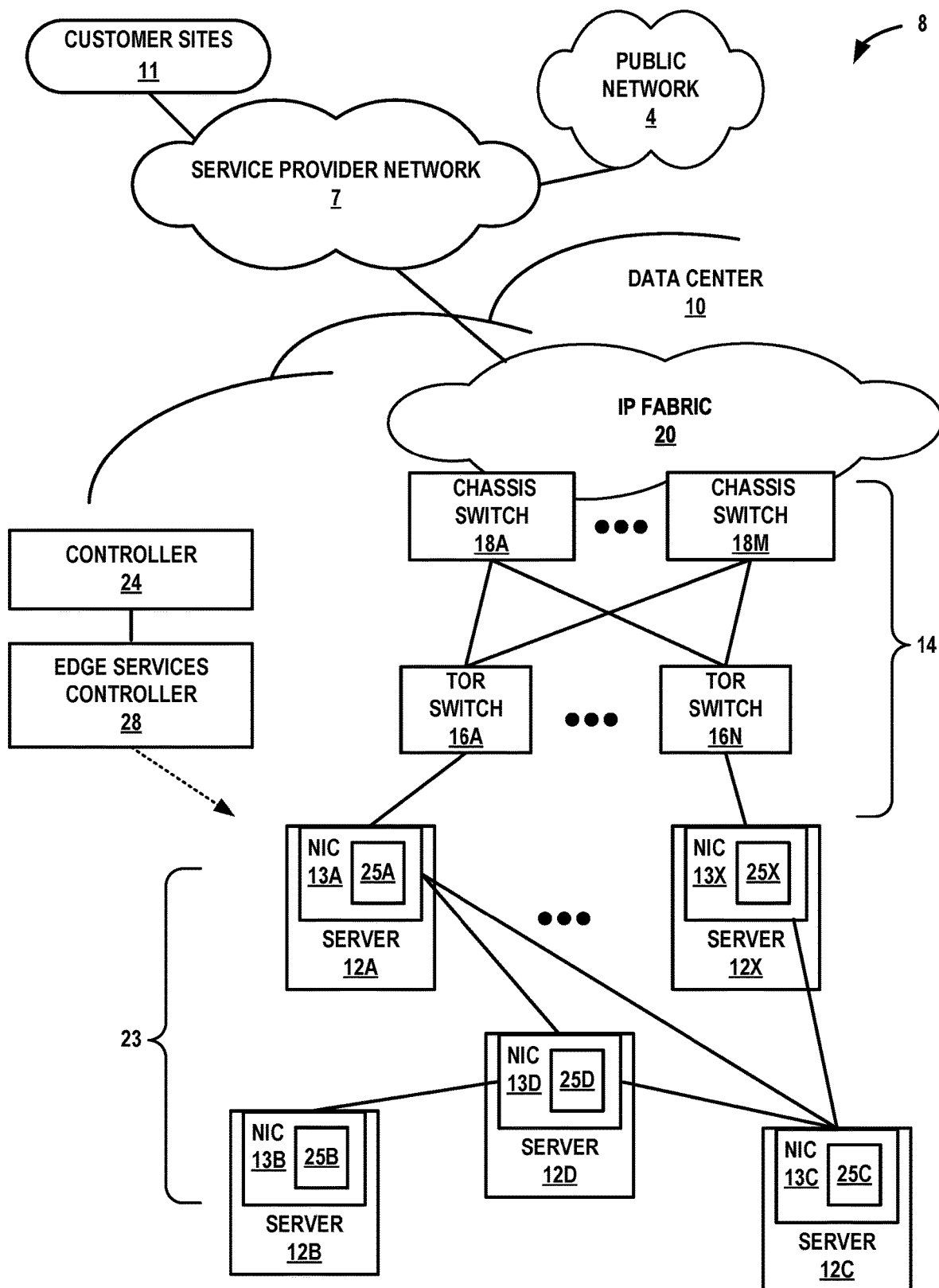
FIG. 1 is a block diagram illustrating an example network system having a data center in which examples of the techniques described herein may be implemented.

FIG. 1 is a block diagram illustrating an example network system 8 having a data center 10 in which examples of the techniques described herein may be implemented. In general, data center 10 provides an operating environment for applications and services for customer sites 11 having one or more customer networks coupled to data center 10 by a service provider network 7. Data center 10 may, for example, host infrastructure equipment, such as networking and storage systems, redundant power supplies, and environmental controls. Service provider network 7 is coupled to a public network 4. Public network 4 may represent one or more networks administered by other providers and may thus form part of a large-scale public network infrastructure, e.g., the Internet. For instance, public network 4 may represent a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 4 are illustrated and described primarily as edge networks of service provider network 7, in some examples, one or more of customer sites 11 and public network 4 are tenant networks within data center 10 or another data center. For example, data center 10 may host multiple tenants (customers) each associated with one or more virtual private networks (VPNs). Each of the VPNs may implement one of customer sites 11.

Service provider network 7 offers packet-based connectivity to attached customer sites 11, data center 10, and public network 4. Service provider network 7 may represent a network that is operated (and potentially owned) by a service provider to interconnect a plurality of networks. Service provider network 7 may implement Multi-Protocol Label Switching (MPLS) forwarding and, in such instances, may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10, such as one or more physical network functions (PNFs) or virtualized network functions (VNFs), may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack (TOR) switches 16A-16N. This disclosure may refer to TOR switches 16A-16N collectively, as "TOR switches 16." TOR switches 16 may be network devices that provide layer 2 (MAC) and/or layer 3 (e.g., IP) routing and/or switching functionality.

Servers 12 may also be referred to herein as "hosts" or "host devices." Data center 10 may include many additional servers coupled to other TOR switches 16 of the data center 10. In the example of FIG. 1, servers 12A and 12X are directly coupled to TOR switches 16, and servers 12B, 12C, and 12D are not directly coupled to TOR switches 16 in the illustrated example. Servers 12B, 12C, and 12D may reach TOR switches 16 and IP fabric 20 via servers 12A or 12X, as described in further detail below.

Switch fabric 14 in the illustrated example includes interconnected TOR switches 16 (or other "leaf" switches) coupled to a distribution layer of chassis switches 18A-18M (collectively, "chassis switches 18"). Chassis switches may also be referred to as "spine" or "core" switches. Although not shown in the example of FIG. 1, data center 10 may also include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, and/or other network devices.

In some examples, TOR switches 16 and chassis switches 18 provide servers 12 with redundant (e.g., multi-homed) connectivity to IP fabric 20 and service provider network 7. Chassis switches 18 aggregate traffic flows and provide connectivity between TOR switches 16. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 via service provider network 7. The switching architecture of data center 10 shown in FIG. 1 is merely an example. Other switching architectures may have more or fewer switching layers, for instance. TOR switches 16 and chassis switches 18 may each include physical network interfaces.

In this disclosure, the terms "packet flow," "traffic flow," or simply "flow" each refer to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. The term "source port" refers to a transport layer (e.g., transmission control protocol (TCP)/user datagram protocol (UDP)) port. A "port" may refer to a physical network interface of a NIC.

Each of servers 12 may be a compute node, an application server, a storage server, or other type of server. For example, each of servers 12 may represent a computing device, such as an x86 processor-based server, configured to operate according to techniques described herein. Servers 12 may provide Network Function Virtualization Infrastructure (NFVI) for a Network Function Virtualization (NFV) architecture.

Servers 12 may host endpoints for one or more virtual networks that operate over the physical network represented in FIG. 1 by IP fabric 20 and switch fabric 14. Endpoints may include one or more virtual network endpoints, e.g., virtual machines, containerized applications (e.g., of orchestration platforms including Kubernetes, Docker swarm, Mesos/Marathon, OpenShift, OpenStack, VMWare, and Amazon ECS), or applications executing natively on the operating system or bare metal. Containerization is a virtualization scheme based on operation system-level virtualization. Like a virtual machine, each container is virtualized and may remain isolated from one another and from the host machine. However, unlike a virtual machine, each container may omit an individual operating system and provide only an application suite and application-specific libraries. In general, a container is executed by the host machine as an isolated user-space instance and may share an operating system and common libraries with other containers executing on the host machine. Containers may be managed as groups of logically-related elements (sometimes referred to as "pods" for some orchestration platforms, e.g., Kubernetes). Although described primarily with respect to a data center-based switching network, other physical networks, such as service provider network 7, may underlay the one or more virtual networks.

Each of servers 12 includes at least one network interface card (NIC) of NICs 13A-13X (collectively, "NICs 13"). For example, server 12A includes NIC 13A. Each of NICs 13 includes at least one port. Each of NICs 13 may send and receive packets over one or more communication links coupled to the ports of the NIC.

In some examples, each of NICs 13 provides one or more virtual hardware components for virtualized input/output (I/O). A virtual hardware component for virtualized I/O may be a virtualization of a physical NIC 13 (the "physical function"). For example, in Single Root I/O Virtualization (SR-IOV), which is described in the Peripheral Component Interface Special Interest Group SR-IOV specification, the Peripheral Component Interface (PCI) express (PCIe) Physical Function of the network interface card (or "network adapter") is virtualized to present one or more virtual network interface cards as "virtual functions" for use by respective endpoints executing on the server 12. In this way, the virtual network endpoints may share the same PCIe physical hardware resources and the virtual functions are examples of virtual hardware components. As another example, one or more servers 12 may implement Virtio, a para-virtualization framework available, e.g., for the Linux Operating System, that provides emulated NIC functionality as a type of virtual hardware component. As another example, one or more servers 12 may implement Open vSwitch to perform distributed virtual multilayer switching between one or more virtual NICs (vNICs) for hosted virtual machines, where such vNICs may also represent a type of virtual hardware component. In some instances, the virtual hardware components are virtual I/O (e.g., NIC) components. In some instances, the virtual hardware components are SR-IOV virtual functions and may provide SR-IOV with Data Plane Development Kit (DPDK)-based direct process user space access.

In some examples, including the example of FIG. 1, one or more of NICs 13 include multiple ports. NICs 13 may be connected to one another via ports of NICs 13 and communications links to form a NIC fabric 23 having a NIC fabric topology. NIC fabric 23 is the collection of NICs 13 connected to at least one other of NICs 13 and the communications links coupling NICs 13 to one another.

NICs 13A-13X include corresponding processing circuitry, such as processing units 25A-25X (collectively, "processing units 25"). Processing units 25 may offload aspects of the datapath from CPUs of servers 12. One or more of processing units 25 may be a multi-core ARM processor with hardware acceleration provided by a Data Processing Unit (DPU), a Field Programmable Gate Array (FPGA), and/or an Application Specific Integrated Circuit (ASIC). Because NICs 13 include processing units 25, NICs 13 may be referred to as "SmartNICs" or "GeniusNICs."

In accordance with various aspects of the techniques of this disclosure, an edge services platform uses processing units 25 of NICs 13 to augment the processing and networking functionality of switch fabric 14 and/or servers 12 that include NICs 13. In the example of FIG. 1, network system 8 includes an edge services controller 28. This disclosure may also refer to an edge services controller, such as edge services controller 28, as an edge services platform controller.

Edge services control 28 may manage the operations of the edge services platform within NIC 13s in part by orchestrating services performed by processing units 25; orchestrating API driven deployment of services on NICs 13; orchestrating NIC 13 addition, deletion, and replacement within the edge services platform; monitoring of services and other resources on NICs 13; and/or management of connectivity between various services 133 running on the NICs 13. Edge services controller 28 may include one or more computing devices, such as server devices, personal computers, intermediate network devices, or the like.

Edge services controller 28 may communicate information describing services available on NICs 13, a topology of NIC fabric 23, or other information about the edge services platform to an orchestration system (not shown) or a controller 24. Example orchestration systems include OpenStack, vCenter by VMWARE, or System Center by Microsoft Corporation of Redmond, Washington. Example controllers include a controller for Contrail by JUNIPER NETWORKS or Tungsten Fabric. Controller 24 may be a network fabric manager. Additional information regarding a controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. Pat. No. 9,571,394, filed Mar. 26, 2014, and entitled "TUNNELED PACKET AGGREGATION FOR VIRTUAL NETWORKS," each of which is incorporated by reference as if fully set forth herein.

In some examples, edge services controller 28 programs processing units 25 of NICs 13 to route data packets along data paths through NIC fabric 23, e.g., based on applications (services) associated with the data packets. Routing data packets along data paths through NIC fabric 23 may avoid overloading individual NICs in NIC fabric 23 when multiple services on a pair of hosts are communicating with each other. For example, edge services controller 28 may manage data packet routing in NIC fabric 23. As shown in FIG. 1, NIC fabric 23 comprises a plurality of NICs 13 coupled by communication links in a NIC fabric topology. In this example, edge services controller 28 may receive resource availability values from NICs 13. Edge services controller 28 may determine a data path for data packets of a flow transported using a protocol from a source NIC to a destination NIC via a NIC set that comprises at least one NIC. NICs 13 include the source NIC, the destination NIC, and the NIC set. As part of determining the data path, edge services controller 28 may select the NIC set based on the resource availability values. Edge services controller 28 may transmit, to the source NIC and to each NIC in the NIC set, data path data to cause the source NIC and each NIC in the NIC set to identify the data packets of the flow using an identifier of the protocol and to transmit the data packets of the flow from the source NIC to the destination NIC via the data path. Edge services controller 28 may establish multiple data paths in this manner. Unlike in a conventional data center fabric, servers 12 may thus exchange packets directly, rather than via a separate switching device (such as chassis switches 18). The above may be considered a form of service load balancing.

The example system of FIG. 1 may form a closed-loop framework for implementing application-aware network services using SmartNICs, such as NICs 13, as further described below.

Figure 2:
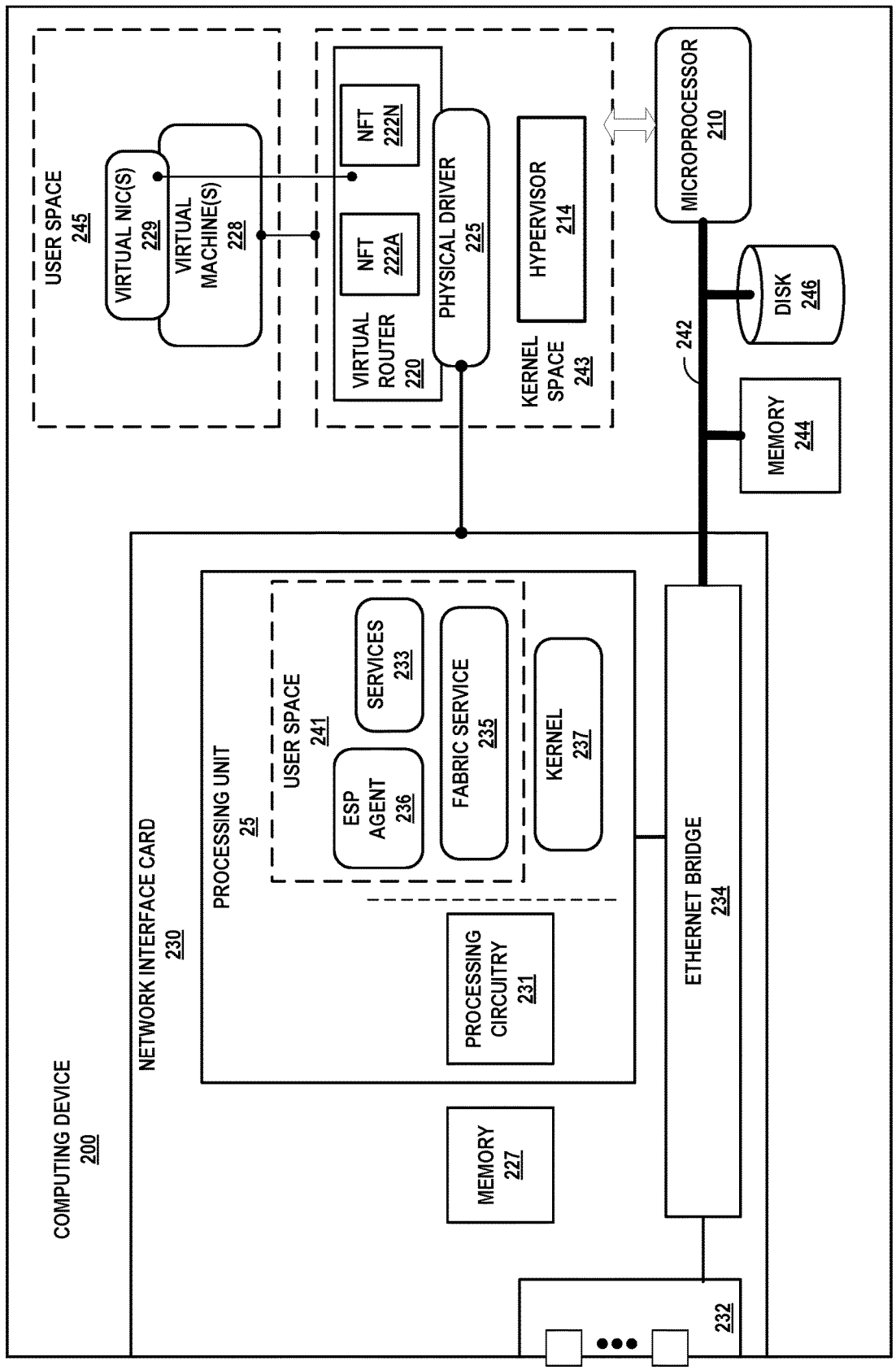
FIG. 2 is a block diagram illustrating an example computing device that uses a network interface card having a separate processing unit, to perform services managed by an edge services platform according to techniques described herein.

FIG. 2 is a block diagram illustrating an example computing device 200 that uses a NIC 230 having a separate processing unit 25, to perform services managed by an edge services platform according to techniques described herein. For example, NIC 230 may implement a portion of a distributed firewall service, implement portions of a service executing on a server, such as one of servers 12 of FIG. 1, or the like. Computing device 200 of FIG. 2 may represent a real or virtual server and may represent an example instance of any of servers 12 of FIG. 1. In the example of FIG. 2, computing device 200 includes a bus 242 that couples hardware components of the hardware environment of computing device 200. Specifically, in the example of FIG. 2, bus 242 couples a Single Route Input/Output Virtualization (SR-IOV)-capable NIC 230, a storage disk 246, and a microprocessor 210. In some examples, a front-side bus couples microprocessor 210 and memory device 244. In some examples, bus 242 couples memory device 244, microprocessor 210, and NIC 230. Bus 242 may represent a PCIe bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit ("processing core") to perform instructions that conform to an instruction set architecture. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic TALE, magnetic disk storage or other magnetic storage devices, or any other medium that can be used to store the desired information and that can be accessed by microprocessor 210.

Memory device 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory device 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 also include an on-card memory 227 to, e.g., store packet data. Direct memory access transfers between NIC 230 and other devices coupled to bus 242 may read/write from/to the memory 227.

Memory device 244, NIC 230, disk 246, and microprocessor 210 provide an operating environment for a software stack that executes a hypervisor 214 and one or more virtual machines 228 managed by hypervisor 214. In general, a virtual machine provides a virtualized/guest operating system for executing applications in an isolated virtual environment. Because a virtual machine is virtualized from physical hardware of the host server, executing applications are isolated from both the hardware of the host and other virtual machines. Computing device 200 executes hypervisor 214 to manage virtual machines 228. Example hypervisors include Kernel-based Virtual Machine (KVM) for the Linux kernel, Xen, ESXi available from VMWARE, Windows Hyper-V available from MICROSOFT, and other open-source and proprietary hypervisors. Hypervisor 214 may represent a virtual machine manager (VMM). Virtual machines 228 may host one or more applications, such as virtual network function instances. In some examples, a virtual machine 228 may host one or more VNF instances, where each of the VNF instances is configured to apply a network function to packets.

An alternative to virtual machines is the virtualized container, such as those provided by the open-source DOCKER Container application. Like a virtual machine, each container is virtualized and may remain isolated from the host machine and other containers. However, unlike a virtual machine, each container may omit an individual operating system and provide only an application suite and application-specific libraries. A container is executed by the host machine as an isolated user-space instance and may share an operating system and common libraries with other containers executing on the host machine. Thus, containers may require less processing power, storage, and network resources than virtual machines. As used herein, containers may also be referred to as virtualization engines, virtual private servers, silos, or jails. In some instances, the techniques described herein with respect to containers and virtual machines or other virtualization components.

While virtual network endpoints in FIG. 2 are illustrated and described with respect to virtual machines, other operating environments, such as containers (e.g., a DOCKER container) may implement virtual network endpoints. An operating system kernel (not shown in FIG. 2) may execute in kernel space and may include, for example, a Linux, Berkeley Software Distribution (BSD), another Unix-variant kernel, or a Windows server operating system kernel, available from MICROSOFT.

Hypervisor 214 includes a physical driver 225 to use a physical function provided by NIC 230. In some cases, NIC 230 may also implement SR-IOV to enable sharing the physical network function (I/O) among virtual machines 224. Each port of NIC 230 may be associated with a different physical function. The shared virtual devices, also known as virtual functions, provide dedicated resources such that each of virtual machines 228 (and corresponding guest operating systems) may access dedicated resources of NIC 230, which therefore appears to each of virtual machines 228 as a dedicated NIC. Virtual functions may be lightweight PCIe functions that share physical resources with the physical function and with other virtual functions. NIC 230 may have thousands of available virtual functions according to the SR-IOV standard, but for I/O-intensive applications the number of configured virtual functions is typically much smaller.

Virtual machines 228 include respective virtual NICs 229 presented directly into the virtual machine 228 guest operating system, thereby offering direct communication between NIC 230 and virtual machines 228 via bus 242, using the virtual function assigned for the virtual machine. This may reduce hypervisor 214 overhead involved with software-based, VIRTIO and/or vSwitch implementations in which a memory address space of hypervisor 214 within memory device 244 stores packet data and because copying packet data from NIC 230 to the memory address space of hypervisor 214 and from the memory address space of hypervisor 214 to memory address spaces of virtual machines 228 consumes cycles of microprocessor 210.

NIC 230 may further include a hardware-based Ethernet bridge 234. Ethernet bridge 234 may be an example of an embedded switch. Ethernet bridge 234 may perform layer 2 forwarding between virtual functions and physical functions of NIC 230. Thus, in some cases, Ethernet bridge 234 provides hardware acceleration, via bus 242, of inter-virtual machine 228 packet forwarding and hardware acceleration of packet forwarding between hypervisor 214 and any of virtual machines 228. Hypervisor 214 may access the physical function via physical driver 225. Ethernet bridge 234 may be physically separate from processing unit 25.

Computing device 200 may be coupled to a physical network switch fabric that includes an overlay network that extends a switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. At least some functions of the virtual router may be performed as one of services 233 or fabric service 235. In the example of FIG. 2, virtual router 220 executes within hypervisor 214 that uses physical function for I/O, but virtual router 220 may execute within a hypervisor, a host operating system, a host application, one of virtual machines 228, and/or processing unit 25 of NIC 230.

In general, each virtual machine 228 may be assigned a virtual address for use within a corresponding virtual network, where each of the virtual networks may be associated with a different virtual subnet provided by virtual router 220. A virtual machine 228 may be assigned its own virtual layer three (L3) IP address, for example, for sending and receiving communications but may be unaware of an IP address of the computing device 200 on which the virtual machine is executing. In this way, a "virtual address" is an address for an application that differs from the logical address for the underlying, physical computer system, e.g., computing device 200.

In one implementation, computing device 200 includes a virtual network (VN) agent (not shown) that controls the overlay of virtual networks for computing device 200 and that coordinates the routing of data packets within computing device 200. In general, a VN agent communicates with a virtual network controller for the multiple virtual networks, which generates commands to control routing of packets. A VN agent may operate as a proxy for control plane messages between virtual machines 228 and the virtual network controller, such as controller 24 (FIG. 1). For example, a virtual machine may request to send a message using its virtual address via the VN agent, and VN agent may in turn send the message and request that a response to the message be received for the virtual address of the virtual machine that originated the first message. In some cases, a virtual machine 228 may invoke a procedure or function call presented by an application programming interface of VN agent, and the VN agent may handle encapsulation of the message as well, including addressing.

In one example, network packets, e.g., layer three (L3) IP packets or layer two (L2) Ethernet packets generated or consumed by the instances of applications executed by virtual machine 228 within the virtual network domain, may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), Virtual Extensible Local Area Network (VXLAN), Multiprotocol Label Switching (MPLS) over GRE (MPLSoGRE), MPLS over User Datagram Protocol (UDP) (MPLSoUDP), etc.

As noted above, a virtual network controller may provide a logically centralized controller for facilitating operation of one or more virtual networks. The virtual network controller may, for example, maintain a routing information base, e.g., one or more routing tables that store routing information for the physical network as well as one or more overlay networks. Virtual router 220 of hypervisor 214 implements a network forwarding table (NFT) 222A-222N for N virtual networks for which virtual router 220 operates as a tunnel endpoint. In general, each NFT 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of NFTs 222 may be an NFT for a different routing instance (not shown) implemented by virtual router 220.

In accordance with techniques of this disclosure, edge services controller 28 (FIG. 1) uses processing unit 25 of NIC 230 to augment the processing and networking functionality of computing device 200. Processing unit 25 includes processing circuitry 231 to execute services orchestrated by edge services controller 28. Processing circuitry 231 may represent any combination of processing cores, ASICs, FPGAs, or other integrated circuits and programmable hardware. In an example, processing circuitry may include a System-on-Chip (SoC) having, e.g., one or more cores, a network interface for high-speed packet processing, one or more acceleration engines for specialized functions (e.g., security/cryptography, machine learning, storage), programmable logic, integrated circuits, and so forth. Such SoCs may be referred to as data processing units (DPUs). DPUs may be examples of processing unit 25.

In the example NIC 230, processing unit 25 executes an operating system kernel 237 and a user space 241 for services. Kernel 237 may be a Linux kernel, a Unix or BSD kernel, a real-time OS kernel, or other kernel for managing hardware resources of processing unit 25 and managing user space 241.

Services 233 may include network, security (e.g., a distributed firewall service), storage, data processing, co-processing, machine learning or other services. Services 233, edge services platform (ESP) agent 236, and fabric service 235 include executable instructions. Processing unit 25 may execute instructions of services 233, ESP agent 236, and fabric service 235 as processes and/or within virtual execution elements such as containers or virtual machines. As described elsewhere in this disclosure, services 233 may augment the processing power of the host processors (e.g., microprocessor 210), e.g., by enabling computing device 200 to offload packet processing, security, or other operations that would otherwise be executed by the host processors. Services 233 may also provide security at the edge. Network services of services 233 may include security services (e.g., a distributed firewall), policy enforcement, proxy, load balancing, or other L4-L7 services.

Processing unit 25 executes ESP agent 236 to exchange data with edge services controller 28 (FIG. 1) for the edge services platform. While shown in the example of FIG. 2 as being in user space 241, in other examples, ESP agent 236 is a kernel module of kernel 237. As an example, ESP agent 236 may collect and send telemetry data to edge services controller 28. The telemetry data may be generated by services 233 and may describe traffic in the network, availability of computing device 200 or network resources, resource availability of resources of processing unit 25 (such as memory or core utilization), or other information. As another example, ESP agent 236 may receive, from edge services controller 28, service code to execute any of services 233, service configuration to configure any of services 233, packets or other data for injection into the network.

Edge services controller 28 manages the operations of processing unit 25 by, e.g., orchestrating and configuring services 233 that are executed by processing unit 25, deploying services 233; adding, deleting, and replacing NICs within the edge services platform, monitoring of services 233 and other resources on NIC 230, and managing connectivity between various services 233 running on NIC 230. Example resources on NIC 230 include memory 227 and processing circuitry 231.

Processing circuitry 231 executes fabric service 235 to perform packet switching among NIC 230 and one or more other NICs that are directly connected to NIC 230 ports, i.e., not via an external switch such as TOR switches 16. Edge services controller 28 may provide topology information to fabric service 235 via ESP agent 236, the topology information describing a topology of NIC fabric 23. Edge services controller 28 may provide flow information and/or forwarding information to fabric service 235 via ESP agent 236. The flow information describes, and is usable for identifying, packet flows. The forwarding information is usable for mapping packets received by NIC 230 to an output port of NIC 230. In some cases, fabric service 235 may independently compute forwarding information and/or flow information.

Fabric service 235 may determine processing and forwarding of packets received at NIC 230 and bridged by Ethernet bridge 234 to processing unit 25. A packet received by NIC 230 may have been sent to NIC 230 from a NIC of another computing device or may have originated from user space 245 of computing device 200. Like other services 233 of NIC 230, fabric service 235 may process a received packet. Based on information received from edge services controller 28 or generated by fabric service 235, such as forwarding information and/or flow information, fabric service 235 may map the received packet to an output port that is directly coupled, via a communicate link, to another NIC in the NIC fabric.

Figure 3:
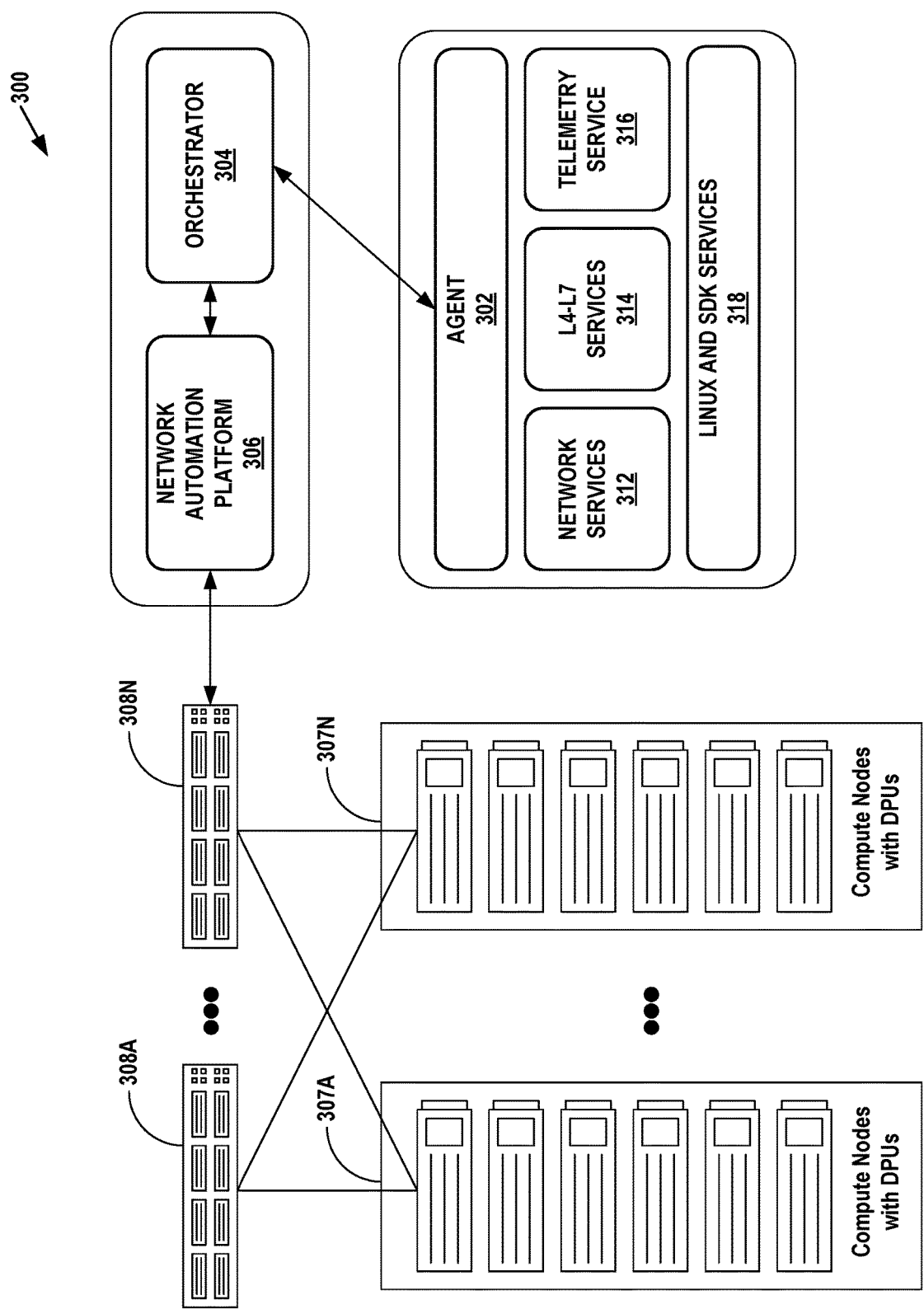
FIG. 3 is a conceptual diagram illustrating a data center with servers that each include a network interface card having a separate processing unit, controlled by an edge services platform, according to techniques of this disclosure.

FIG. 3 is a conceptual diagram illustrating a data center 300 with servers that each include a network interface card having a separate processing unit, controlled by an edge services platform, according to techniques of this disclosure. Racks of compute nodes 307A-307N (collectively, "racks of compute nodes 307") may correspond to servers 12 of FIG. 1, and switches 308A-308N (collectively, "switches 308") may correspond to the switches of switch fabric 14 of FIG. 1. An agent 302 or orchestrator 304 represents software executed by the processing unit (illustrated in FIG. 3 as a data processing unit or DPU) and receives configuration information for the processing unit and sends telemetry and other information for the NIC that includes the processing unit to orchestrator 304. Network services 312, L4-L7 services 314, telemetry service 316, and Linux and software development kit (SDK) services 318 may represent examples of services 233. Orchestrator 304 may represent an example of edge services controller 28 of FIG. 1.

Network automation platform 306 connects to and manages network devices and orchestrator 304, by which network automation platform 306 can utilize the edge services platform. Network automation platform 306 may, for example, deploy network device configurations, manage the network, extract telemetry, and analyze and provide indications of the network status.

Figure 4:
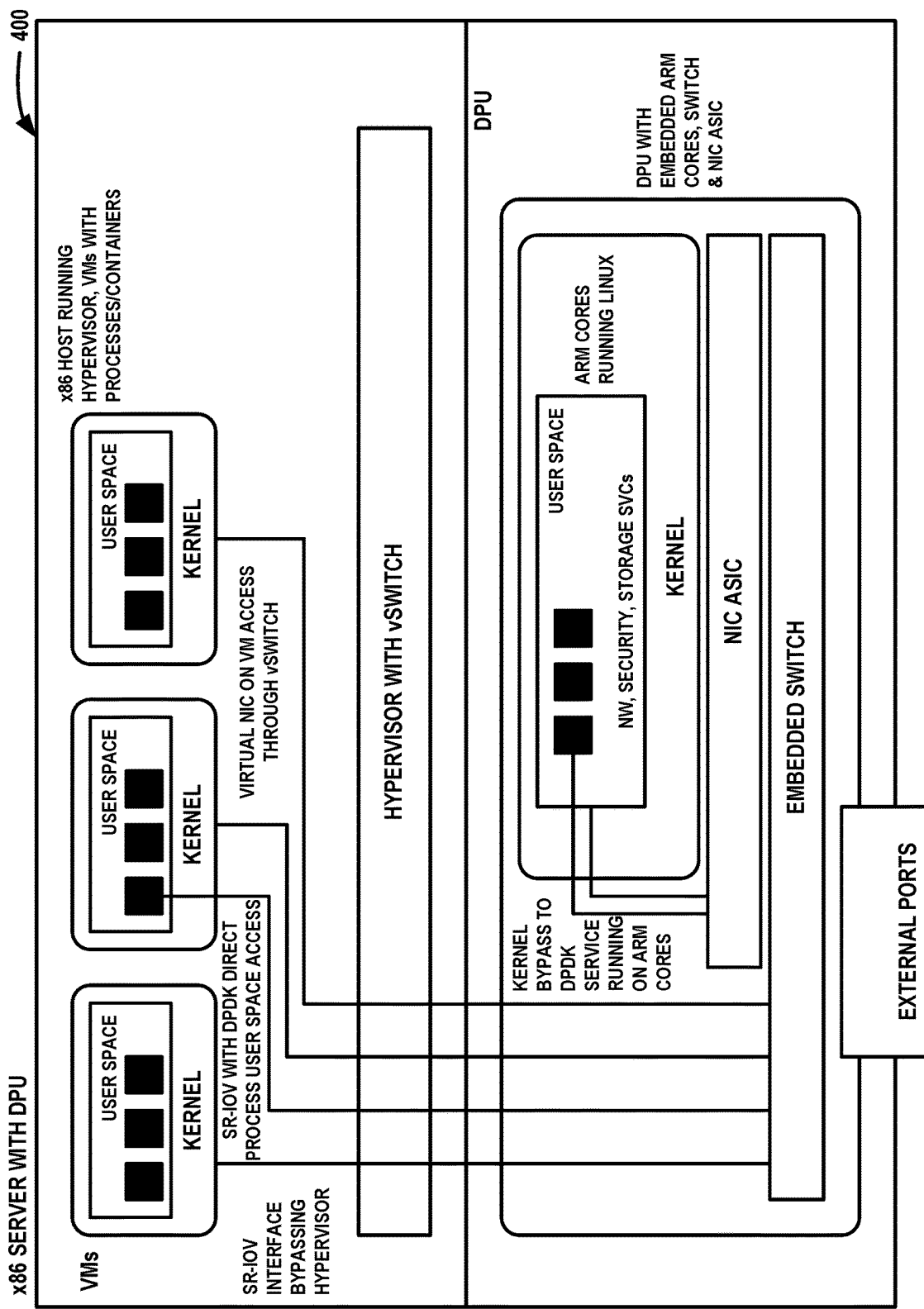
FIG. 4 is a block diagram illustrating an example computing device that uses a network interface card having a separate processing unit, to perform services managed by an edge services platform according to techniques described herein.

FIG. 4 is a block diagram illustrating an example computing device that uses a network interface card having a separate processing unit, to perform services managed by an edge services platform according to techniques described herein. Although virtual machines are shown in this example, other instances of computing device 400 may also or alternatively run containers, native processes, or other endpoints for packet flows. Different types of vSwitches may be used, such as Open vSwitch or a virtual router (e.g., Contrail). Other types of interfaces between endpoints and NIC are also contemplated, such as tap interfaces, veth pair interfaces, etc.

Figure 5:
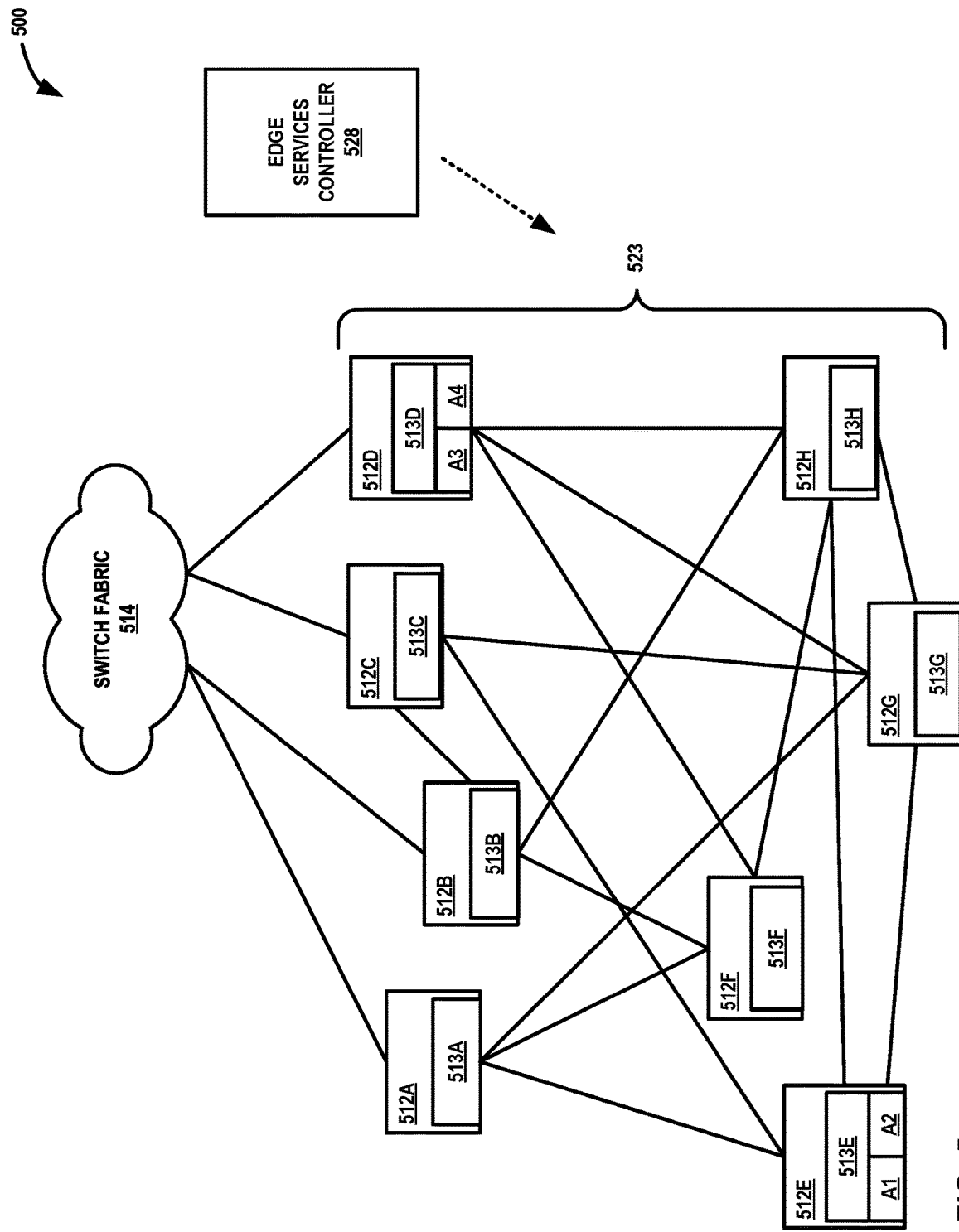
FIG. 5 a block diagram illustrating an example system, according to techniques of this disclosure.

FIG. 5 is a block diagram illustrating an example system 500, according to techniques of this disclosure. System 500 includes a plurality of servers 512A-512H (collectively, "servers 512") communicatively coupled via a NIC fabric 523 and a switch fabric 514. System 500 includes an edge services controller 528. Each of the plurality of servers 512A-512H may include a corresponding one of NICs 513A-513H (collectively, "NICs 513"). The NIC fabric 523 includes NICs 513. The NIC fabric 523 may include a plurality of potential data paths between pairs of NICs 513 that do not traverse switches of switch fabric 514. Each of these "data paths" is a path through NIC fabric 523 from a source NIC to a destination NIC, and this term is distinct from datapath processing. Edge services controller 528 may be communicatively coupled to each of NICs 513 in NIC fabric 523. NIC fabric 523 is communicatively coupled to switch fabric 514. Switch fabric 514 may include one or more switches.

Each of servers 512 may have a configuration similar to the configuration of computing device 200. Each of NICs 513 may have a configuration similar to the configuration of NIC 230. Edge services controller 528 may be similar to edge services controller 28. While eight servers 512 and eight NICs 513 are shown in the example system 500 of FIG. 5, alternative examples of systems may include a fewer or a greater number of servers 512 and NICs 513. While each server is shown as including a single NIC, alternative examples of the system may include servers with more than one NIC.

Servers 512 may execute one or more applications. In an example, the one or more applications may be server applications hosted by servers 512 and may represent endpoints, as described with respect to FIG. 1. In an example, the one or more applications may be NIC applications executed by processing units of NICs 513. The implementation of data paths between two different NICs at two different servers may involve two stages. The first stage may be an orchestration stage and the second stage may be a forwarding stage. Edge services controller 528 may define or orchestrate one or more data paths between the two different NICs at two different servers during the orchestration stage. Edge services controller 528 may provide data path data associated with the orchestrated data paths to NICs in the data paths. NICs in the orchestrated data paths may forward data packets in accordance with the orchestrated data paths during the forwarding stage. Data path data may be an example of forwarding information described with respect to FIG. 1.

The implementation of the orchestration stage and the forwarding stage will be described with reference to applications A1, A2 running on server 512E and applications A3, A4 running on server 512D. Applications A1, A2, A3, and A4 may be server applications (e.g., applications executed by the host processors) or may be NIC applications (e.g., applications executed by a processing unit on the NIC). In this example, application A1 and application A3 may be services of a service chain, and application A2 and application A4 may be services of a service chain.

Application A1 may be configured to generate application data for transport in data packets, and server 512E may be configured to send the data packets in accordance with a first protocol for transmission to application A3. Application A1 may be referred to as a first source application A1 and the application A3 may be referred to as a first destination application. Application A2 may be configured to generate application data for transport in data packets, and server 512E may be configured to send the data packets in accordance with a second protocol for transmission to application A4. Application A2 may be referred to as a second source application A2 and application A4 may be referred to as a second destination application. The second protocol may be different from the first protocol.

Examples of the first and second protocols include, but are not limited to, transport layer protocols or tunneling protocols (which may leverage transport layer protocols). The first protocol may for example be a VXLAN protocol. The second protocol may be for example, a Multiprotocol Label Switching/User Datagram Protocol (MPLSoUDP) protocol. While the example is described with reference to VXLAN and MPLSoUDP protocols, other protocols may be used. Server 512E, which includes source applications A1 and A2, may be referred to as a source server 512E. NIC 513E at source server 512E may be referred to as a source NIC 513E. Server 512D includes destination applications A3 and A4, and may be referred to as a destination server 512D. NIC 513D at destination server 512D may be referred to as a destination NIC 513D.

NICs 513 in NIC fabric 523 and edge services controller 528 may implement NIC-based data packet forwarding. In this environment, processing units 25 in NICs 513 may be shared by services running on associated servers 512 and NIC fabric 523. If all traffic between a set of two of servers 512 takes the same data path all the time, the traffic between the servers may overload NIC 513 and impact the services running on servers 512. For example, if traffic from application A1 to application A3 and traffic from application A2 to application A4 was forwarded on the same data path from source NIC 513E to destination NIC 513D, this may result in relatively high utilization of resources of any NICs 513 along that data path and adversely affect performance.

Edge services controller 528 may address this problem by implementing "service aware" or "application-based" routing of the data packets. Edge services controller 528 may orchestrate the application-based data path and one or more of NICs 51 forward data packets in accordance with the orchestrated application-based data path for a pair of applications executing on servers 512 or NICs 513.

When an application (or service) is deployed at one of servers 512 or at one of NICs 513, edge services controller 528 may be provided with data regarding the deployed application during the configuration of the deployed application. Examples of such data may include a protocol associated with the deployed application and the other applications that the deployed application may communicate with. Furthermore, when an application is deployed to a host (e.g., one of servers 512), edge services controller 528 may configure the application's preferred transport in NIC fabric 523. For example, if a first service (S1) and a third service (S3) use VXLAN to communicate with each other, and a second service (S2) and a fourth service (S4) use MPLSoUDP for communication, edge services controller 528 may configure NIC fabric 523 to ensure that each application's transport requirements are met. For example, edge services controller 528 may specify, e.g., in a flow table, outer header encapsulation for packets sent between services. The services may be running on top of a host OS or executed by processing units of NICs 513, or both. In some examples, edge services controller 528 may deploy the applications or devices to servers 512 using the techniques described elsewhere in this disclosure, e.g., based on local Service Level Agreements (SLAs) and external SLAs of NICs 513.

In an example where NIC 513E is a source NIC and NIC 513D is a destination NIC, NIC fabric 523 may include a number of different data paths between source NIC 513E and destination NIC 513D. Application of services 233 to packets may utilize compute and bandwidth resources at each of NICs in NIC fabric 523. In many cases, application of services 233 to packets may utilize a percentage of the total available computing resources at some of NICs 513 and the remaining percentage of computing resources may be available to implement data packet forwarding functions (e.g., fabric service 235). Each of NICs 513 in NIC fabric 523 may provide resource availability values that indicates available computing resources at that NIC 513 to edge services controller 528. Example types of resource availability values may include values indicating CPU utilization, network utilization, and so on. Edge services controller 528 may identify, based on the resource availability values, NICs 513 in NIC fabric 523 that are suitable to implement data packet forwarding functions. For example, edge services controller 528 may compare the resource availability values received from each of NICs 513 to a resource availability threshold value, or to compare resource availability of NICs 513 to one another, to identify NICs 513 in NIC fabric 523 that are suitable to implement data packet forwarding functions. Suitable NICs 513 may include NICs 513 that have sufficient computing resources in processing units 25 to apply a fabric service to an expected amount of traffic for the pair of applications communicating, a threshold amount of computing resources, or other criteria. Edge services controller 528 may use the identified NICs to orchestrate data paths between NICs in NIC fabric 523. When edge services controller 528 orchestrates a data path between a pair of NICs in NIC fabric 523, edge services controller 528 may provide data path data to NICs logically located along that data path to cause the NICs to forward data packets in accordance with the orchestrated data path.

Figure 6:
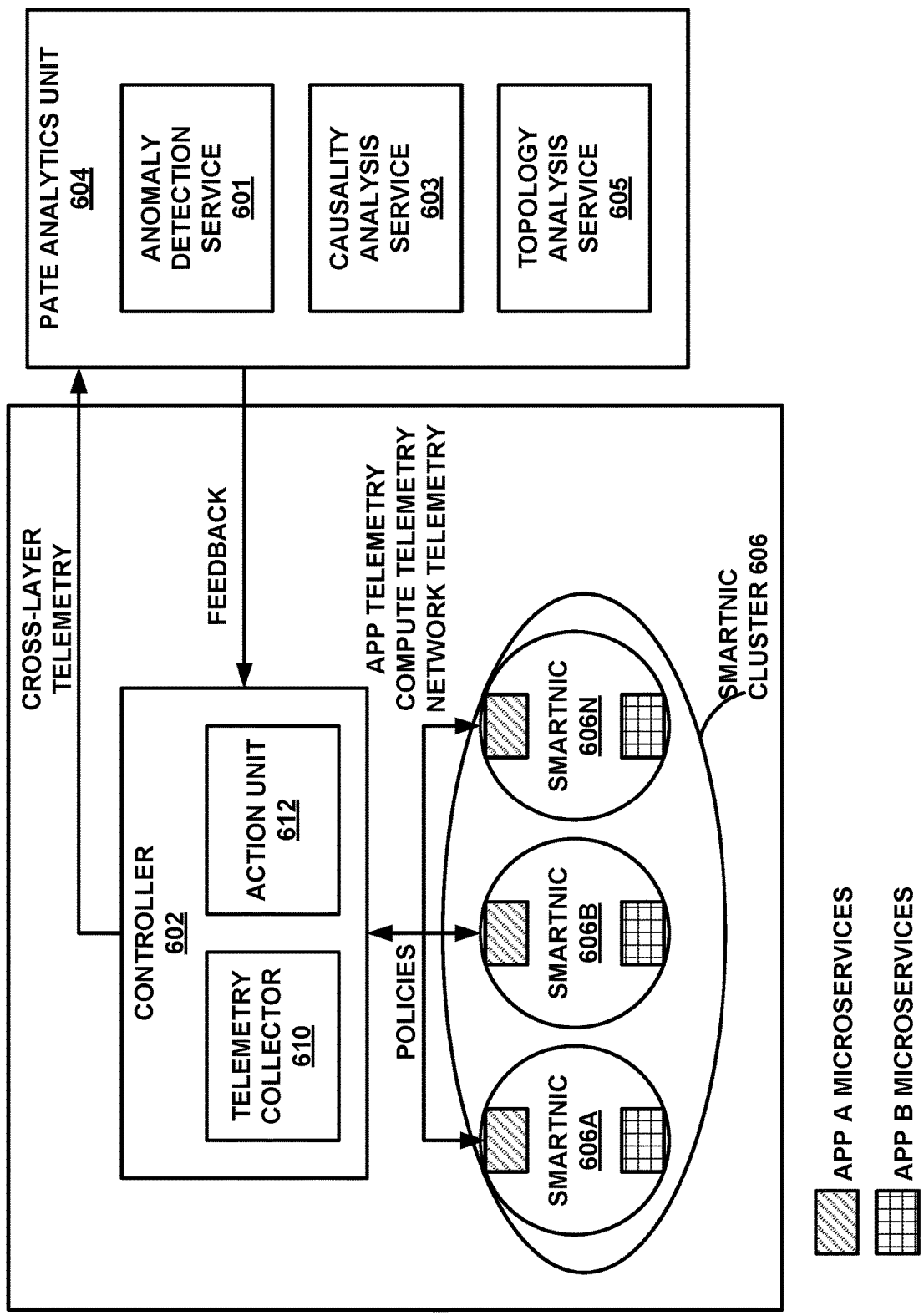
FIG. 6 is a conceptual diagram illustrating an example close-loop architecture for application-aware services in Smart network interface controllers (SmartNICs) according to one or more aspects of this disclosure.

FIG. 6 is a conceptual diagram illustrating an example close-loop architecture for application-aware services in SmartNICs according to one or more aspects of this disclosure. The close-loop architecture of FIG. 6 includes controller 602 and Performance Analysis and Troubleshooting Engine (PATE analytics unit) 604. Controller 602 may be an example of or part of edge services controller 28 of FIG. 1 or controller 24 of FIG. 1. PATE analytics unit 604 may be an example of or part of edge services controller 28, or may execute on a server or SmartNIC separate from controller 602.

For example, a Kubernetes cluster (e.g., SmartNIC cluster 606) may be created with SmartNICs 606A-606N, which may be examples of NICs 13 of FIG. 1, as regular worker nodes. Controller 602 may be configured to monitor applications that are executing on the SmartNICs (e.g., SmartNIC cluster 606), which may form a K8s cluster, along with the health of the SmartNIC infrastructure. Beside monitoring, controller 602 may also be configured to provision and manage different application-aware services that are provisioned on the SmartNIC-based worker nodes. For example, two services in controller 602, namely telemetry collector 610 and action unit 612, may be responsible for monitoring and management of the applications, respectively.

Figure 7:
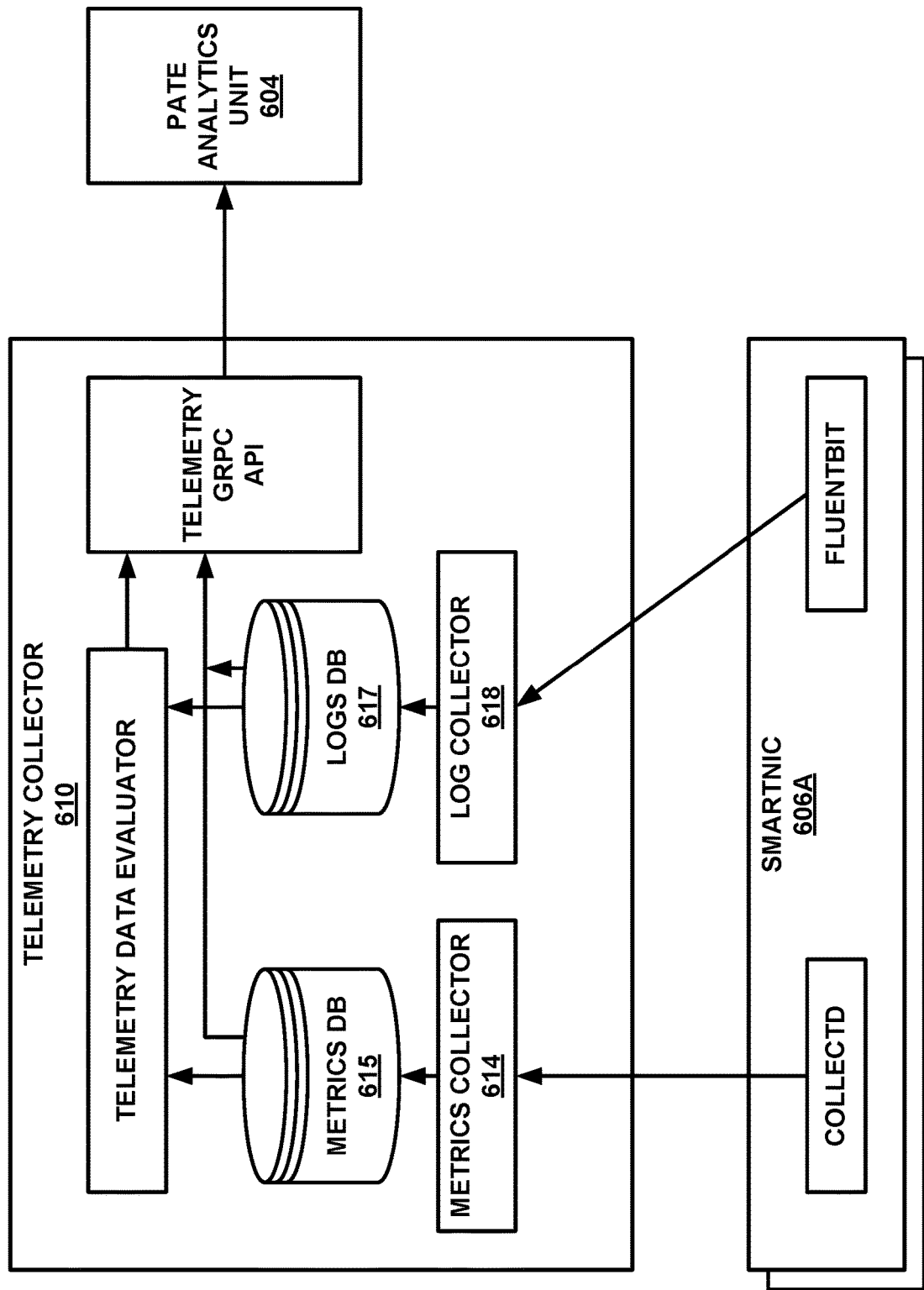
FIG. 7 is a block diagram illustrating an example telemetry collector architecture according to one or more aspects of this disclosure.

FIG. 7 is a block diagram illustrating an example telemetry collector architecture 610 in greater detail according to one or more aspects of this disclosure. As seen in FIG. 7, telemetry collector 610 collects logs and/or metrics from various software and/or hardware components present in the SmartNIC cluster 606, including SmartNIC 606A, which is being managed by Controller 602. Telemetry collector 610 may use a metrics collector 614, such as a Prometheus metrics collector. Telemetry collector 610 may also use a log collector 618, such as an Elasticsearch log collector, which may be an open-source log collector. Agents (not shown in FIG. 7) present in DPUs, service mesh, applications, and operating system(s) (OS) may export metrics and/or logs to metrics collector 614 and log collector 618, which may store the metrics and/or logs in at least one repository, such as a time series database (TSDB) (e.g., metrics DB 615 and/or logs DB 617). The collected telemetry information may eventually be consumed by PATE analytics unit 604 for further monitoring and troubleshooting purposes which are explained later in this disclosure.

Figure 8:
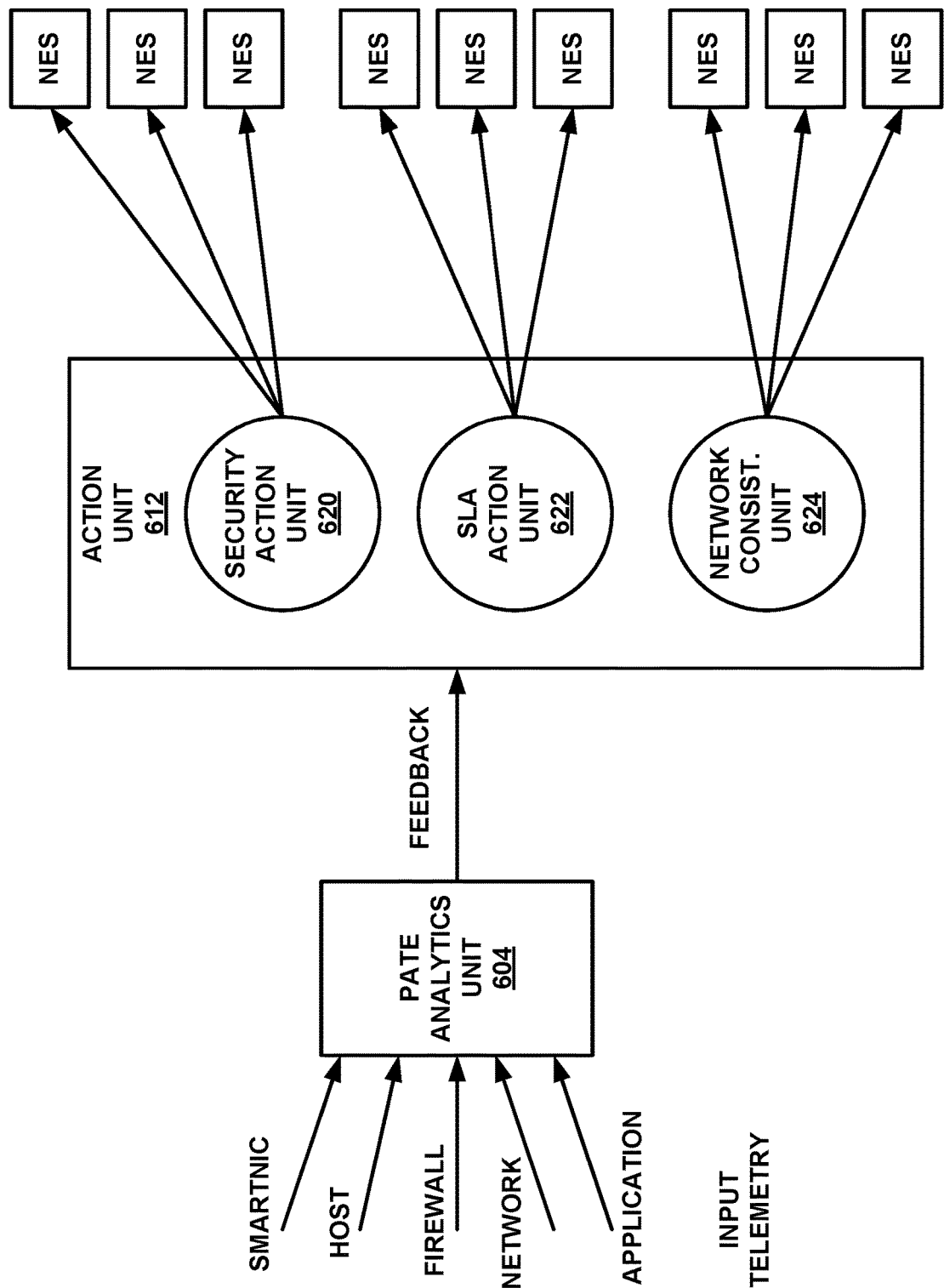
FIG. 8 is a block diagram illustrating an example action unit architecture according to one or more aspects of this disclosure.

FIG. 8 is a block diagram illustrating an example action unit 612 architecture in greater detail according to one or more aspects of this disclosure. As seen in FIG. 8, action unit 612 may be configured to determine a set of actions to be taken based on feedback received or obtained from PATE analytics unit 604. Examples of actions include, without limitation, applying dynamic security policies for a distributed firewall such as a containerized firewall executing on SmartNIC cluster 606, actions related to ensuring SLA requirement of the applications by offloading workloads on the SmartNICs (e.g., SmartNICs of SmartNIC cluster 606), or the like. For different use cases, such as security, or SLA, PATE analytics unit 604 may generate different types of actionable feedback. For each type of feedback, there may be corresponding plugins that are configured to generate a set of actions comprising of one or more actions that are to be performed on managed entities. As shown in FIG. 8, security action unit 620 may be configured to generate firewall policies for a distributed firewall hosted on the SmartNICs (e.g., SmartNICs of SmartNIC cluster 606). Similarly, SLA action unit 622 may be configured to dynamically offload workload(s) onto SmartNICs (e.g., SmartNICs of SmartNIC cluster 606) for performance improvement. Network consistency unit 624 may be configured to provide consistency across the configuration of managed entities, such as SmartNICs, switches, hosts, etc.

Figure 9:
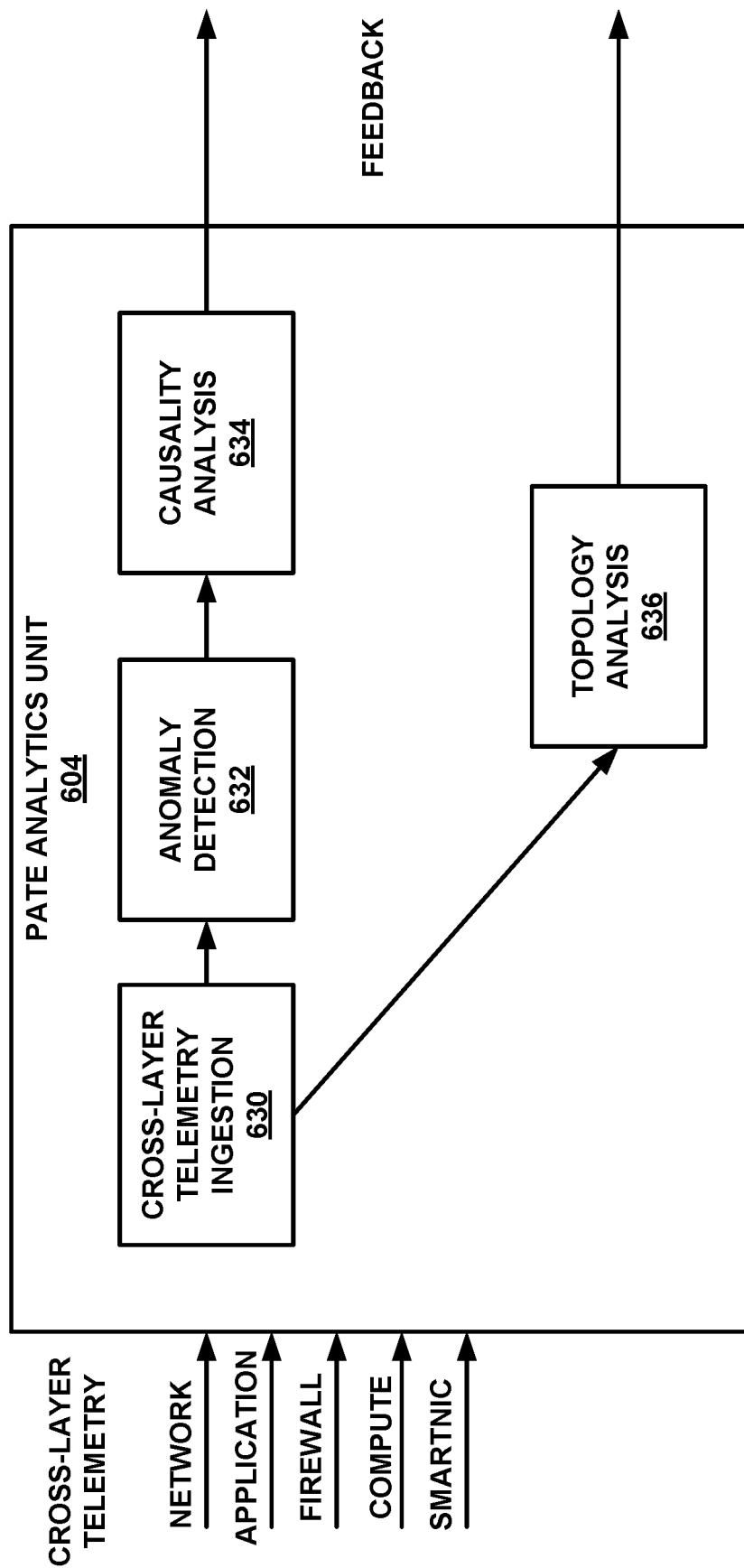
FIG. 9 is a block diagram illustrating an example performance analysis and troubleshooting engine (PATE) service unit architecture according to one or more aspects of this disclosure.

FIG. 9 is a block diagram illustrating an example PATE analytics unit 604 architecture in greater detail according to one or more aspects of this disclosure. PATE analytics unit 604 may be configured to collect and analyze application and underlying infrastructure performance telemetry for end-to-end observability and troubleshooting. Depending on the use case, PATE analytics unit 604 may generate actionable feedback that can be consumed by action unit 612 of controller 602 to take corrective steps to remediate the issue.

PATE analytics unit 604 may include cross-layer telemetry ingestion pipeline 630, anomaly detection service 632, causality analysis service 634, and topology analysis service 636. PATE analytics unit 604 may receive telemetry from multiple layers in the stack, e.g., application, network, compute, firewall, SmartNIC, etc. Cross-layer telemetry ingestion pipeline 630 may be configured to normalize the data model from multiple layers and persist in a TSDB (not shown in FIG. 9) for further analysis, such as by anomaly detection service 632, causality analysis service 634, and topology analysis service 636, as further described below.

Figure 10:
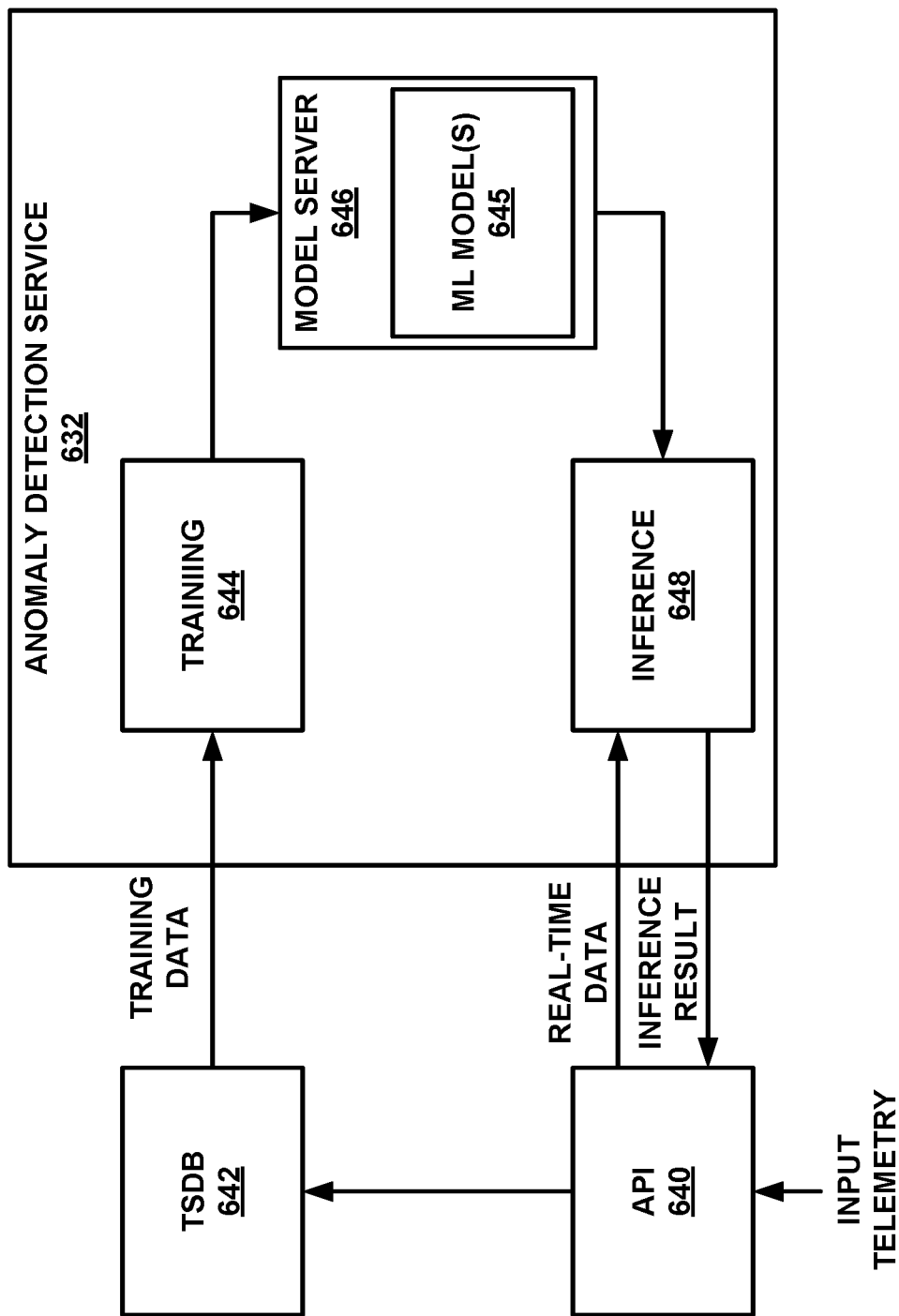
FIG. 10 is a block diagram illustrating an example anomaly detection pipeline according to one or more aspects of this disclosure.

FIG. 10 is a block diagram illustrating an example anomaly detection pipeline according to one or more aspects of this disclosure. Anomaly detection service 632 may include one or more machine learning model(s) 645, stored in model server 646. Anomaly detection service 632 may be configured to detect any anomalies in the received timeseries telemetry data from multiple layers in the stack. Anomaly detection service 632 may use, for example, an unsupervised learning-based random cut forest (RCF) approach for detecting any deviation from expected behavior, and/or other unsupervised learning models for detecting anomalies in the received timeseries telemetry data.

Telemetry data from multiple sources across application, compute, and network layers may be ingested by a REST API 640, e.g., a Kafka service, and then persisted into a TSDB 642, which may be a Thanos TSDB, for example. Training pipeline 644 may be configured to learn the baseline performance model of different key performance indicators (KPIs) across layers in a network. Model server 646 may be used to host the dynamically learned performance models (e.g., trained machine learning models of machine learning model(s) 645). During an inference phase, inference pipeline 648 may subscribe to KPI telemetry from API 640 and perform real-time inference for anomaly detection. Whenever an anomaly is detected, depending on the KPIs, an appropriate anomaly detection message indicative of the anomaly may be published on API 640, which may then be consumed by different subscriber services such as causality analysis service 634 (FIG. 9).

Referring back to FIG. 9, causality analysis service 634 may be configured to analyze cross-layer telemetry from the application layer to the network layer (and/or vice versa) to infer where a possible root cause may reside for troubleshooting purposes. For example, where each application includes multiple microservices that are communicating with each other, PATE analytics unit 604 may perform continuous monitoring of each instance of microservices and the interactions of each instance of microservices with other services. Causality analysis service 634 may be configured to determine the possible root cause of application performance degradation. In a microservice-based application, upstream microservice performance may be impacted by the performance of downstream applications. Causality analysis service 634 may analyze, for example, telemetry from each segment of the call sequence independently and help infer if any downstream microservice is a possible root cause of degraded end-to-end performance of an application.

Topology analysis service 636 may be configured to monitor any topology changes and generate feedback message(s) for consumers at any layer that is being monitored. A non-limiting example of a topology change is a deviation in the normal sequence of order of service calls in a microservice-based application. Topology analysis service 636 may analyze such deviations for each layer to determine topology changes. For example, topology analysis service 636 may determine: i.) a set of new nodes added; ii.) a set of nodes that are removed; iii) a set of new edges; and/or iv) a set of deleted edges. Such an analysis is useful for security use cases such as detection of unwarranted access to services by an intruding service. Topology analysis service 636 may generate an anomaly signal including any results of analysis and provide the anomaly signal as feedback to controller 602 to take remediation action, for example via action unit 612 (FIG. 8).

A self-correcting framework of this disclosure, such as that of FIG. 6, may dynamically detect different types of attacks and mitigate these attacks, for example, using a service mesh (e.g., Istio) based microservice application. This disclosure now discusses experiments using a distributed denial-of-service (DDOS) attacker, external attacker, and an internal attacker use cases.

According to the techniques of this disclosure, a system such as that of FIG. 6, may be configured to execute a machine learning model to determine a traffic prediction based on traffic session metrics data collected over a first period of time. The system may be configured to determine an anomaly in traffic based on a comparison of the traffic prediction to traffic session metrics data collected over a second period of time or at a second time (e.g., current traffic session metrics data). For example, the anomaly may represent a domain name service (DNS) attack, a TCP flood attack, etc. The system may be configured to, based on the determination of the anomaly, generate an indication of the anomaly. The system may be configured to use the indication of the anomaly to determine or generate a firewall policy that is configured to mitigate the anomaly.

Figure 11A:
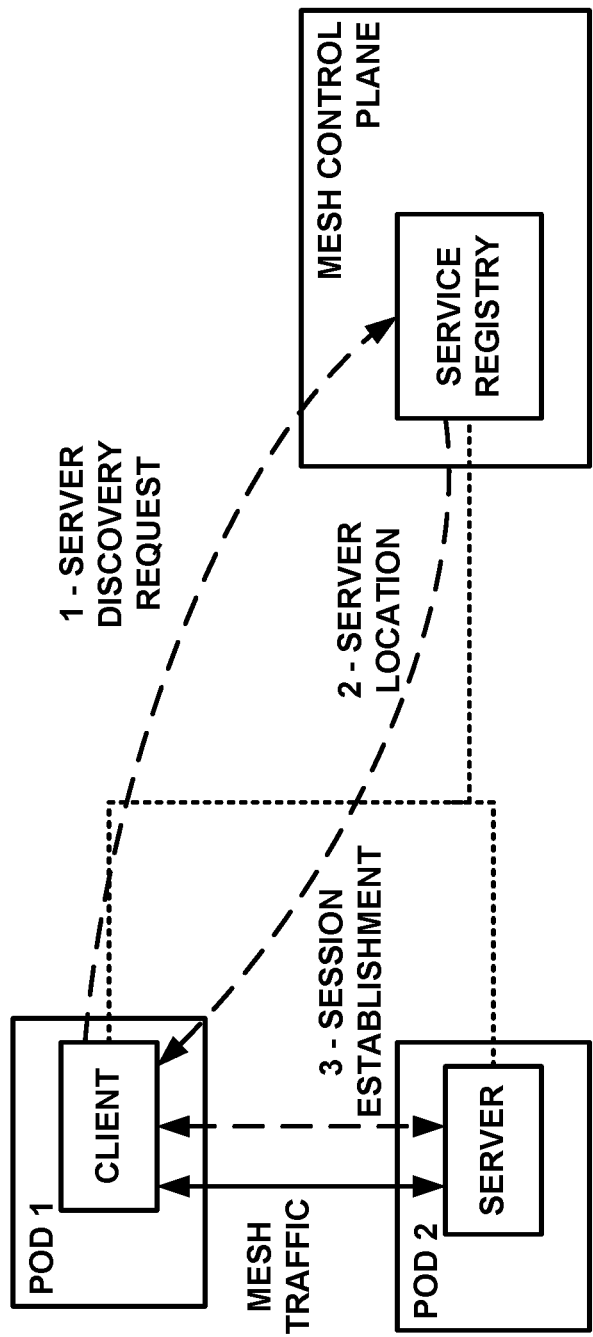
FIGS. 11A and 11B are conceptual diagrams illustrating example attacker attempts to block the service discovery control plane functionality of a service mesh according to one or more aspects of this disclosure.
Figure 11B:
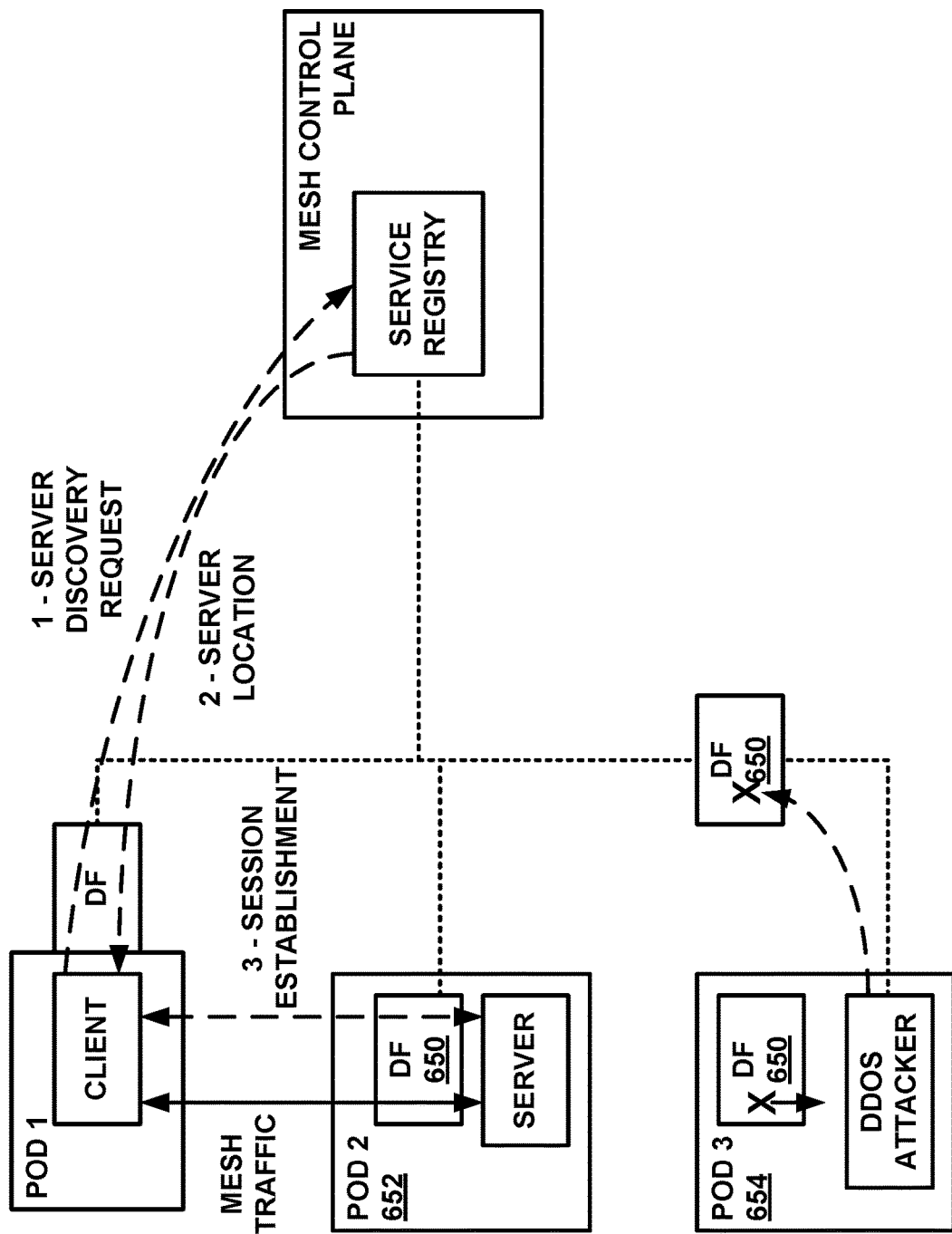

FIGS. 11A and 11B are conceptual diagrams illustrating example attacker attempts to block the service discovery control plane functionality of service mesh according to one or more aspects of this disclosure. For example, an attacker may attempt to block the service discovery control plane functionality of a service mesh (FIG. 11A). When successful, such an attack can bring the service mesh down due to failure of service discovery requests from other non-compromised services. Thus, a self-learning firewall policy enforcer may be desirable. An experimental service mesh set up involved a domain name service (DNS)-based service discovery technique on a Kubernetes platform. As shown in FIG. 11B, a distributed firewall (e.g., DF 650) may run on every SmartNIC (e.g., POD 1, POD 2, and POD 3) attached to every node of the Kubernetes platform. The distributed firewall may monitor service mesh traffic exiting out and entering each node of the Kubernetes cluster. The distributed firewall may export traffic session metrics to a TSDB (e.g., metrics DB 615 or the like) (not shown in FIGS. 11A-11B for simplicity purposes). PATE analytics unit 604 (also not shown in FIGS. 11A-11B for simplicity purposes) may analyze the exported session metric data from the TSDB to identify a flood of DNS service requests by a compromised pod 654 running on a Kubernetes node. PATE analytics unit 604 may perform such analysis in near real-time and as such, may detect anomalies in near real-time. In some examples, such as when real time learning is desired or needed, the distributed firewall may export traffic session metrics directly to PATE analytics unit 604 in addition to, or in lieu of exporting traffic session metrics to the time series database.

When a service mesh pod (e.g., compromised pod 654) sends a higher number of service discovery requests within a predetermined period of time than a regular service requests count, PATE analytics unit 604 may identify the sending of the higher number of service discovery requests within the predetermine period of time as an anomaly and notify controller 602 about the anomaly. The regular service requests count may be a number of service requests made by a service in normal cases, such as during a previous time period of a duration equal to the predetermined period of time. The regular service request count may be learned by a machine learning model of machine learning model(s) 645 of model server 646 (FIG. 10) of PATE analytics unit 604. For example, when a service runs for some period of time, the service may generate a pattern of numbers of service discovery requests in a timeline. This pattern, which may take the form of a range of service discovery request counts, may be learned by the machine learning model. Similar techniques to those discussed with respect to FIGS. 11A-11B may be similarly applied to identify a TCP flood attack as an anomaly.

In some examples, action unit 612 (FIG. 8) may dynamically create and/or select a distributed firewall policy to mitigate the anomaly. As shown in FIG. 11B, any traffic originating from the compromised service of pod 654 may be blocked by the distributed firewall.

Figure 12:
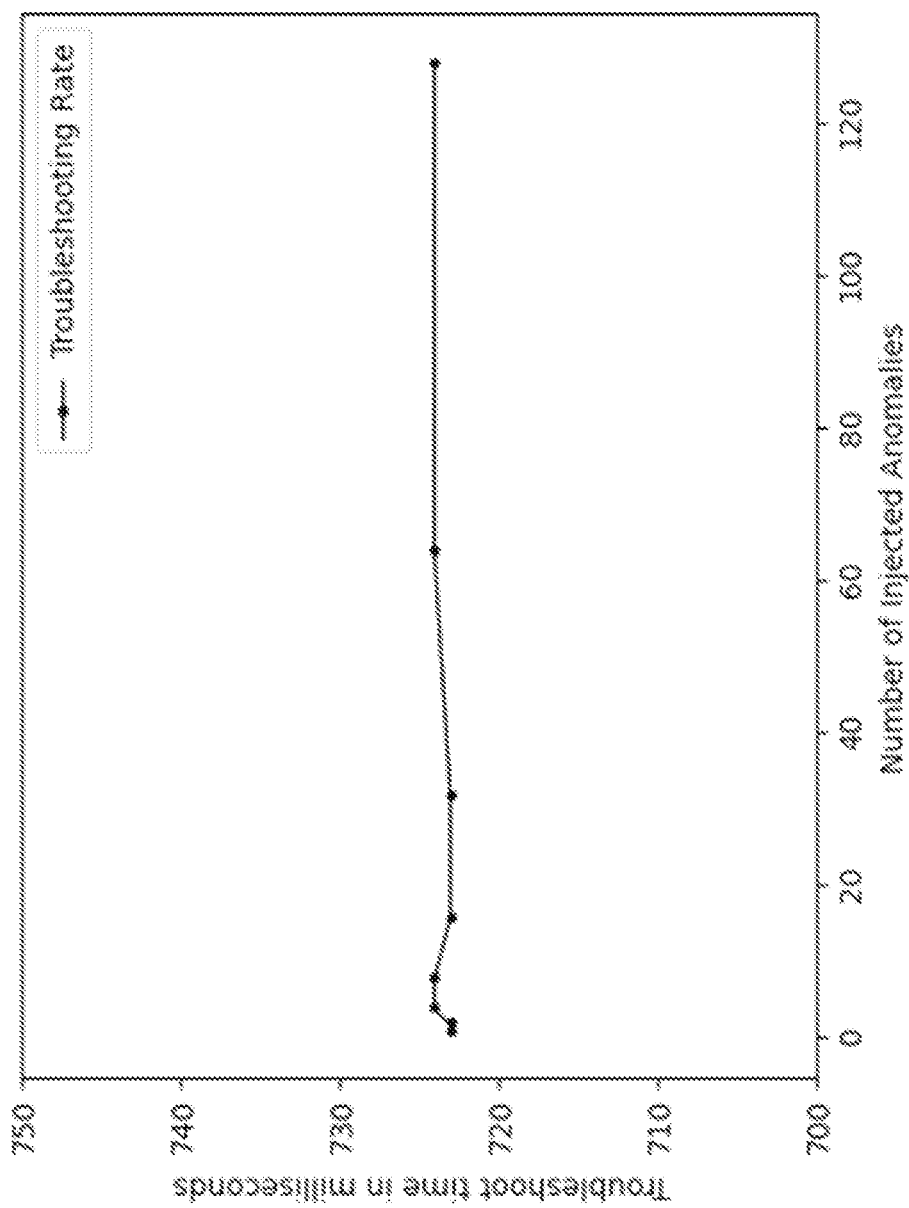
FIG. 12 is a graphical diagram illustrating example anomaly mitigation time as the number of attacks are increased according to one or more aspects of this disclosure.

FIG. 12 is a graphical diagram illustrating example anomaly mitigation time as the number of attacks are increased according to one or more aspects of this disclosure. As shown, PATE analytics unit 604 may detect and mitigate the anomalies almost instantly under some known pre-conditions, for example, when a machine learning model of machine learning model(s) 645 that PATE analytics unit 604 runs is an already trained model and the mitigation process includes pre-determined firewall rules for the distributed firewall.

FIG. 13 is a table illustrating example anomaly detection for service-discovery-dns-count-per-minute metric according to one or more aspects of this disclosure. The table of FIG. 13 show the performance of the anomaly detection service 632 of PATE analytics unit 604 (both of FIG. 9) described above. In this use case, PATE analytics unit 604 performs anomaly detection using an unsupervised learning model random cut forest. As seen in FIG. 13, model accuracy is overall about 98% with a high f-1 score of 97% for anomalies injected due to a DDOS attack as shown in FIG. 11B.

Figure 14:
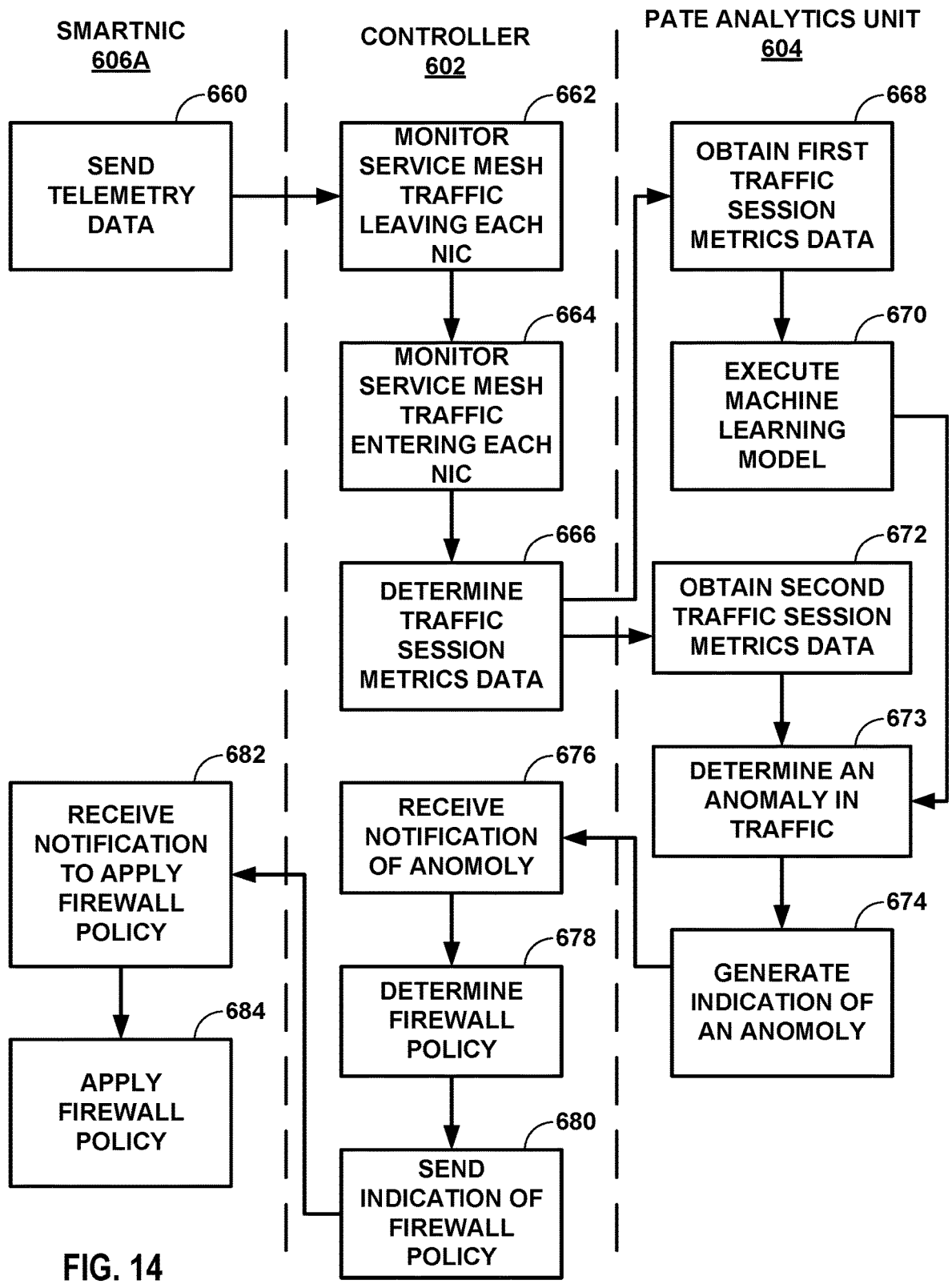
FIG. 14 is a flow diagram illustrating example anomaly detection according to one or more aspects of this disclosure.

FIG. 14 is a flow diagram illustrating example anomaly detection according to one or more aspects of this disclosure. The techniques of FIG. 14 are discussed as being performed by different portions of a system with respect to FIG. 6. Each portion of the system may perform those techniques attributed to the respective portion, or, in some examples, one or more techniques attributed to any one portion of the system may be performed by another portion of the system or combination of portions of the system.

SmartNIC 606A may send telemetry data to controller 602, the telemetry data including traffic session metrics data (660). For example, SmartNIC 606A may monitor telemetry associated with SmartNIC 606A and send telemetry data (e.g., metrics and/or logs) including traffic session metrics, such as a count of the number of DNS requests made by a virtual network endpoint of a host device of the SmartNIC 606A, to telemetry collector 610 of controller 602.

Telemetry collector 610 may monitor service mesh traffic leaving each NIC of a plurality of NICs, each of the NICs comprising NIC processing circuitry (662). For example, telemetry collector 610 may monitor service mesh traffic, represented in the telemetry data, leaving SmartNIC 606A and other SmartNICs of SmartNIC cluster 606. Telemetry collector 610 may monitor service mesh traffic entering each NIC (664). For example, telemetry collector 610 may monitor service mesh traffic, represented in the telemetry data, entering SmartNIC 606A and other SmartNICs of SmartNIC cluster 606.

Telemetry collector 610 may determine traffic session metrics data based on the mesh traffic exiting each NIC and the mesh traffic entering each NIC (666). For example, telemetry collector 610 may determine a number of DNS requests during various periods of time based on the mesh traffic leaving SmartNIC 606A and leaving SmartNIC 606A.

PATE analytics unit 604 may obtain first traffic session metrics data (668). For example, PATE analytics unit 604 may receive or retrieve first traffic session metrics data from telemetry collector 610.

PATE analytics unit 604 may execute a machine learning model to determine a traffic prediction based on first traffic session metrics data (670). For example, PATE analytics unit 604 may execute machine learning model(s) 645 (FIG. 10) to analyze the first traffic session metrics data, for example, to determine a prediction of an expected number of DNS requests. For example, machine learning model(s) 645 may be trained to predict traffic flow, such as a number of DNS requests by a virtual network endpoint of a host device that may be expected over a given predetermined period of time, and PATE analytics unit 604 may compare the number of DNS requests a virtual network endpoint of a host device in the predetermined period of time reflected in the traffic session metrics data to the expected number of DNS requests.

PATE analytics unit 604 may obtain second traffic session metrics data (672). For example, PATE analytics unit 604 may receive or retrieve second traffic session metrics data from telemetry collector 610. The second traffic session metrics data may correlate to traffic after traffic associated with the first traffic session metrics data.

PATE analytics unit 604 may determine an anomaly in traffic based on a comparison of the traffic prediction and the second traffic session metrics data (673). For example, PATE analytics unit 604 may determine that a number of DNS requests by a virtual network endpoint of a host device of the traffic session metrics data, within a predetermined period of time, is greater than a number of expected DNS requests for the predetermined period of time based on analysis of the traffic session metrics data.

PATE analytics unit 604 may, based on the determination of the anomaly, generate an indication of the anomaly (674). For example, PATE analytics unit 604 may generate an indication of an anomaly to provide to controller 602 and/or SmartNIC 606A.

Controller 602 may receive or otherwise obtain, from a machine learning model and based on the traffic session metrics data, an indication of an anomaly in traffic (676). For example, controller 602 may receive the indication of an anomaly generated by PATE analytics unit 604 in step 674.

Controller 602 may determine a firewall policy based on the indication of the anomaly (678). For example, controller 602 may select a firewall policy from among a plurality of existing firewall policies or generate a new firewall policy to address the anomaly.

Controller 602 may send an indication of the firewall policy to at least one of the one or more NICs (680). For example, controller 602 may send the indication of the firewall policy to SmartNIC 606A.

SmartNIC 606A may receive, from controller 602, an indication of a firewall policy based on a determination of an anomaly in traffic based on the traffic session metrics data (682). For example, SmartNIC 606A may receive the indication of the firewall policy from controller 602. SmartNIC 606A may implement the firewall policy (684). For example, if the indication of the firewall policy identifies an existing firewall policy stored in memory of SmartNIC 606A, SmartNIC 606A may load and execute the existing firewall policy. If the indication of the firewall policy includes a new firewall policy, SmartNIC 606A may store the new firewall policy in memory and/or execute the new firewall policy. In this manner, the techniques of FIG. 14 may stop a current DNS attack and/or prevent a future repetition of the DNS attack in real-time and/or near-real time.

In some examples, PATE analytics unit 604 may send the indication of the anomaly to a controller of a distributed firewall. For example, controller 602 may implement a controller of a distributed firewall. In some examples, the anomaly is indicative of a DNS attack or a TCP flood attack. In some examples, PATE analytics unit 604 may obtain the traffic session metrics data from a time series database (e.g., metrics database 615). In some examples, the second traffic sessions metrics data includes a number of domain name service requests by a virtual network endpoint of a host device within a period of time, and the traffic prediction includes an expected number of expected domain name service requests during the period of time. In some examples, as part of determining the anomaly, PATE analytics unit 604 may determine the number of domain name service requests by the virtual network endpoint of the host device of SmartNIC 606A within the period of time is greater than the number of expected domain name service requests. In some examples, the number of expected domain name service requests is based on domain name service requests made during operation over a previous time period (e.g., during regular operation). For example, the number of expected domain name service requests may be learned by a machine learning model such as an unsupervised random cut forest machine learning model. In some examples, the first traffic session metrics data and the second traffic session metrics data are indicative of service mesh traffic. In some examples, the first traffic session metrics data and the second traffic session metrics data are associated with one or more NICs. In some examples, the one or more NICs implement a distributed firewall.

In some examples, controller 602 may generate or select a firewall policy based on the indication of the anomaly. In some examples, the indication of the firewall policy comprises at least one of the firewall policy or an identification of the firewall policy.

In some examples, controller 602 may store the traffic session metrics data in a time series database (e.g., metrics database 615). In some examples, the traffic sessions metrics data includes a number of domain name service requests by a virtual network endpoint of a host device within a period of time, and the anomaly is indicative of the number of domain name service requests by the virtual network endpoint of the host device within the period of time being greater than a number of expected domain name service requests determined by the machine learning model. In some examples, the number of expected domain name service requests is based on domain name service requests made during a regular operation and is determined by a machine learning model. In some examples, controller 602 may select the firewall policy or generate the firewall policy.

In some examples, the traffic sessions metrics data includes a number of domain name service requests by a virtual network endpoint of a host device within a period of time, and the anomaly is determined by a machine learning model. In some examples, implementing the firewall policy causes SmartNIC 606A to cease sending domain name services requests from the virtual endpoint of the host device. In some examples, SmartNIC 606A implements an instance of a distributed firewall.

A mesh egress malware attack is now discussed. In this second use case, an attacker gains access to service mesh applications from outside, such as through a bug in the application or DevOps process, then the attacker can further proceed to attack external web servers, applications, and/or database systems. The attacker may try to steal data and transfer the data to the attacker's external servers. In some cases, attackers may try to download malicious code from their servers into the service mesh. All these cases may result in a change in the regular communication patterns of an application. In this use case, the self-correcting framework, such as that of FIG. 6, may detect this egress traffic attack and mitigate such an attack, for example, by isolating the compromised application pod using the distributed firewall. PATE analytics unit 604 may use topology analysis service 636 to detect and/or analyze any unwarranted change in application communication patterns. By using telemetry data of the service mesh, topology analysis service 636 may dynamically build a knowledge graph that captures the baseline application communication patterns and continuously monitors the knowledge graph evolution to find any suspicious topology changes.

Experimental results show that the self-correcting close loop framework using topology analysis service 636, at present, can detect and mitigate the anomalies under 4 minutes. However, the experiment demonstrated that with a real time or a near real time event-based design would further reduce the detection and troubleshooting time for this use case.

A mesh DDOS attack is now discussed. In this third use case, when a service mesh application pod is compromised, an attacker can use the compromised pod to generate malicious traffic to cause some or all the services of the mesh to become unavailable. Though service mesh implementations provide some techniques to prevent these kinds of attacks, these techniques are mostly limited to layer 7 and limited to lower bandwidth traffic.

Similar to the approach for the second use case, PATE analytics unit 604 uses topology analysis service 636 to detect the DDOS attacks. In the experimental set up, self-correcting framework was able to detect the anomalies in the order of minutes.

Figure 15:
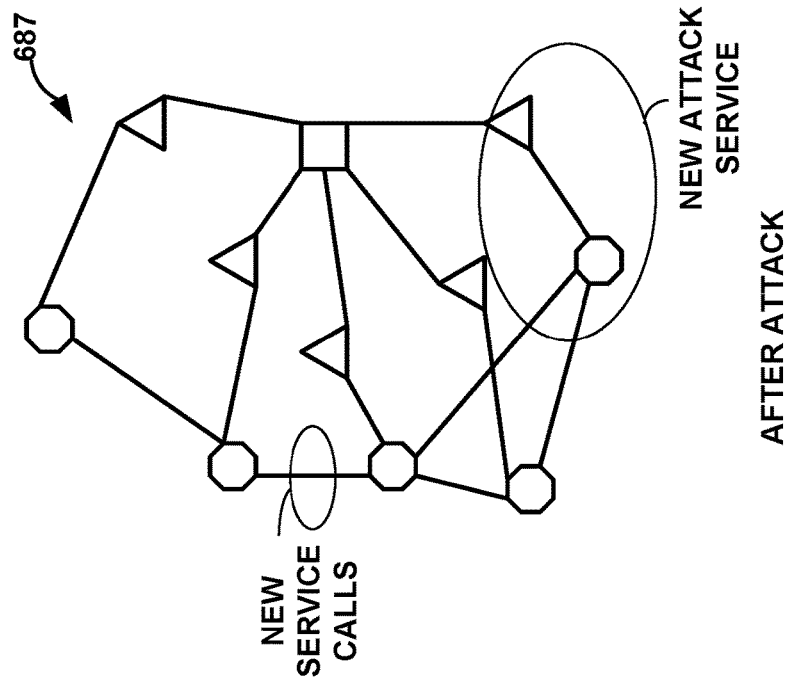
FIG. 15 is a conceptual diagram illustrating example application communication topology before and after an attack according to one or more aspects of this disclosure.
Figure 15:
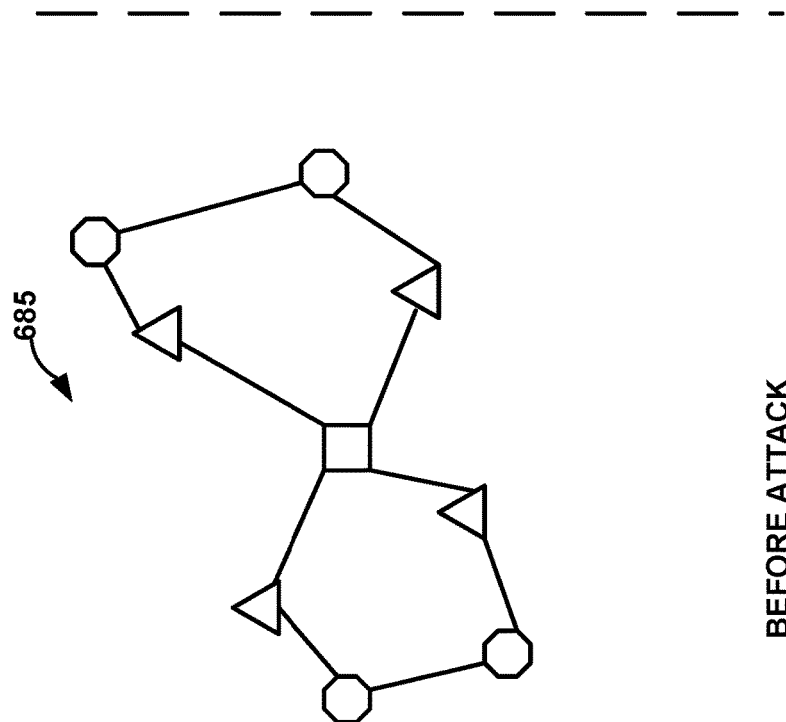
Figure 15:
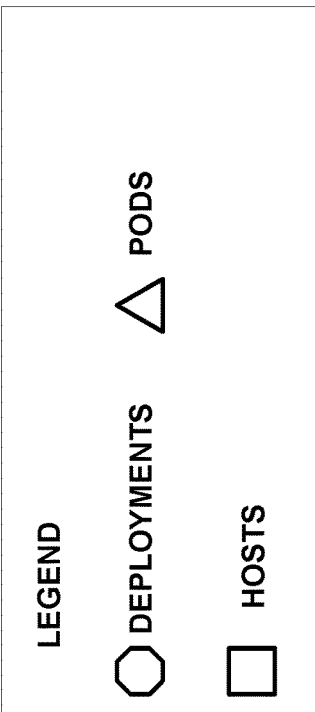

Additional use cases for a closed-loop framework for implementing application-aware services using SmartNICs are now described. FIG. 15 is a conceptual diagram illustrating example application communication topology before and after an attack according to one or more aspects of this disclosure. For example, communication topology 685 depicts communication pathways between a host, pods, and deployments in a network. Communication topology 687 depicts communication pathways between a host, pods, and deployments after an attack. The attack may cause new service calls between deployments and/or new deployments.

The popularity of SmartNICs may be due to the ability of a SmartNIC to perform packet processing in hardware (e.g., a DPU). This ability allows an application to offload some of the application's packet processing to a DPU, which may improve throughput and packet latency, thus accelerating application workflows. However, the hardware resources in a DPU are limited. For example, the number of flow entries may be limited to 4K (e.g., 4,096) on most DPUs. Other DPU resources, such as an encryption unit, RegEx processing, or the like, have their own limitations. To cut costs, most cloud providers run hundreds of customer applications on the same server. To improve overall system performance, care should be taken to not overwhelm a DPU. Current solutions allocate resources either manually or on a first-come, first-served basis, which may not be optimal.

This disclosure includes techniques to allocate DPU resources, using closed-loop monitoring and machine learning techniques to assign DPU resources as such resources are needed. For example, a system may accelerate applications if the applications are not able to meet their associated SLAs.

Figure 16:
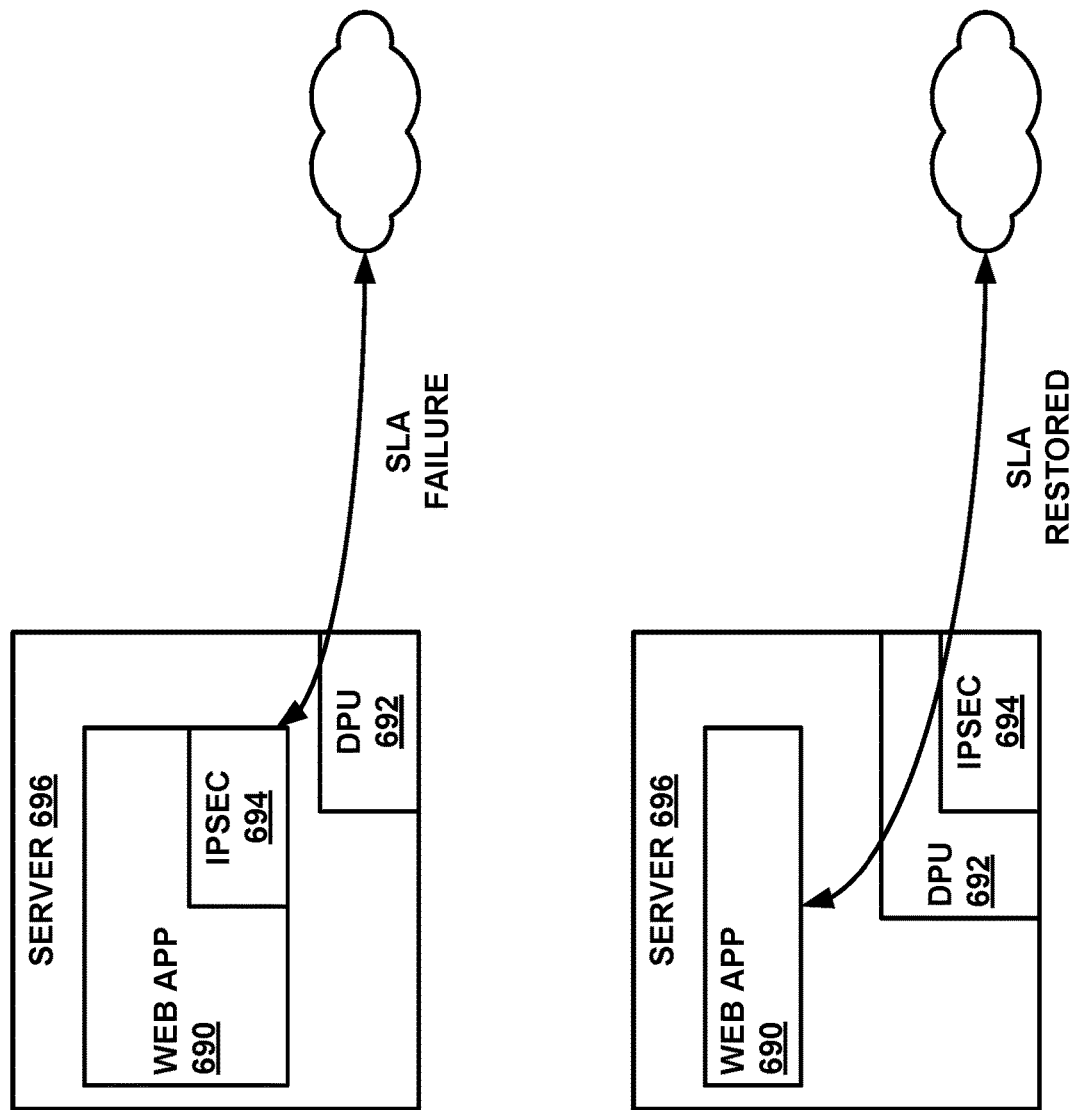
FIG. 16 is a conceptual diagram illustrating example auto-Service Level Agreement (SLA) enforcement techniques according to one or more aspects of this disclosure.

FIG. 16 is a conceptual diagram illustrating example auto-SLA enforcement techniques according to one or more aspects of this disclosure. PATE analytics unit 604 may be configured to accelerate an application, such as initiate the offload of portions of the applications or services, from processing circuitry of a server to processing circuitry of a SmartNIC (e.g., a DPU), based on the application not meeting requirements of an associated SLA. For example, a web application 690 may include or utilize encryption, such as IP security (IPSec 694). In an example, web application 690 may have an SLA requiring 10,000 active connections. PATE analytics unit 604 may continuously monitor the telemetry data of web application 690 and may enable cryptographic offload of IPSec 694 to DPU 692, for example, if the web application is dropping connections such that the total number of active connections falls below 10,000, thereby accelerating IPSec 694 to address the failure of web application 690 to meet the requirements of the associated SLA. Similar techniques may be used to dynamically enforce network throughput, packet latency, and/or other SLA requirements.

In some examples, PATE analytics unit 604 may continue to monitory the number of active connections and initiate the moving IPSec 694 back to the processing circuitry of the server if observes a level of improvement in drops of active sessions. For example, PATE analytics unit 604 may initiate offloading IPSec 694 from DPU 692 back to the processing circuitry of the server based on a number of drops or a ratio of drops to active connections or sessions meeting a threshold. In some examples, PATE analytics unit 604 may use one or more machine learning model(s) 645 to determine the threshold.

Figure 17:
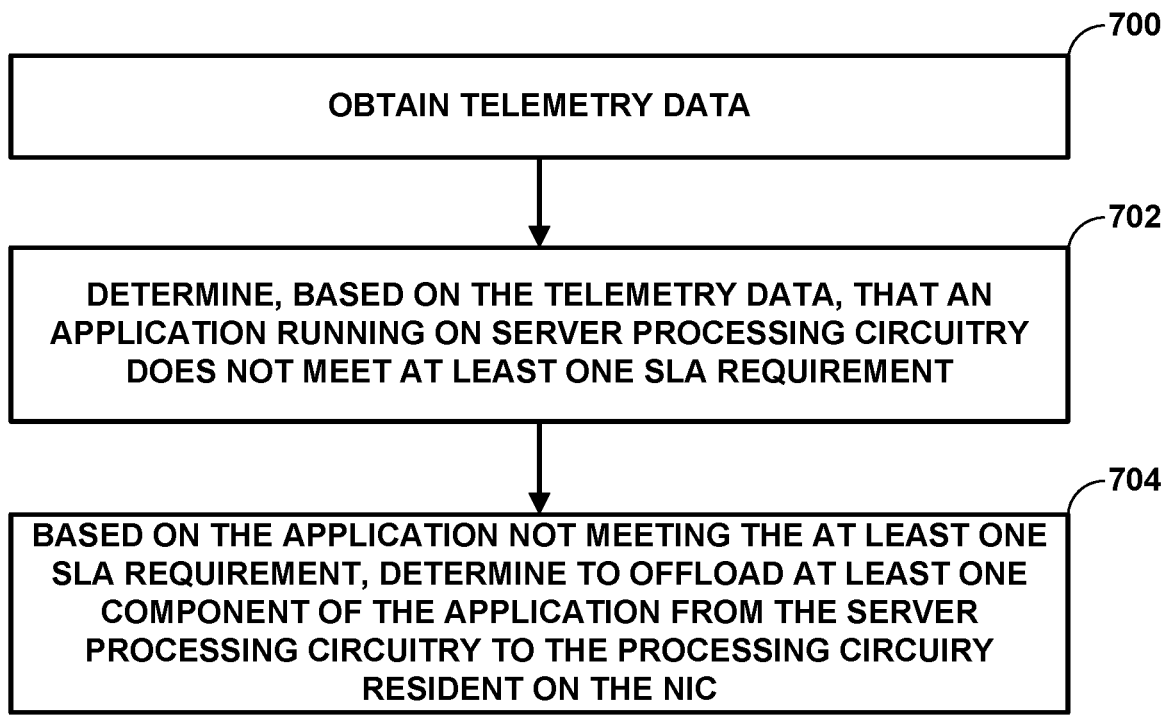
FIG. 17 is a flow diagram illustrating example offloading techniques according to one or more aspects of this disclosure.

FIG. 17 is a flow diagram illustrating example offloading techniques according to one or more aspects of this disclosure. PATE analytics unit 604 may obtain telemetry data (700). For example, PATE analytics unit 604 may retrieve or receive telemetry data associated with web application 690.

PATE analytics unit 604 may determine, based on the telemetry data, that an application running on server processing circuitry does not meet at least one service level agreement (SLA) requirement, the server processing circuitry not including processing circuitry resident on a network interface card (NIC) (702). For example, PATE analytics unit 604 may determine that web application 690 running on server 696 does not meet an SLA requirement.

PATE analytics unit 604 may, based on the application not meeting the at least one SLA requirement, determine to offload at least one component of the application from the server processing circuitry to the processing circuitry resident on the NIC (704). For example, PATE analytics unit 604 may determine to offload IPSec 694 from server 696 processing circuitry onto processing circuitry of DPU 692.

In some examples, the at least one SLA requirement includes at least one of a number of active connections, a network throughput, or a packet latency. In some examples, the at least one component comprises a cryptographic function. In some example, PATE analytics unit 604 may send a first notification indicative of the determination to offload the at least one component of the application from the server processing circuitry to the processing circuitry resident on the NIC to at least one of the server (e.g., server 696) or a controller (e.g., controller 602). In some examples, server 696, responsive to the first notification, may offload the at least one component of the application from the server processing circuitry to the processing circuitry resident on the NIC.

In some examples, PATE analytics unit 604 may determine, based on the determination to offload the at least one component of the application from the server processing circuitry to the processing circuitry resident on the NIC and based on the analysis of the telemetry data, that the application meets the at least one SLA requirement. PATE analytics unit 604 may determine that a property of the application relating to the at least one SLA requirement meets a threshold. PATE analytics unit 604 may, based on the property of the application meeting the threshold, determine to move the at least one component of the application from the processing circuitry resident on the NIC to the server processing circuitry. In some examples, PATE analytics unit 604 may execute a machine learning model (e.g., machine learning model(s) 645) to determine the threshold. In some examples, the property of the application comprises a number of drops in a predetermined period of time or a ratio of drops to active connections or sessions during a predetermined period of time.

In some examples, PATE analytics unit 604 may send a second notification indicative of the determination to move the at least one component of the application from the processing circuitry resident on the NIC to the server processing circuitry to at least one of the server or the controller. In some examples, server 696 may, responsive to the second notification, move the at least one component of the application from the processing circuitry resident on the NIC to the server processing circuitry.

Figure 18:
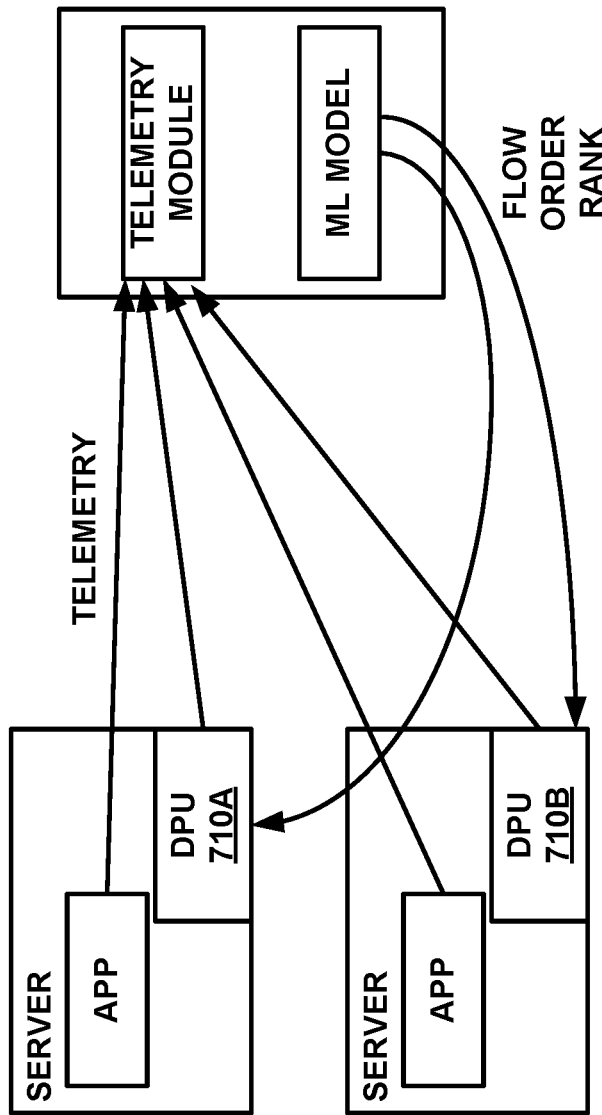
FIG. 18 is a conceptual diagram illustrating example self-learning flow priority techniques according to one or more aspects of this disclosure.

FIG. 18 is a conceptual diagram illustrating example self-learning flow priority techniques according to one or more aspects of this disclosure. One of the popular services deployed by many users in a SmartNIC environment is a distributed firewall. Policing East-West traffic in a datacenter, where traffic rate may be on the order of 100×Tbps, may be difficult for network administrators. Running a firewall on a SmartNIC may solve this problem by policing the traffic at a host instead of in the network. Typically, a firewall works by applying all configured policies for each incoming and outgoing packet to determine if the packet should to be permitted or denied. Because applying every policy for every packet may be exceedingly time consuming, to speed up processing, a firewall may create a flow table entry for each new flow and use cached information in the flow table to process future packets of that flow. For example, the firewall may apply multiple policy lookups to every first packet of a flow. The firewall may skip the multiple policy lookups for the subsequent packets of the flow, but such subsequent packets may still go through the flow processing stage (e.g., looking up the subsequent packets in the flow table). This whole sequence of lookups may also be time consuming and may take up significant amount of CPU resources, which may limit the overall throughput of a firewall.

As such, to improve firewall throughput, a distributed firewall may analyze flows where flow processing is performed based on a flow's criticality or importance. For example, one or more machine learning models 645 of PATE analytics unit 604 may learn each application's flows and rank each application in the order of the importance of the application, such as in terms of weights. For example, PATE analytics unit 604 may predict the weight of flows based on the criteria set forth below. As such, the techniques described herein may improve firewall throughput. For example, rather than handle flow processing for each subsequent packet of a flow, a firewall may perform flow processing based on flow criticality or importance. Using dynamic telemetry data, one or more machine learning models 645 may learn each application's flows and rank the flows in an order based on importance of the respective flow. Example criteria which may be used to determine a flow ranking based on importance include, but are not limited to, flow hit rate, hit rate of related flows, flow close missed rate, flow metric criticality, or the like.

Flow Hit Rate (FHR) may be a number of successful firewall flow evaluations out of a total number of evaluations. For example, FHR may be calculated as:
FHR=Number of Successful Flow Evaluations/Total Number of Evaluations Related Flow Hit Rate (RFHR) may be an average of hit rate of flows related to the flow. For example, if two flows contain commonality in any of the below attributes, those two flows may be considered as related flows. Such attributes may include, source address, destination address, source port, destination port, protocol, or the like. For example, RFHR may be calculated as:
RFHR=(Total Hit Rate of all related flows)/(Total Number of Evaluations of all related flows). In some example, the flow itself may be excluded when calculating RFHR.

Flow Close Missed Rate (FCMR) may be a ratio of number of close miss evaluation of flows over a number of total flow evaluations. A close evaluation miss may be defined as a flow evaluation failure due to a mismatch of a user configured threshold number of attributes. For example, if flow has 5 attributes for evaluation and user configured a close miss threshold as 2. Then, if flow evaluation failed due to mismatch of 2 (or fewer) attributes, then flow evaluation will be considered as close miss evaluation. For example, FCMR may be calculated as
FCMR=(Number of Close Missed Evaluations)/(Total number of Evaluations).

Flow Criticality may be indicated by a flag. For example, a flag may be attached to a flow when any of the attributes involved in the flow is deemed to be a part of a critical event and flagged by user by labelling flow as critical at run time. For example, when user observes a suspicious security threat log event, the user may label all related flows as critical flows. When a flow is labelled as critical, the weight of the flow may be automatically set to a maximum. In such an example, the flow evaluator would prioritize the flow for evaluation.

Using above referenced analytics, PATE analytics unit 206 may determine or predict a weight for each flow. Depending on the weight of the flow, a flow processor of the distributed firewall may evaluate the flows. These analytics are performed periodically over the evaluation history and flow weight is predicted or updated. For example, if Flow Hit Rate is R1, the Related Flow Hit Rate is R2, the Flow Close Missed Rate is R3. PATE analytics unit 604 may predict or determine a flow weight using a linear regression formula and above calculated individual rates:
$W1 = a + b(R1)$
$W2 = a + b(R2)$
$W3 = a + b(R3)$
where $a = (\Sigma Wi)(\Sigma Ri^*2) - (\Sigma Ri)(\Sigma WiRi)/n(\Sigma Ri^*2) - (\Sigma Ri)2$
$b = n (\Sigma WiRi) - (\Sigma Ri)(\Sigma Wi)/n(\Sigma Ri^*2) - (\Sigma Ri^*)2$ PATE analytics unit 604 may then determine a mean of the predicted weights (W1, W2, and W3) as weight of the flow:
$WR = (\Sigma_{i=1}^{n} Wi)/n$ PATE analytics unit 604 may send flow order rank to the distributed firewall. The flow processor of the distributed firewall may evaluate the flows based on these dynamically predicted weights.

As shown in FIG. 18, the example closed-loop system may determine a ranking and provide the ranking back to a firewall module (e.g., DPUs 670A-670B). The distributed firewall may in turn process each flow proportional to the flow ranking. For example, the firewall may process a higher ranked flow more often than a lower ranked flow. This may reduce the number of flows the firewall needs to process for each packet, which may increase the firewall throughput. Based on the above calculated analytical metrics, a weight factor can be calculated for every flow to indicate the priority and importance of the flow. The higher weight factor may indicate a higher priority, and that the higher priority flow should be processed first and/or more frequently than other flows having lower weight. This technique of dynamic priority prediction for flows also enables the distributed firewall to process the flows in any order rather than only on descending order. That means, the flow processor can pick flows in the inverse order of their weights. This may cause most failed flows to be evaluated on priority.

Figure 19:
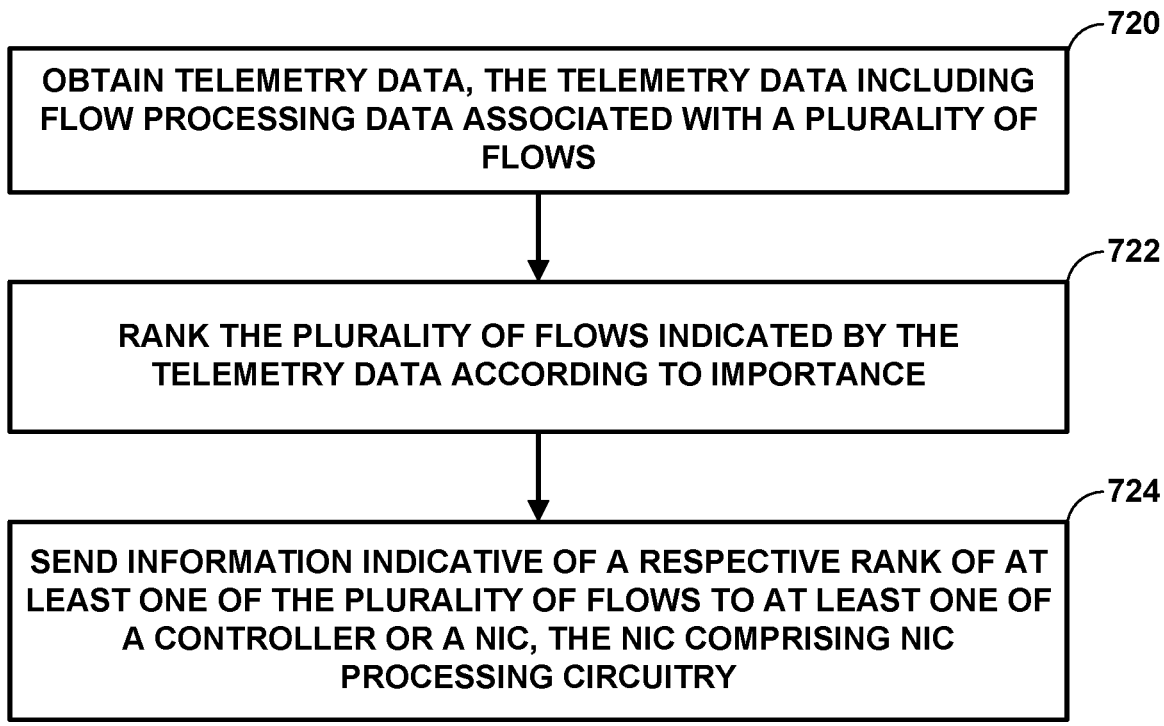
FIG. 19 is a flow diagram illustrating example flow ranking techniques according to one or more aspects of this disclosure.

FIG. 19 is a flow diagram illustrating example flow ranking techniques according to one or more aspects of this disclosure. PATE analytics unit 604 may obtain telemetry data, the telemetry data including flow processing data associated with a plurality of flows (720). For example, PATE analytics unit 604 may retrieve or receive the telemetry data from controller 602.

PATE analytics unit 604 may rank the plurality of flows indicated by the telemetry data according to importance (722). For example, PATE analytics unit 604 may assign a respective ranking to each flow of the plurality of flows. The respective ranking may represent a determined level of relative importance of the respective flow.

PATE analytics unit 604 may send information indicative of a respective rank of at least one of the plurality of flows to at least one of a controller or a network interface card (NIC), the NIC comprising NIC processing circuitry (724). For example, PATE analytics unit 604 may send the respective rank of one or more of the plurality of flows to controller 602 or SmartNIC 606A.

In some examples, as part of ranking the plurality of flows indicated by the telemetry data according to importance, PATE analytics unit 604 may, for each respective flow of the plurality of flows, determine importance criteria, the importance criteria including at least one of: a flow hit rate, wherein the flow hit rate includes a number of successful firewall flow evaluations for the respective flow out of a total number of evaluations for the respective flow during a time period; a related flow hit rate, wherein the related flow hit rate includes an indication of a number of successful firewall flow evaluations for one or more related flows to the respective flow out of a total number of evaluations for the one or more related flows during the time period; a flow close missed rate, wherein the flow close missed rate includes an indication of the number of failed firewall flow evaluations for the respective flow meeting an attribute threshold out of the total number of evaluations for the respective flow during the time period; or a flow criticality.

In some examples, as part of ranking the plurality of flows indicated by the telemetry data based on importance, PATE analytics unit 604 may determine a respective importance of each respective flow based on the importance criteria associated with the respective flow. In some examples, each of the one or more related flows includes a commonality in at least one attribute with the respective flow. In some examples, the at least one attribute includes at least one of a source address, a destination address, a source port number, a destination port number, or a protocol.

In some examples, as part of determining the flow close missed rate, PATE analytics unit 604 may determine a first number of attributes of the respective flow that failed during a first firewall flow evaluation of the respective flow; determine that the first number of attributes meets the attribute threshold; and based on the first number of attributes meeting the attribute threshold, classify the first firewall flow evaluation of the respective flow as a close miss; determine a second number of attributes of the respective flow that failed during a second firewall flow evaluation of the respective flow; determine that the second number of attributes does not meet the attribute threshold; and based on the second number of attributes not meeting the attribute threshold, classify the second firewall flow evaluation of the respective flow as not being a close miss. In some examples, the attribute threshold is user definable.

In some examples, flow criticality is indicatable by a user selectable flag, the user selectable flag indicating either a highest importance or not a highest importance. In some examples, an indication of a highest importance causes the network system (e.g., PATE analytics unit 604) to rank the respective flow as being of a highest importance and wherein an indication of not a highest importance causes the network system to utilize other importance criteria to determine the importance of the respective flow.

In some examples, PATE analytics unit 604 may execute a machine learning model to rank the plurality of flows indicated by the telemetry data based on importance. In some examples, SmartNIC 606A may process one or more of the plurality of flows in accordance with the ranking.

Figure 20:
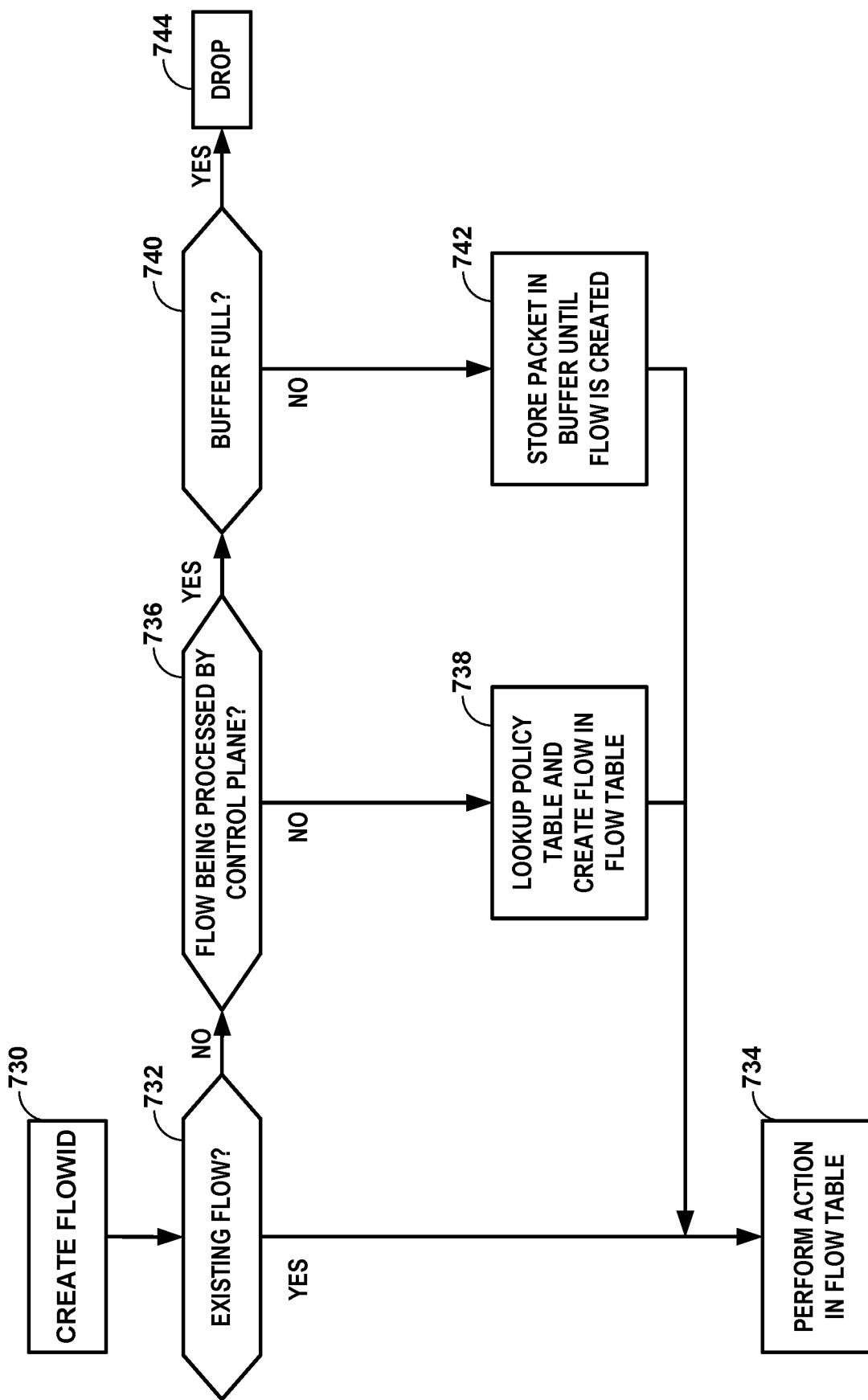
FIG. 20 is a flow diagram illustrating example packet processing techniques of a firewall service according to one or more aspects of this disclosure.

FIG. 20 is a flow diagram illustrating example packet processing techniques of a firewall service according to one or more aspects of this disclosure. FIG. 19 shows the packet processing pipeline of a firewall service. When a packet reaches a firewall (e.g., a distributed firewall such as may be implemented on DPUs 710A-710B), the firewall may construct a flow ID (e.g., SIP, DIP, SPORT, DPORT, PROTO) from the packet header of the packet (730). The firewall may search for this flow ID in a flow table to determine if this is an existing flow or a new flow (732). If the flow is an existing flow (the "Yes" path from box 732), the packet may stay in the data path, and the firewall may perform the action present in the flow table (734). For example, the firewall may apply a policy based on the flow table. If the flow is a new flow (the "No" path from box 732), the firewall may send the packet to a control-plane, which may analyze the configured policies (which may number in the thousands) to identify the action which the firewall should take for all future packets in this flow. This control plane lookup may be time consuming, and may block or delay the forwarding of all packets in that flow until lookup is complete. For example, if the flow is a new flow (the "No" path from box 732), the firewall may determine whether the new flow is currently being processed by a control-plane of the firewall (736). If the new flow is not currently being processed by the control plane (the "No" path from box 736), the control plane may look up the configured policies, analyze the configured policies, determine the action which the firewall should take for all future packets in this flow, and create an entry for the new flow in the flow table indicative of which action should be taken for packets of the new flow (738). If the new flow is currently being processed by the control plane (the "Yes" path from box 736), the control plane may determine whether a buffer is full (740). This buffer may be used to store packets of new flows waiting to be processed so as to not drop such packets. If the buffer is not full (the "No" path from box 740), the control plane may store the packet in the buffer until an entry for the flow is completed in the flow table (742). However, if the buffer is full (the "Yes" path from box 740), the packet is dropped (744). In a traditional firewall, packet buffers are limited as the system must support thousands of active flows, which may result in a large number (in some cases, most) of the packets being dropped while a flow entry in the flow table is created.

In typical enterprise datacenters, most applications follow predictable patterns. For example, administrators usually schedule backups in the middle of the night when most resources are free. Using continuous monitoring and machine learning by PATE analytics unit 604, PATE analytics unit 604 may learn the behavior (e.g., patterns) of the applications. As such, a firewall may create flow entries related to backup services in advance, which may increase a speed of backups.

Figure 21:
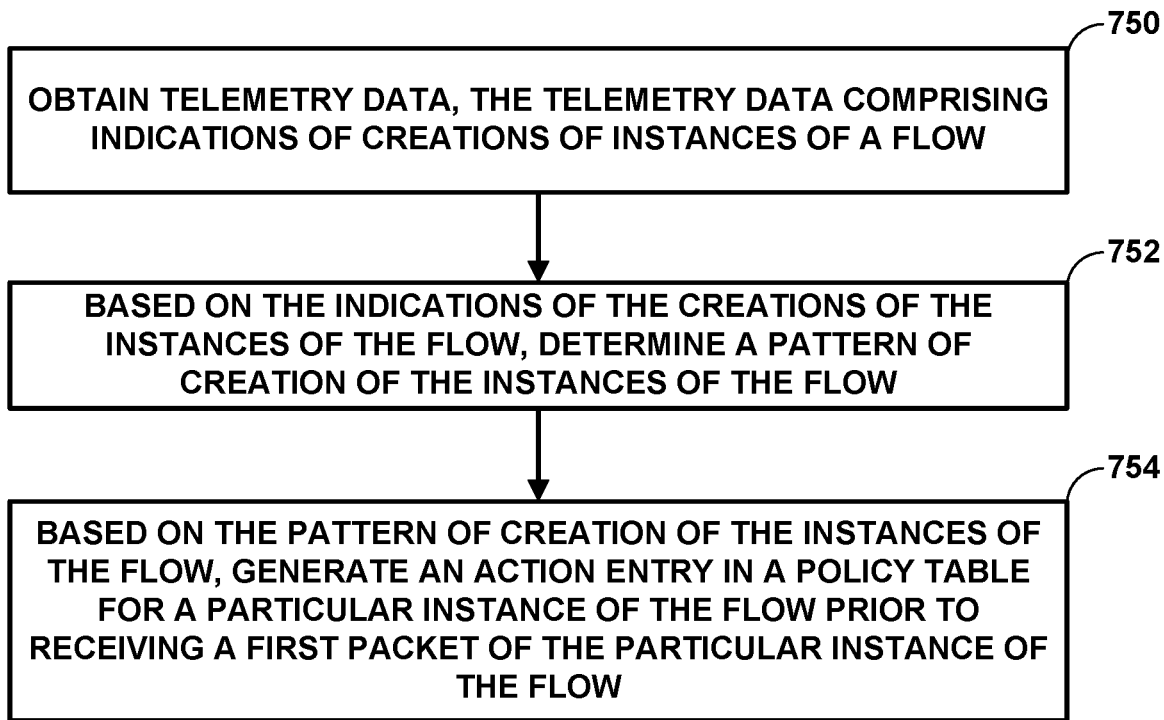
FIG. 21 is a flow diagram illustrating example policy table population techniques according to one or more aspects of this disclosure.

FIG. 21 is a flow diagram illustrating example policy table population techniques according to one or more aspects of this disclosure. PATE analytics unit 604 may obtain telemetry data, the telemetry data including indications of creations of instances of a flow (750). For example, PATE analytics unit 604 may retrieve or receive the telemetry data from controller 602.

PATE analytics unit 604 may, based on the indications of the creations of the instances of the flow, determine a pattern of creation of the instances of the flow (752). For example, instances of the flow have a pattern to their creation, such as being regularly created at a certain time and/or day of the week.

PATE analytics unit 604 may, based on the pattern of creation of the instances of the flow, generate an action entry in a policy table for a particular instance of the flow prior to receiving a first packet of the particular instance of the flow (754). For example, PATE analytics unit 604 may predict that a particular instance of the flow will be created based on the pattern of creation of the plurality of instances of the flow and generate the action entry based on the prediction.

In some examples, the creation of the instances of the flow occurs prior to the creation of the particular instance of the flow. In some examples, as part of determining the pattern of creation of the instances of the flow, PATE analytics unit 604 may execute a machine learning model (e.g., machine learning model(s) 645). In some examples, as part of the generating the action entry, PATE analytics unit 604 may execute a machine learning model (e.g., machine learning model(s) 645). In some examples, the machine learning model is an unsupervised machine learning model. In some examples, the machine learning model is trained using respective indications of a plurality of creations of instances of a plurality of flows.

In some examples, SmartNIC 606A may receive the first packet of the particular instance of the flow. SmartNIC 606A may determine an action based on the action entry in the policy table and execute the action on the first packet of the particular instance of the flow. In some examples, the action entry relates to a backup service.

Figure 22:
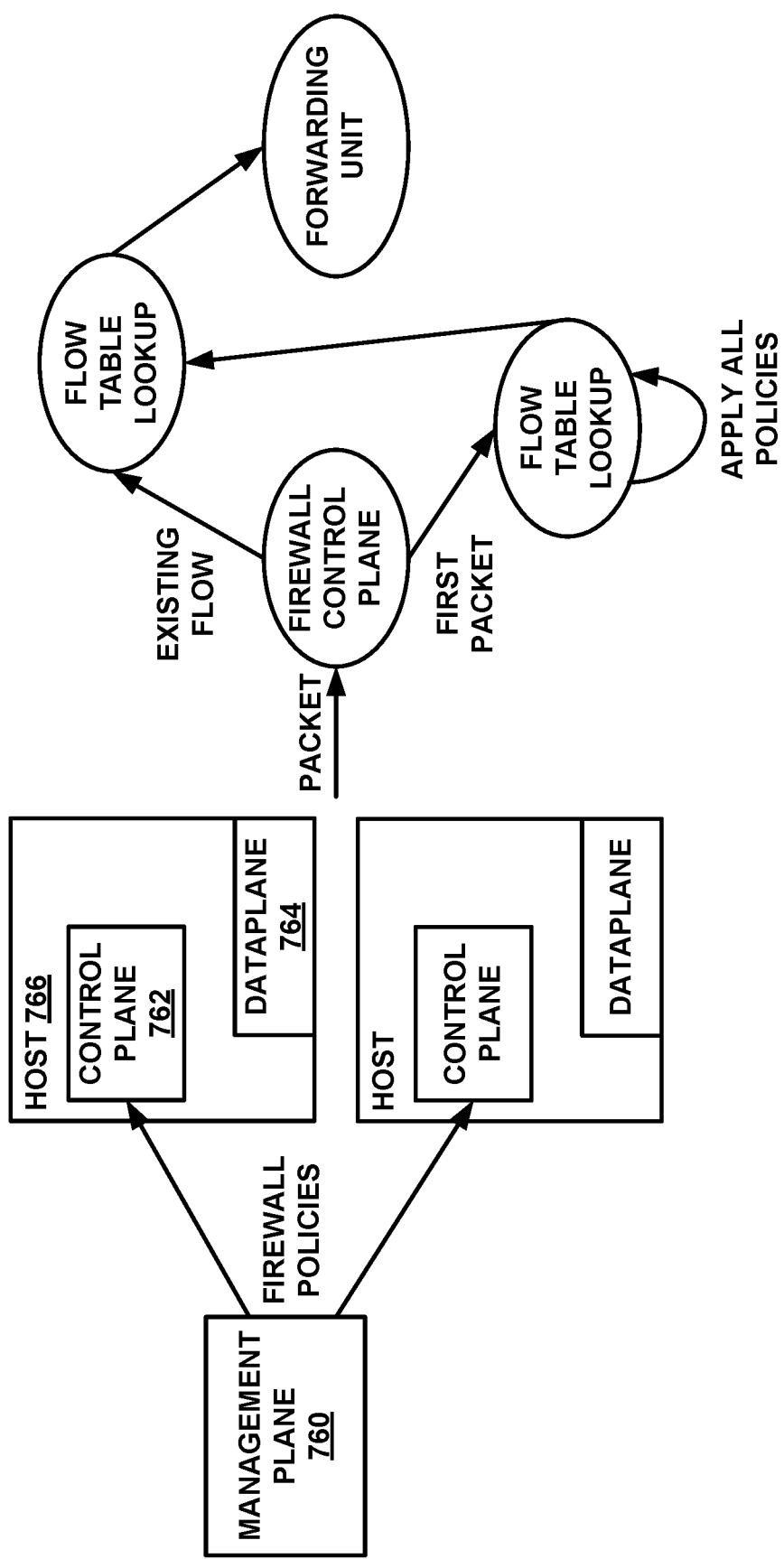
FIG. 22 is a block diagram illustrating an example firewall policy optimizer according to one or more aspects of this disclosure.

FIG. 22 is a block diagram illustrating an example firewall policy optimizer according to one or more aspects of this disclosure. Firewall software is typically divided into three primary components, a management plane 760, a control plane 762 (mentioned above), and a data plane 764. In some examples, management plane 760 may be located in a distributed firewall controller, such as in controller 602. In a distributed firewall, whenever a new instance of the firewall is created, management plane 760 may send all the user configured policies to this new instance of the firewall. In some complex deployments, these policies can be in the range of a few thousand. Control plane 762 on a local host 766 may apply all these policies to every first packet of a flow to create forwarding tables, as mentioned above.

For every first packet of a new flow, all the policies are applied to the first packet and the result of the application of the polices is used to update the flow table. This operation may be expensive and consume many CPU cycles, which limits the scaling of the firewall as the firewall may usually process thousands of flows every second. Even though management plane 760 typically sends all configured policies to control plane 762, control plane 762 may only require the policies used by applications (current or future) running on that particular host, e.g., host 766. As such, the techniques of this disclosure include using dynamic telemetry data, a closed-loop PATE machine learning unit (e.g., one or more machine learning model(s) 645) of PATE analytics unit 604 may learn firewall policies used by each application, and which applications are running or expected to be running on a particular host. Such information may be obtained by management plane 760. For example, PATE analytics unit 604 may send such information to management plane 760. Management plane 760 may use such information to prune the policy set that management plane 760 may send to a given host based on the host's determined and/or predicted current and future needs.

For example, if PATE analytics unit 604 determines that a particular policy is predicted to be used for a given host, management plane 760 may include that policy in the firewall policy set sent to the control plane of that host. If PATE analytics unit 604 determines that a particular policy is not predicted to be used for a given host, management plane 760 may remove that policy from the firewall policy set sent to the control plane of that host. In this manner, only the policies predicted to be used by the host may be sent to the host. As the host may only receive a subset of the policies, the control plane of the host may only apply a reduced set of policies to the first packet of any flow, thereby reducing the CPU cycles required for the firewall instance.

For example, when a packet is received by control plane 762, control plane 762 may determine if the packet is a first packet of a flow or a packet of an existing flow. If the packet is a first packet of a flow, control plane 762 may perform a flow table lookup and apply all policies applicable to the flow. If the packet is a packet of an existing flow or has already had all the policies applied, control plane 762 may perform a flow table lookup to determine how to handle the packet and then provide the packet to the forwarding unit.

Figure 23:
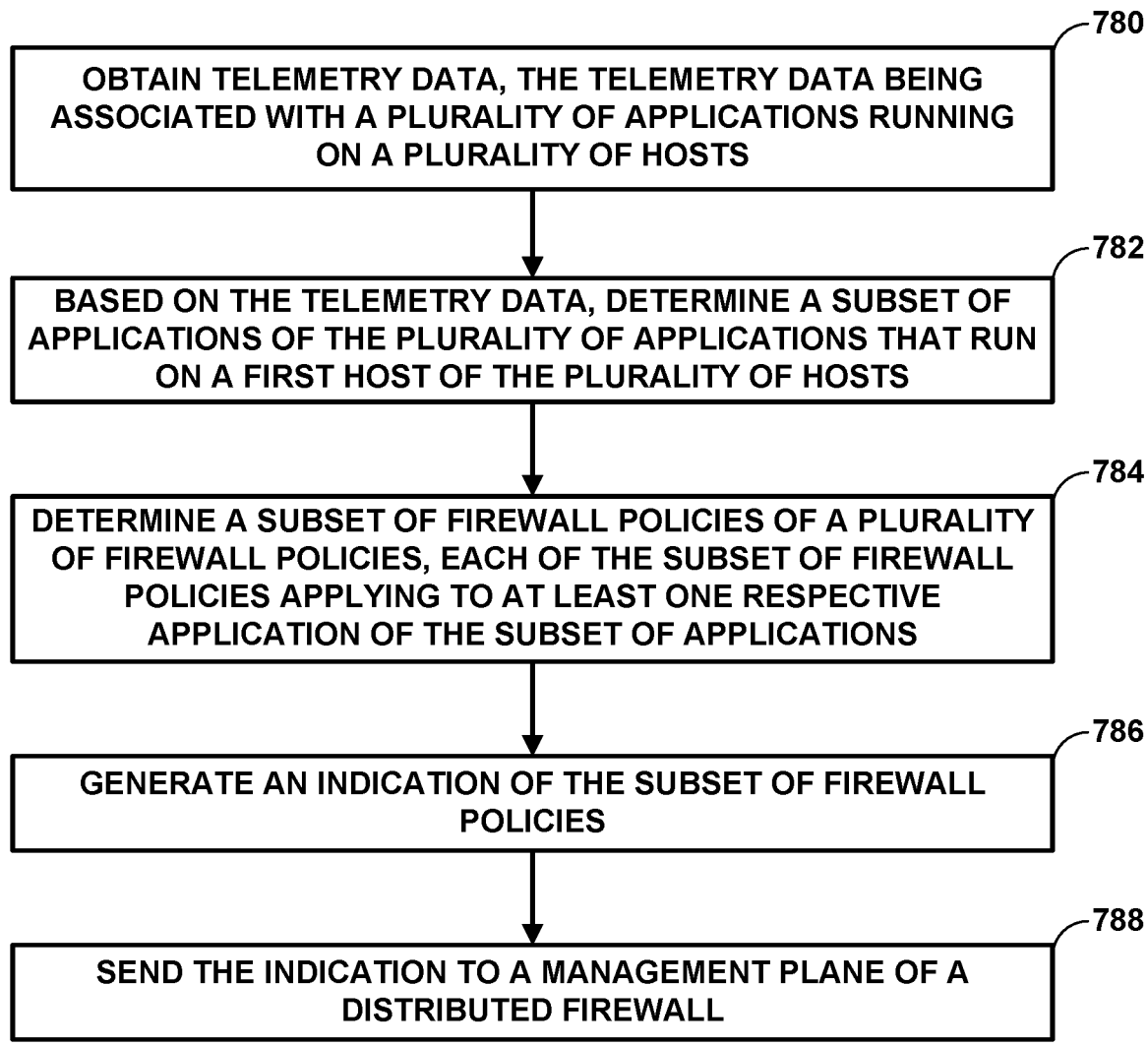
FIG. 23 is a flow diagram illustrating example techniques for reducing a number of firewall polices distributed to nodes of a distributed firewall according to one or more aspects of this disclosure.

FIG. 23 is a flow diagram illustrating example techniques for reducing a number of firewall polices distributed to nodes of a distributed firewall according to one or more aspects of this disclosure. PATE analytics unit 604 may obtain telemetry data, the telemetry data being associated with a plurality of applications running on a plurality of hosts (780). For example, PATE analytics unit 604 may retrieve or receive the telemetry data from controller 602. As used herein, a plurality of applications running on a plurality of hosts means that an application of the plurality of applications may run on one or more of the plurality of hosts and does not necessarily require that each application runs on each host or that all applications run on every host.

PATE analytics unit 604 may, based on the telemetry data, determine a subset of applications of the plurality of applications that run on a first host of the plurality of hosts (782). For example, PATE analytics unit 604 may determine that only a portion of the plurality of applications actually normally run on a particular host (e.g., host 766 of FIG. 22).

PATE analytics unit 604 may determine a subset of firewall policies of a plurality of firewall polices, each of the subset of firewall policies applying to at least one respective application of the subset of applications (784). For example, PATE analytics unit 604 may determine which firewall policies actually apply to each of the applications in the subset of applications and determine the subset of firewall policies such that each firewall policy in the subset of firewall policies apply to at least one of the applications in the subset of applications.

PATE analytics unit 604 may generate an indication of the subset of firewall policies (786). PATE analytics unit 604 may send the indication to a management plane of a distributed firewall (788). For example, PATE analytics unit 604 may send an indication identifying the subset of firewall policies to a firewall controller, such as controller 602.

In some examples, PATE analytics unit 604 may execute a machine learning model to determine at least one of which applications run on the host or which firewall policies apply to the determined applications. In some examples, the machine learning model is an unsupervised machine learning model.

In some examples, the host includes a network interface card (NIC), the NIC comprising NIC processing circuitry. In some examples, an instance of a control plane and a data plane of the distributed firewall runs on the host.

In some examples, a management plane may receive the indication. In some examples, the management plane may prune a firewall policy set corresponding to the plurality of firewall policies based on the indication, to generate a pruned firewall policy set, the pruned firewall policy set corresponding to the subset of firewall policies. In some examples, the management plane may send, to a control plane of an instance of the distributed firewall executing on the host, the pruned firewall policy set.

In some examples, SmartNIC 606A may apply only the pruned firewall policy set to a first packet of a new flow. In some examples, as part of applying only the pruned firewall policy set to the first packet of the new flow, SmartNIC 606A may apply each policy of the pruned firewall policy set to the first packet of the new flow and refrain from applying any policy of the firewall policy set that is not a part of the pruned firewall policy set.

As discussed herein, implementing different network service on SmartNICs using a closed-loop framework may be effective in identifying and responding to network attacks. PATE analytics unit 604 may detect anomalies and topology changes which may be used by controller action unit 612 to dynamically control operations of a distributed firewall which may be implemented on SmartNICs to remediate the security threats. Moreover, additional use cases are set forth where this framework may be used for SLA improvement and security firewall scalability and optimization.

Figure 24:
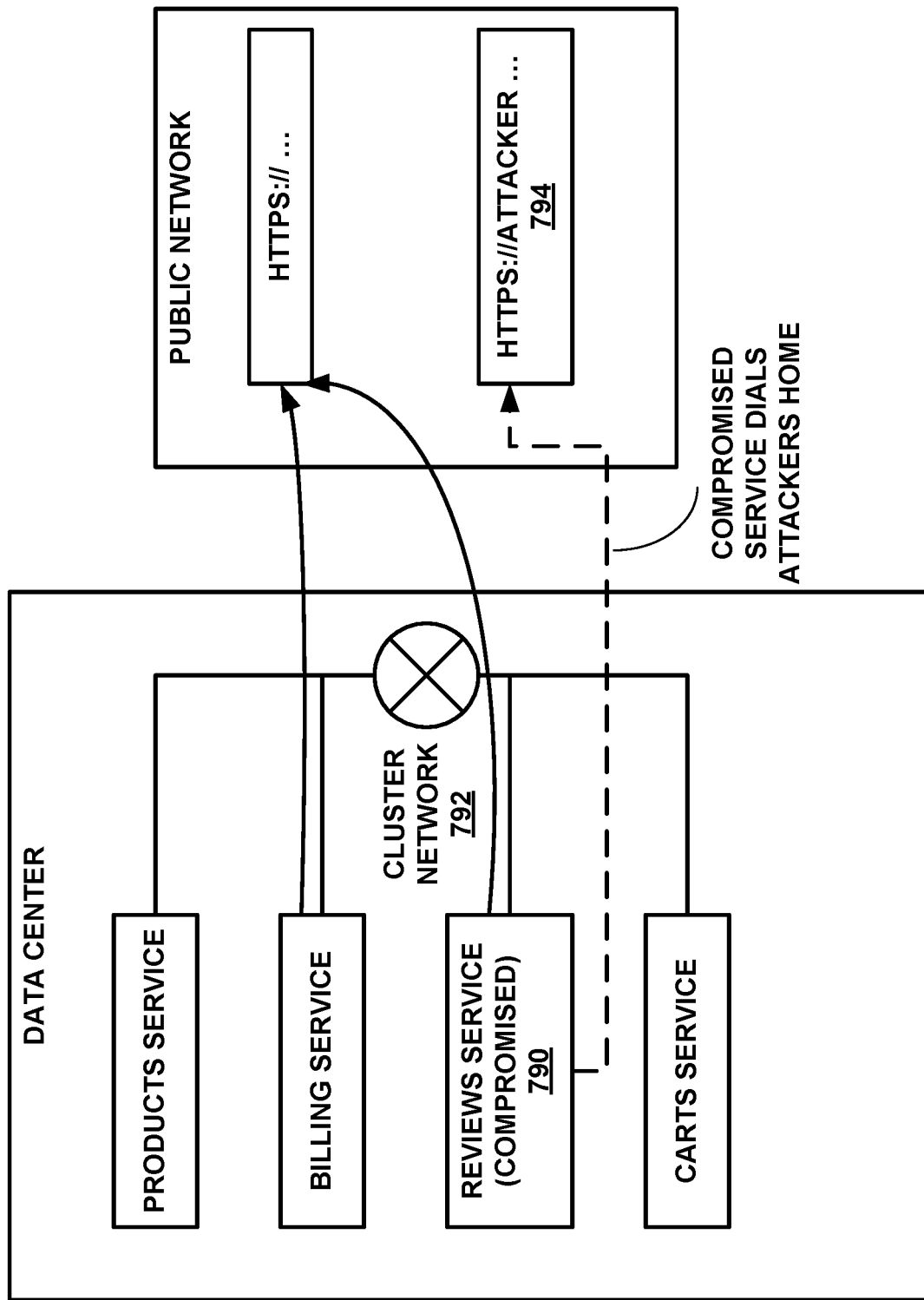
FIG. 24 is a conceptual diagram illustrating example egress traffic-based attacks according to one or more aspects of this disclosure.

FIG. 24 is a conceptual diagram illustrating example egress traffic-based attacks according to one or more aspects of this disclosure. When a microservice-based application is deployed in a Kubernetes or service mesh-based environment, network security typically emphasizes traffic coming into the cluster ("ingress traffic"). Sometimes, when a zero-trust policy is preferred, it may be desirable for network security to monitor and secure cluster internal traffic. But, when an application is compromised due to, for example, a bug in the application code, a malicious supply chain or DevOps pipelines, an attacker may use the compromised application service either to attack any external servers or to download malware from the attacker's server(s). The monitoring and securing of outgoing traffic are therefore desirable to prevent egress traffic-based attacks.

For example, a bug in security code may exist which may be executing within cluster network 792 of a data center. An attacker may exploit that bug to gain access to and compromise reviews service 790 within cluster network 792. The attacker may then, from reviews service 790 via egress traffic, log into the attacker's home server 794 to download malware to cluster network 792, for example.

As a basic step to secure egress network traffic, Kubernetes provides a cluster network policy to help the cluster administrator to configure static network policies (e.g., policies that remain in place until changed or deleted) to control access to external servers by the application service. For example, a plugin for Kubernetes may provide support for cluster network policies as well as provide cluster networking. However, such a network policy approach has some limitations. For example, such an approach may be IP address-based and may not support domain names in the cluster network policies, may not handle high bandwidth traffic, may consume a large amount of compute resources of the cluster node for filtering traffic, and/or may negatively affect traffic bandwidth when application services or network polices are scaled.

When an application is deployed in a service mesh, egress traffic may be monitored and controlled using reverse proxies (e.g., an "egress gateway"). The egress gateway may run at an edge of a cluster. The application services which may want to communicate to external servers may be configured to only reach the external servers through an egress gateway. However, such an egress gateway approach may have limitations as well. For example, such an egress gateway approach may be bypassed as application services may bypass the egress gateway by making a direct external network connection, may add an additional network hop in the external service communication, may centralize external traffic and cause a single point of failure, may work only with TLS and HTTP traffic, may cause issues with management of egress gateway instances for scalability and/or availability, may consume compute resources of cluster nodes, and/or may not handle high bandwidth traffic well.

As such, according to the techniques of this disclosure, a self-learning egress traffic controller is disclosed. For example, self-learning knowledge graph-based distributed firewall techniques may detect malicious egress connections and mitigate the attacks caused by malicious egress connections. These techniques may use distributed firewalls to monitor external traffic and mitigate any possible egress traffic-based attacks at a cluster node level. The distributed firewall may run on one or more SmartNICs attached to, in some examples, every node of a cluster. For example, every node in the cluster may be attached to a SmartNIC and the traffic of every node in the cluster may pass through the SmartNIC.

The SmartNICs attached to each cluster node may be managed by a component, such as a SmartNIC controller. The SmartNIC controller may orchestrate the distributed firewalls running on these SmartNICs. For example, the SmartNIC controller may learn the application topology using past network communication metrics data of the application running on the cluster nodes. The learned application topology may help the SmartNIC controller identify malicious or compromised services which may make egress connections to initiate egress traffic-based attacks, like malware attacks.

Figure 25:
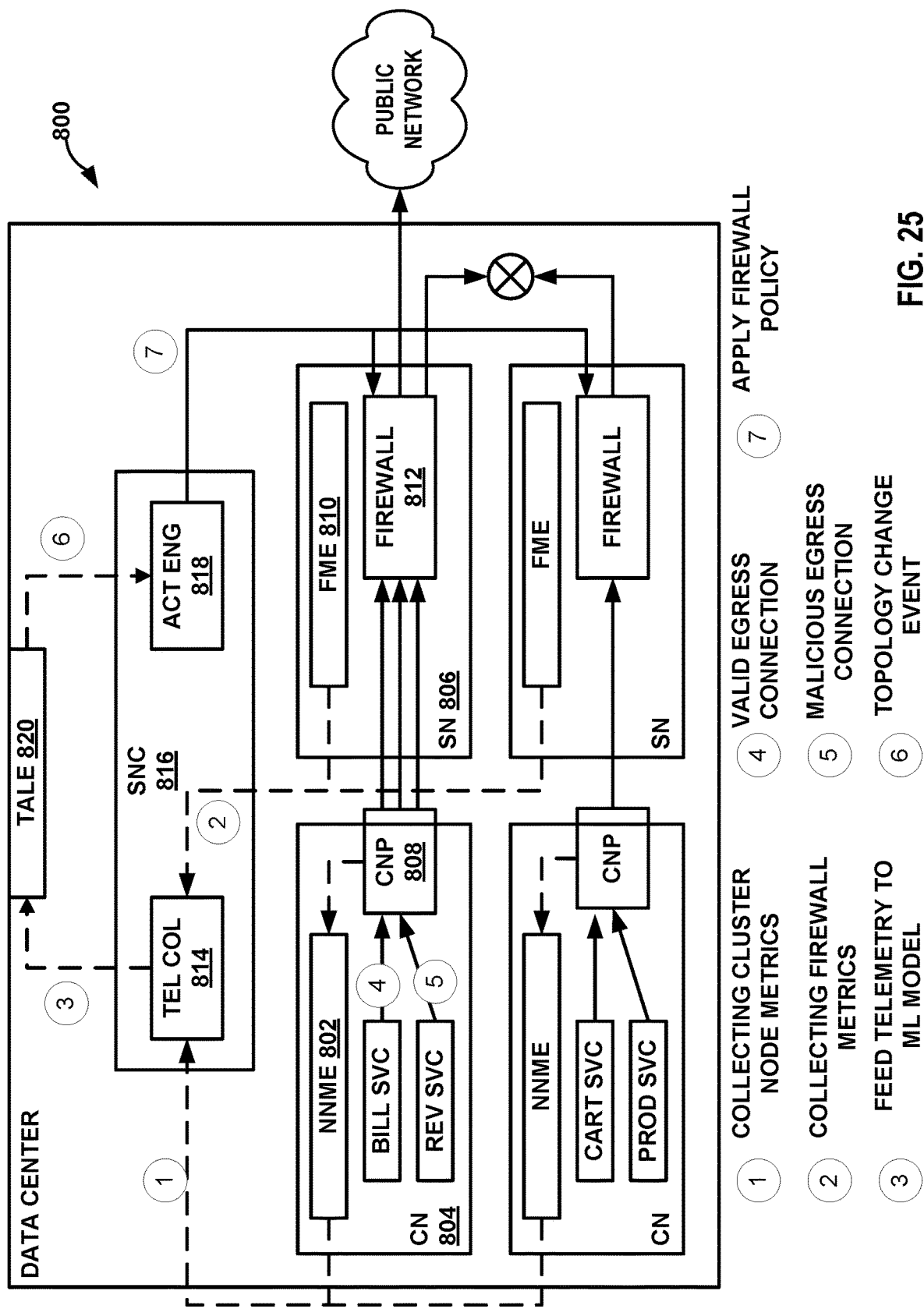
FIG. 25 is a conceptual diagram illustrating an example self-learning egress traffic controller according to one or more aspects of this disclosure.

FIG. 25 is a conceptual diagram illustrating an example self-learning egress traffic controller according to one or more aspects of this disclosure. As shown in FIG. 25, these techniques utilize telemetry data exporters, such as node network metrics exporter (NNME) 802 on cluster nodes, such as cluster node-1 804, and their respective SmartNICs, such as SmartNIC-1 806. When a service makes a network connection, a cluster network provider, such as cluster network provider 808, may perform network address translation (NAT) and route the connections further depending on the destination address. Typically, in Kubernetes environment, a cluster network provider may perform source NAT (SNAT) when the destination address does not belong to the cluster network address range. In this case, a distributed firewall running on the SmartNICs may not be able to obtain an actual source IP address of the service which initiated the connection. To obtain the actual source address, the cluster network provider may export the network connection metrics containing connection attributes like source IP address and port number, destination address and port, or the like. However, when SNAT is disabled at the cluster network provider, the exporting of metrics may be disabled at the cluster network provider.

As such, the techniques of this disclosure may include the following metric exporters. One solution involves one or more cluster node network metric exporters (e.g., node network metrics exporter (NNME) 802) and one or more firewall metrics exporters (e.g., firewall metrics exporter (FME) 810) to provide the input data for training a machine learning model (e.g., machine learning model(s) 645).

In some examples, a cluster node network metric exporter (e.g., node network metrics exporter 802) may run on every cluster node to export the connection metrics provided by a cluster network provider, such as cluster network provider 808. Node network metrics exporter 802 mainly exports the metrics with connection details as labels for every connection originated by workloads (which may be containers or pods) running on the cluster node. Example labels include source and destination IP address, source and destination port number, source workload name (which may include a pod or container name), connection protocol and direction, cluster node name and identification (ID), and/or the like.

A firewall metrics exporter (e.g., firewall metrics exporter 810) may run on a SmartNIC (e.g., SmartNIC (SN) 806) of every cluster node and export connection metrics provided by the distributed firewall (which may include firewall 812). Firewall metrics exporter 810 mainly exports metrics with connection attributes as metric labels. Example labels include source and destination IP address, source and destination port number, direction, and/or the like.

A metric collector, such as telemetry metric collector 814, may collect the metrics exported by node network metrics exporter 802 and firewall metrics exporter 810. Telemetry metric collector 814 may be run within SmartNIC controller 816 or somewhere inside or outside of data center network 800. SmartNIC controller 816 may be an example of controller 602 of FIG. 6. In some examples, telemetry metric collector 814 may include an event queue, for example, when real time metric data is desirable. Telemetry metric collector 814 may feed the collected metric data to a topology analytical service, such as topology analysis and learning engine (TALE) unit 820. TALE unit 820 may be an example of topology analysis service 605 of PATE analytics unit 604 of FIG. 6.

TALE unit 820 may analyze the network connection metric data and build a knowledge graph representing the communication topology of all services of the application. TALE unit 820 may include a machine learning model (similar to machine learning model(s) 645 of FIG. 10) which may be trained using historical communication data of the application. TALE unit 820 may analyze historical metric data obtained by TALE unit 820 and build the knowledge graph based on the historical metric data. In some examples, TALE unit 820 may be configured to use the dynamic communication data of the application to build the knowledge graph.

In some examples, when a network connection is made by an application service and a metric is exported associated with the network connection, TALE unit 820 may analyze the metric label data and start building a knowledge graph. TALE unit 820 may map source workload name to a knowledge graph node and may map any network connection from that workload to a graph edge. For example, {Source Workload Name}->Knowledge Graph Node, and {Source IP Address, Destination IP Address}->Knowledge Graph Edge services.

Figure 26:
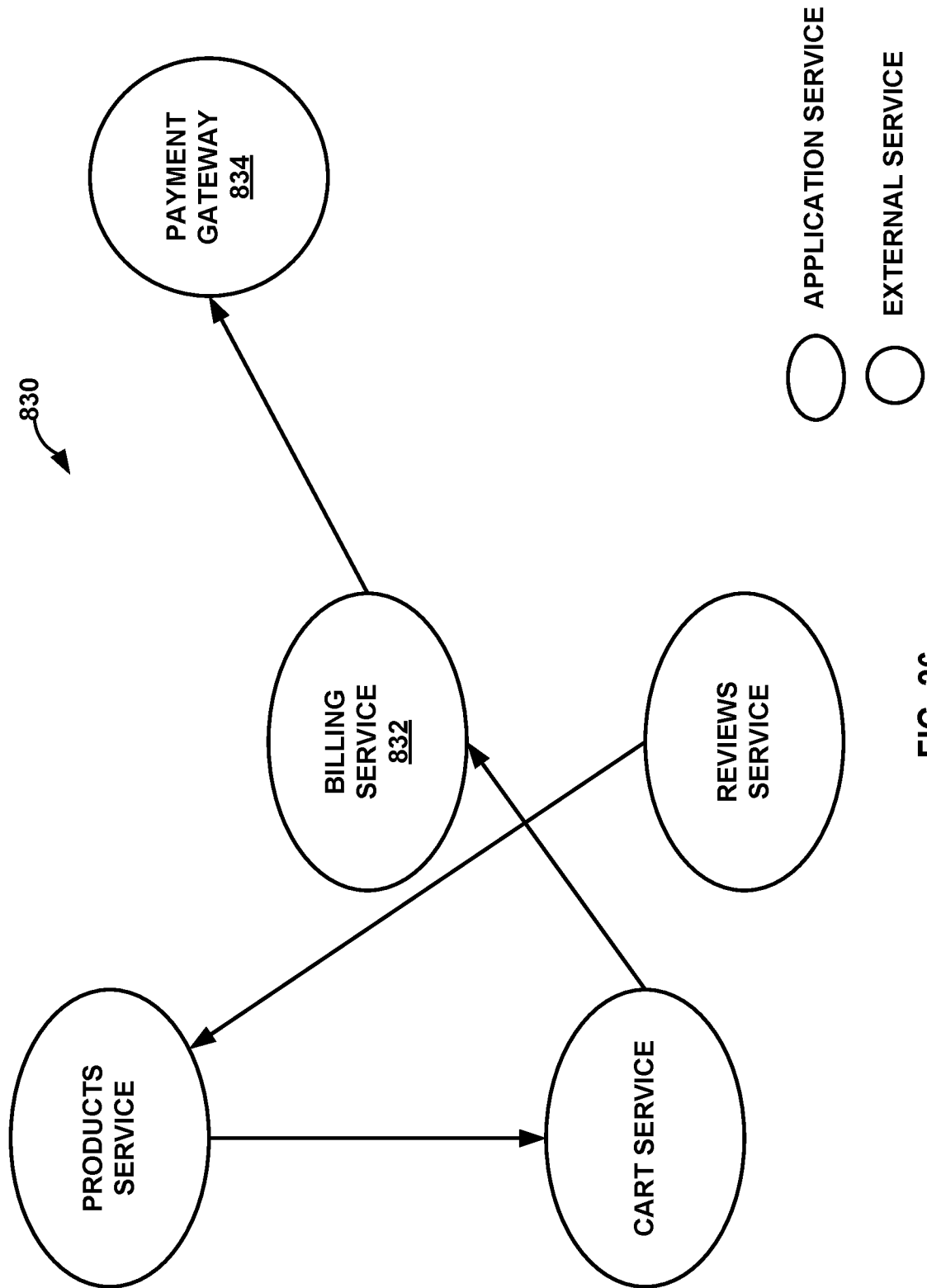
FIG. 26 is a conceptual diagram illustrating example an application knowledge graph before egress attacks according to one or more aspects of this disclosure.

FIG. 26 is a conceptual diagram illustrating example an application knowledge graph before egress attacks according to one or more aspects of this disclosure. FIG. 26 depicts a knowledge graph 830 built by TALE unit 820 using historical data of a simple e-commerce application. Knowledge graph 830 shows that only billing service 832 makes (e.g., is permitted to make) egress connections, such as the egress connection to payment gateway 834. TALE unit 820 may continuously analyze the live metric data and update knowledge graph 830 of the application. But when an application service gets compromised, e.g., due to a bug in the application code, errors in a supply chain, or compromised DevOps pipelines, the application may attempt to dial the application's home server or the attacker's server to download malicious code or malware. Further, the application may try to exfiltrate other external services by initiating egress connections towards the other external services.

When a compromised service makes malicious egress connections, TALE unit 820 may receive metric data related to these new connections. Using the received metric data, TALE unit 820 may update the knowledge graph 830 with new graph nodes and edges. When knowledge graph 830 is updated, TALE unit 820 may analyze the updated knowledge graph to determine any changes in the topology. When there are changes to knowledge graph 830, TALE unit 820 may generate a network anomaly event with details about any new egress connection(s).

Figure 27:
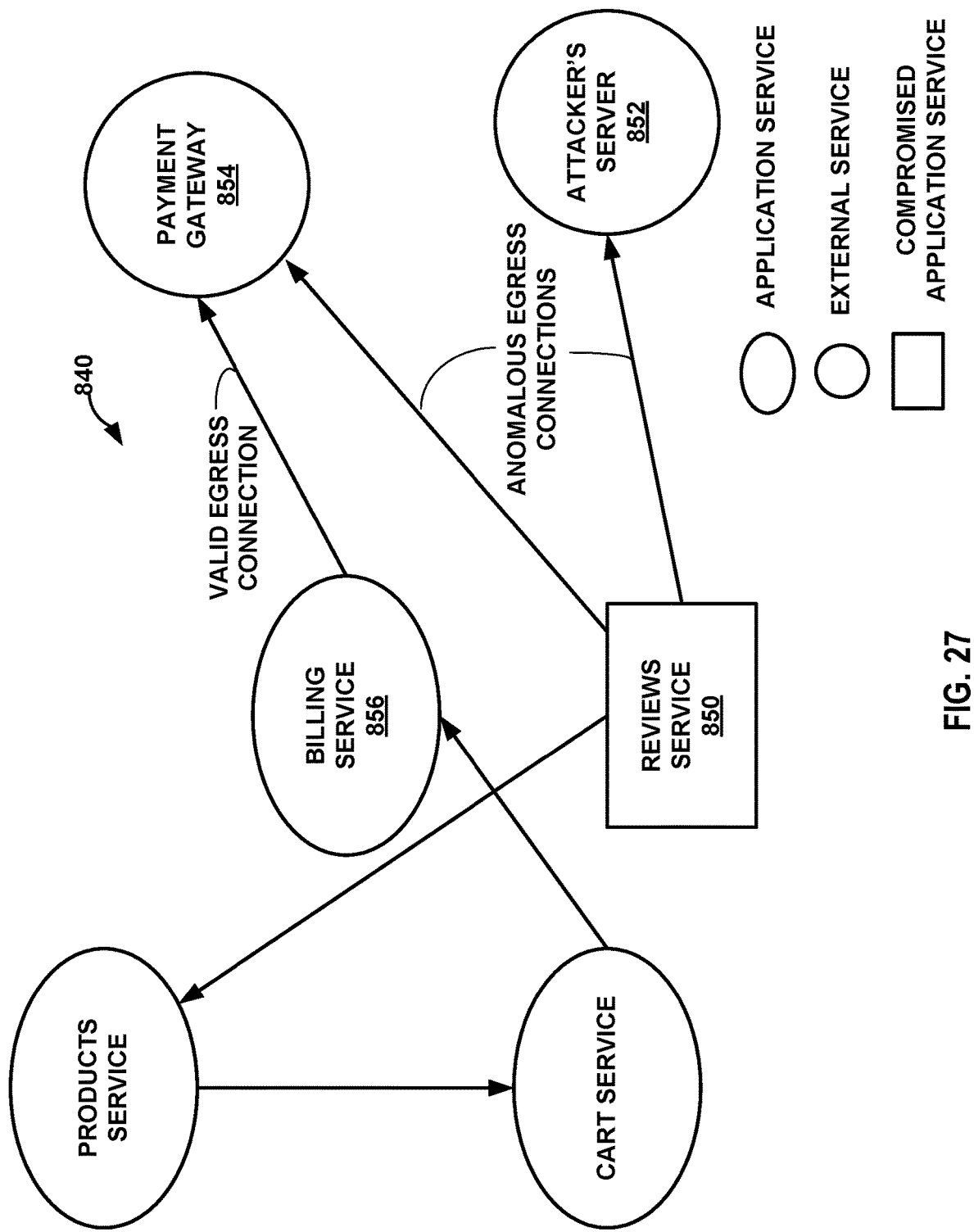
FIG. 27 is a conceptual diagram illustrating example updated knowledge graph according to one or more aspects of this disclosure.

FIG. 27 is a conceptual diagram illustrating example updated knowledge graph according to one or more aspects of this disclosure. For example, TALE unit 820 may update knowledge graph 830 to generate updated knowledge graph 840. As shown in FIG. 27, when reviews service 850 of the e-commerce application becomes compromised, an attacker may use reviews service 850 to initiate an egress connection towards the attacker's server 852 and external payment gateway service 854. TALE unit 820 identifies these new egress connections as anomalous connections because TALE unit 820 has learned that only billing service 856 makes egress connections.

When TALE unit 820 generates network anomaly event(s) for new egress connection(s), an action service (e.g., action unit 818) running within SmartNIC controller 816 receives these events. The action service may process the anomaly events and configure a firewall policy to mitigate the attack, for example, by stopping all traffic of compromised service (e.g., reviews service 850).

Figure 28:
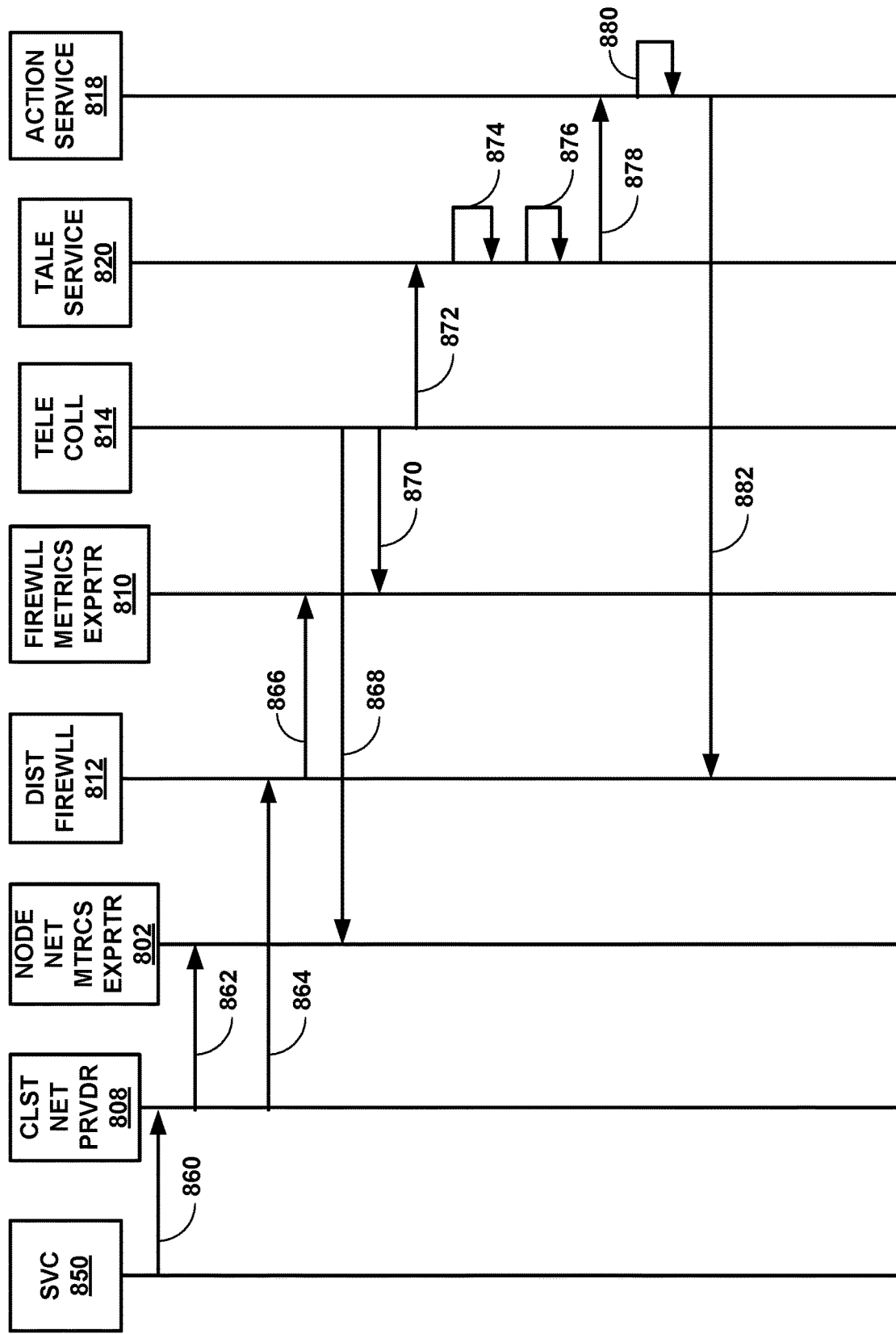
FIG. 28 is a sequence diagram illustrating example techniques for configuring a firewall policy to mitigate an egress attack according to one or more aspects of this disclosure.

FIG. 28 is a sequence diagram illustrating example techniques for configuring a firewall policy to mitigate an egress attack to one or more aspects of this disclosure. For example, a compromised service (e.g., reviews service 850 may make egress connection 860 to cluster network provider 808. Cluster network provider 808 may provide connection data 862 to node network metrics exporter 802 and route the connection 864 to the distributed firewall, which may include firewall 812. Firewall 812 may provide connection data 866 to firewall metrics exporter 810. Telemetry metrics collector 814 may collect node network metrics 868 from node network metrics exporter 802 and collect firewall connection metrics 870 from firewall metrics exporter 810. While shown as being initiated from telemetry metrics collector 814, in some examples, telemetry metrics collector 814 may passively receive metrics from node network metrics exporter 802 and/or firewall metrics exporter 810. Telemetry metrics collector 814 may feed metrics data 872 to TALE unit 820. TALE unit 820 may build a knowledge graph 874, such as updated knowledge graph 840. TALE unit 820 may analyze the knowledge graph 876, and notify action service (e.g., action unit 818 of FIG. 25) of an anomaly event 878. The action service may create (e.g., generate) a new firewall policy 880 or modify an existing firewall policy. The action service may apply the new firewall policy or the modified firewall policy 882 to the distributed firewall (e.g., firewall 812) to mitigate the egress attack.

Figure 29:
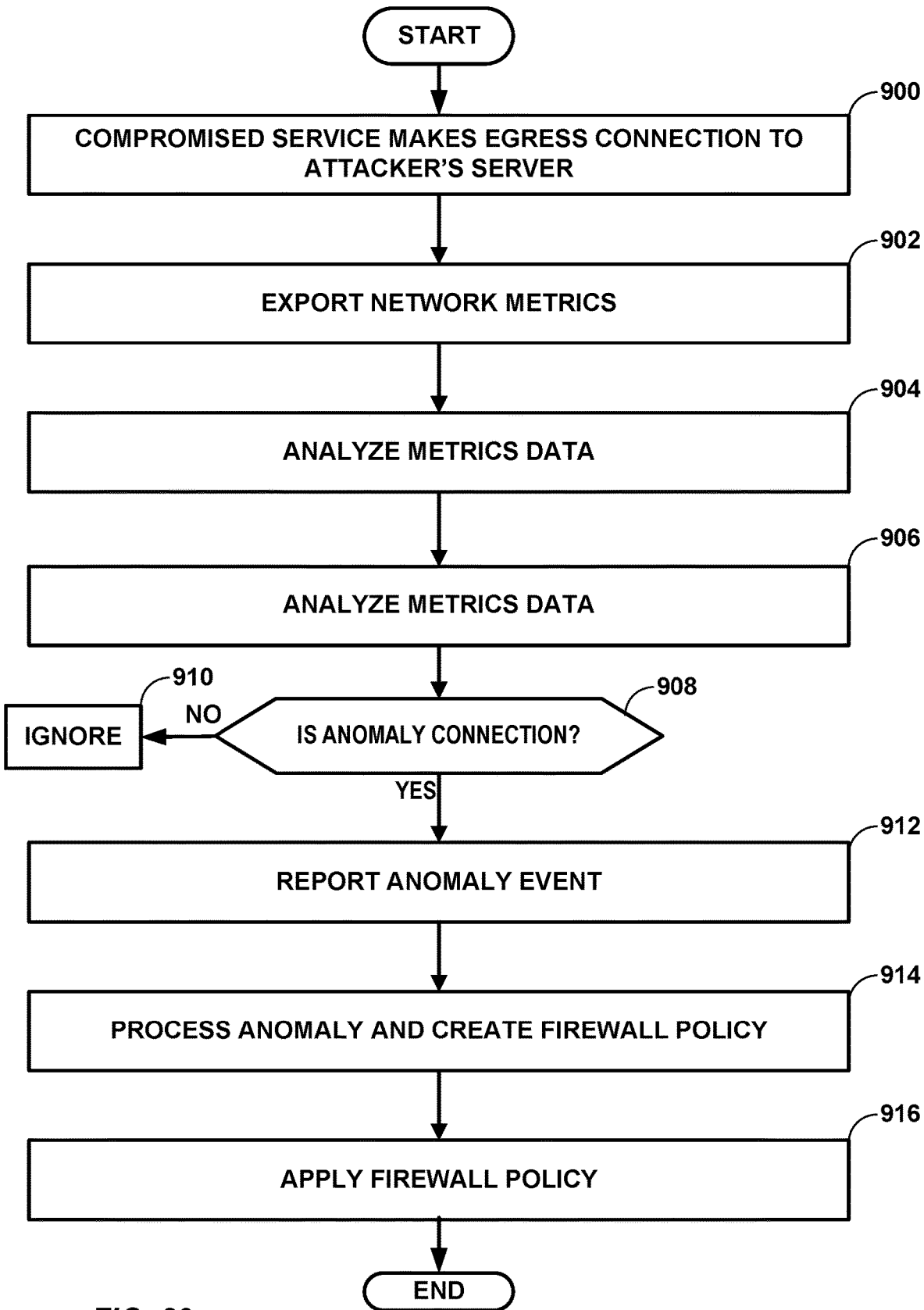
FIG. 29 is a flow diagram illustrating example techniques for configuring a firewall policy to mitigate an egress attack according to one or more aspects of this disclosure.

FIG. 29 is a flow diagram illustrating example techniques for configuring a firewall policy to mitigate an egress attack to one or more aspects of this disclosure. For example, a compromised service (e.g., reviews service 850 of FIG. 27) may make an egress connection to attacker's server 852 (900). Telemetry metrics collector 814 may collect metrics from node network metrics exporter 802 and/or firewall metrics exporter 810. Telemetry metrics collector 814 may export network metrics (902) to TALE unit 820. TALE unit 820 may analyze metrics data (904). TALE unit 820 may validate egress connection (906). For example, TALE unit 820 may determine whether the egress connection is permitted based on existing knowledge graphs. TALE unit 820 may determine whether the connection is an anomaly connection (908). For example, TALE unit 820 may determine whether the connection is permitted based on existing knowledge graphs. If TALE unit 820 determines the connection is not an anomaly connection (the "No" path from box 908), TALE unit 820 may ignore the connection (910). If TALE unit 820 determines the connection is an anomaly connection (the "YES" path from box 908), TALE unit 820 may report the anomaly event (912) to action unit 818.

Action unit 818 may process the anomaly and create a firewall policy (914). Action unit 818 may apply the firewall policy (916) to the distributed firewall which may employ the firewall policy.

Figure 30:
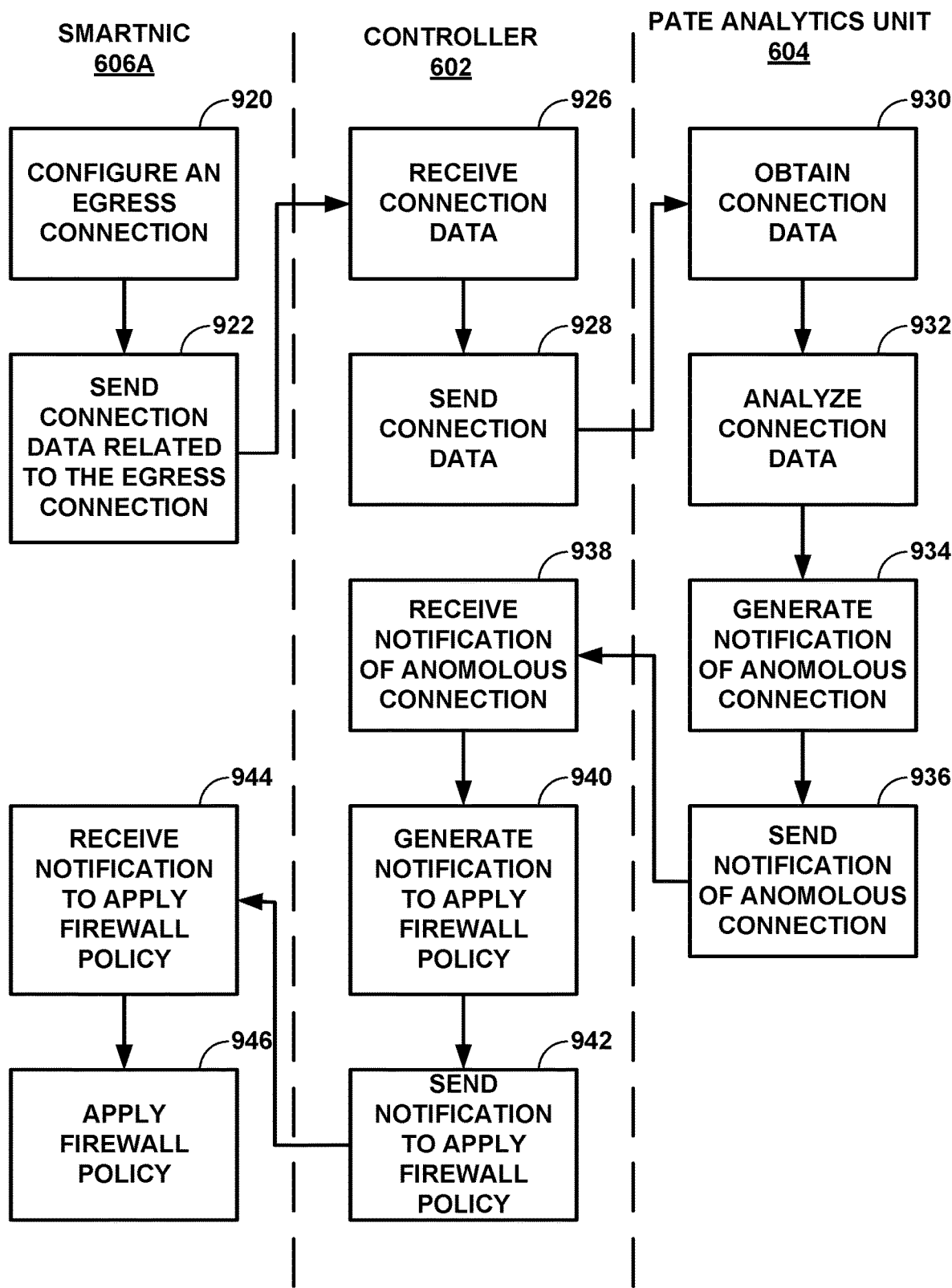
FIG. 30 is a flow diagram illustrating example techniques for responding to malicious egress connections according to one or more aspects of this disclosure.

FIG. 30 is a flow diagram illustrating example techniques for responding to malicious egress connections according to one or more aspects of this disclosure. The techniques of FIG. 30 are discussed as being performed by different portions of a system with respect to FIG. 6. Each portion of the system may perform those techniques attributed to the respective portion, or, in some examples, one or more techniques attributed to any one portion of the system may be performed by other portion of the system or combination of portions of the system.

SmartNIC 606A may configure an egress connection from an application service of an application (920). For example, SmartNIC 606A may make a connection from reviews service 850 to payment gateway 854 (FIG. 27).

SmartNIC 606A may send, to a computing device, connection data related to the egress connection (924). For example, SmartNIC 606A may generate, log, and send the connection data to controller 602, which may be a SmartNIC controller, such as SmartNIC controller 816 of FIG. 25.

Controller 602 may receive connection data related to an egress connection of an application service of an application (926). For example, controller 602 may receive the connection data from SmartNIC 606A. Controller 602 may send, to a computing device, the connection data (928). For example, controller 602 may send the connection data to PATE analytics unit 604. In some examples, controller 602 may process the connection data prior to sending the connection date to PATE analytics unit 604.

PATE analytics unit 604 may obtain connection data related to an egress connection of an application service of an application (930). For example, PATE analytics unit 604 may retrieve or receive the connection data from controller 602.

PATE analytics unit 604 may analyze the connection data to determine that the egress connection is an anomalous connection (932). For example, PATE analytics unit 604 may determine that the egress connection is not an expected egress connection and is therefore anomalous.

PATE analytics unit 604 may generate a notification indicative of the egress connection being an anomalous connection (934). PATE analytics unit 604 may send the notification to a computing device (936). For example, PATE analytics unit 604 may send the notification to controller 602.

Controller 602 may receive, from the computing device and in response to sending the connection data, a notification indicative of the egress connection being an anomalous connection (938). For example, controller 602 may receive the notification indicative of the egress connection being an anomalous connection from PATE analytics unit 604.

Controller 602 may generate, based on the notification indicative of the egress connection being anomalous, a notification to apply a firewall policy (940). For example, controller 602 may determine a firewall policy that should be applied by SmartNIC 606A to address the anomalous connection and may generate notification thereof.

Controller 602 may send the notification to apply the firewall policy to at least one network interface card (942). For example, controller 602 may send the notification to apply the firewall policy to SmartNIC 606A.

SmartNIC 606A may receive, from the computing device and in response to sending the connection data, a notification to apply a firewall policy (944). For example, SmartNIC 606A may receive from controller 602, the notification to apply the firewall policy. SmartNIC 606A may apply the firewall policy (946). For example, SmartNIC 606A may extract a firewall policy from the notification and execute the firewall policy or may determine an identification of a firewall policy based on the notification, load the firewall policy from memory, and execute the firewall policy.

In some examples, PATE analytics unit 604 may analyze the connection data via a machine learning model (e.g., machine learning model(s) 645). In some examples, the machine learning model is trained using previous connection data of the application.

In some examples, PATE analytics unit 604 may generate a previous knowledge graph (e.g., knowledge graph 830 of FIG. 26) based on previous connection data of the application. In some examples, the previous knowledge graph is indicative of each application service of the application that has previously made egress connections. In some examples, as part of analyzing the connection data, PATE analytics unit 604 may generate a first knowledge graph based on the connection data, the first knowledge graph (e.g., knowledge graph 840 of FIG. 27) being indicative of the application service making the egress connection. PATE analytics unit 604 may compare the first knowledge graph to the previous knowledge graph.

In some examples, the connection data includes node network metrics and firewall metrics. In some examples, at least a portion of the node network metrics are associated with a cluster node, and wherein the node network metrics comprise at least one of a source IP address, a destination IP address, a source port number, a destination port number, a source workload name, a connection protocol and direction of the egress connection, or a cluster node identifier. In some examples, at least a portion of the firewall metrics are associated with an instance of a distributed firewall running on a NIC, and wherein the firewall metrics comprise at least one of a source IP address, a destination IP address, a source port number, a destination port number, or a direction of the egress connection.

In some examples, the notification indicative of the egress connection being an anomalous connection comprises information associated with the egress connection. In some examples, the firewall policy is a new firewall policy. In some examples, the notification to apply the firewall policy includes the new firewall policy.

In some examples, SmartNIC 606A may, as part of applying the firewall policy, at least one of drop the egress connection or block further egress connections from the application service. In some examples, as part of generating the notification to apply the firewall policy, controller 602 may generate a new firewall policy. In some examples, the new firewall policy is configured to cause the at least one network interface card to at least one of drop the egress connection or block further egress connections from the application service.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset.

Alternatively or additionally, if implemented in software or firmware, the techniques may be realized at least in part by a computer-readable data storage medium comprising instructions that, when executed, cause a processor to perform one or more of the methods described above.

For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network system comprising:
    processing circuitry;
    one or more memories coupled to the processing circuitry and configured to store instructions which, when executed by the processing circuitry, cause the network system to:
        obtain telemetry data, the telemetry data being associated with a plurality of applications running on a plurality of hosts;
        based on the telemetry data, determine which applications of the plurality of applications run on a first host of the plurality of hosts, the determined applications comprising a subset of applications of the plurality of applications;
        determine which firewall policies of a plurality of firewall polices apply to the subset of applications, the determined firewall policies comprising a subset of firewall policies of the plurality of firewall policies, each of the subset of firewall policies applying to at least one respective application of the subset of applications;
        generate an indication identifying the subset of firewall policies; and
        send the indication to a management plane of a distributed firewall.

2. The network system of claim 1, wherein the processing circuitry is configured to execute a machine learning model to determine at least one of which applications run on the first host or which firewall policies apply to the determined applications.

3. The network system of claim 2, wherein the machine learning model is an unsupervised machine learning model.

4. The network system of claim 1, wherein the first host comprises a network interface card (NIC), the NIC comprising NIC processing circuitry.

5. The network system of claim 1, wherein an instance of a control plane and a data plane of the distributed firewall runs on the first host.

6. The network system of claim 1, wherein the instructions further cause the network system to:
    receive, by the management plane, the indication;
    prune, by the management plane, a firewall policy set corresponding to the plurality of firewall policies based on the indication, to generate a pruned firewall policy set, the pruned firewall policy set corresponding to the subset of firewall policies; and
    send, by the management plane and to a control plane of an instance of the distributed firewall executing on the first host, the pruned firewall policy set.

7. The network system of claim 6, wherein the instructions further cause the network system to apply only the pruned firewall policy set to a first packet of a new flow.

8. The network system of claim 7, wherein as part of applying only the pruned firewall policy set to the first packet of the new flow, the instructions cause the network system to apply each policy of the pruned firewall policy set to the first packet of the new flow and refrain from applying any policy of the firewall policy set that is not a part of the pruned firewall policy set.

9. A method comprising:
    obtaining telemetry data, the telemetry data being associated with a plurality of applications running on a plurality of hosts;
    based on the telemetry data, determining which applications of the plurality of applications run on a first host of the plurality of hosts, the determined applications comprising a subset of applications of the plurality of applications;
    determining which firewall policies of a plurality of firewall polices apply to the subset of applications, the determined firewall policies comprising a subset of firewall policies of the plurality of firewall policies, each of the subset of firewall policies applying to at least one respective application of the subset of applications;
    generating an indication identifying the subset of firewall policies; and
    sending the indication to a management plane of a distributed firewall.

10. The method of claim 9, further comprising executing a machine learning model to determine at least one of which applications run on the first host or which firewall policies apply to the determined applications.

11. The method of claim 10, wherein the machine learning model is an unsupervised machine learning model.

12. The method of claim 9, wherein the first host comprises a network interface card (NIC), the NIC comprising NIC processing circuitry.

13. The method of claim 9, wherein an instance of a control plane and a data plane of the distributed firewall runs on the first host.

14. The method of claim 9, further comprising:
    receiving, by the management plane, the indication;
    pruning, by the management plane, a firewall policy set corresponding to the plurality of firewall policies based on the indication, to generate a pruned firewall policy set, the pruned firewall policy set corresponding to the subset of firewall policies; and sending, by the management plane and to a control plane of an instance of the distributed firewall executing on the first host, the pruned firewall policy set.

15. The method of claim 14, further comprising applying only the pruned firewall policy set to a first packet of a new flow.

16. The method of claim 15, wherein applying only the pruned firewall policy set to the first packet of the new flow comprises applying each policy of the pruned firewall policy set to the first packet of the new flow and refraining from applying any policy of the firewall policy set that is not a part of the pruned firewall policy set.

17. Non-transitory computer-readable storage media storing instructions, which, when executed, cause processing circuitry to:
obtain telemetry data, the telemetry data being associated with a plurality of applications running on a plurality of hosts;
based on the telemetry data, determine which applications of the plurality of applications run on a first host of the plurality of hosts, the determined applications comprising a subset of applications of the plurality of applications;
determine which firewall policies of a plurality of firewall polices apply to the subset of applications, the determined firewall policies comprising a subset of firewall policies of the plurality of firewall policies, each of the subset of firewall policies applying to at least one respective application of the subset of applications;
generate an indication identifying the subset of firewall policies; and
send the indication to a management plane of a distributed firewall.

18. The non-transitory computer-readable storage media of claim 17, the instructions cause the processing circuitry to execute a machine learning model to determine at least one of which applications run on the first host or which firewall policies apply to the determined applications.

19. The non-transitory computer-readable storage media of claim 18, wherein the machine learning model is an unsupervised machine learning model.

20. The non-transitory computer-readable storage media of claim 17, wherein the first host comprises a network interface card (NIC), the NIC comprising NIC processing circuitry.

* * * * *